United States Patent [19]
Yokoyama et al.

[11] Patent Number: 5,947,402
[45] Date of Patent: *Sep. 7, 1999

[54] MAGNETIC RECORDING AND REPRODUCING APPARATUS FOR CONTROLLING THE TENSION OF A MAGNETIC TAPE

[75] Inventors: Eiji Yokoyama; Masato Nagasawa; Kazuo Mori; Seiji Kishikawa; Masami Tomita; Nobuzumi Kurihara, all of Nagaokakyo, Japan

[73] Assignee: Mitsubishi Denki Kabushiki Kaisha, Tokyo, Japan

[ * ] Notice: This patent is subject to a terminal disclaimer.

[21] Appl. No.: 08/899,203

[22] Filed: Jul. 23, 1997

Related U.S. Application Data

[62] Division of application No. 08/745,102, Nov. 7, 1996, Pat. No. 5,725,168, which is a continuation of application No. 08/186,503, Jan. 26, 1994, abandoned, which is a continuation of application No. 07/624,418, Dec. 6, 1990, abandoned.

[30] Foreign Application Priority Data

| Dec. 6, 1989 | [JP] | Japan | 1-315465 |
| Jan. 16, 1990 | [JP] | Japan | 2-7591 |
| Jun. 25, 1990 | [JP] | Japan | 2-170815 |
| Jun. 28, 1990 | [JP] | Japan | 2-173545 |
| Jun. 29, 1990 | [JP] | Japan | 2-169886 |
| Jun. 29, 1990 | [JP] | Japan | 2-173571 |
| Jul. 5, 1990 | [JP] | Japan | 2-180125 |
| Jul. 12, 1990 | [JP] | Japan | 2-186485 |
| Jul. 13, 1990 | [JP] | Japan | 2-186191 |

[51] Int. Cl.[6] ............................ G11B 15/46; G11B 23/42
[52] U.S. Cl. ............................ 242/334.6; 242/417.3; 360/71; 360/85
[58] Field of Search ................... 242/334.6, 417.3, 242/420.6, 421.7; 360/71, 85, 96.1

[56] References Cited

U.S. PATENT DOCUMENTS

| 2,979,280 | 4/1961 | Ralph | 242/75.3 |
| 4,097,005 | 6/1978 | Sleger | 242/189 |
| 4,264,937 | 4/1981 | Kabacinski | 360/85 |
| 4,440,358 | 4/1984 | Ryan et al. | 242/189 |
| 4,549,701 | 10/1985 | Lucas | 242/75.3 |
| 4,557,435 | 12/1985 | Reishus | 242/190 |
| 4,841,392 | 6/1989 | Muramatsu et al. | 360/85 |

FOREIGN PATENT DOCUMENTS

| 2847321 | 5/1979 | Germany . |
| 55-22285 | 2/1980 | Japan . |
| 62-184652 | 8/1987 | Japan . |
| 63-173219 | 7/1988 | Japan . |
| 63-41130 | 8/1988 | Japan . |
| 64-56036 | 4/1989 | Japan . |
| 1-151044 | 6/1989 | Japan . |
| 1-298562 | 12/1989 | Japan . |
| 1-298563 | 12/1989 | Japan . |
| 1-303631 | 12/1989 | Japan . |
| 2089071 | 6/1982 | United Kingdom . |

OTHER PUBLICATIONS

"Patent Abstracts of Japan", vol. 12 No. 32, Jan. 1988 Japanese Patent Publication 62–184652.
National Technical Report, p. 41, vol. 28, No. 3, Jun. 1982.
Introduction to Magnetic REcording Technique, p. 187.
"Multilayer Piezoelectric Actuator", NEC Technical Reports, pp. 118–122, vol. 40, No. 5, 1987.

Primary Examiner—John Q. Nguyen

[57] ABSTRACT

A magnetic recording and reproducing apparatus for recording a desired sound or picture signal to a magnetic tape by a magnetic head. At the time of normal-speed recording and reproduction, the magnetic tape is taken up at a constant speed, but by changing the tape travelling speed of the tape on the rotary drum, DTF control and high-speed noiseless reproduction are enabled. The tension of the tape on the entrance side of the rotary drum is controlled to a desired value. This apparatus includes a tape tension actuator and a tape drawing actuator on the entrance side and on the exit side, respectively, of the rotary drum. In DTF control, both tape actuators correct a tracking error of the tape in cooperation with each other. In high-speed noiseless reproduction, both tape actuators are differentially driven so as to lower the tape travelling speed on the rotary drum. Both tape actuators are driven in feedback control using the modern control.

10 Claims, 74 Drawing Sheets

Tp : TRACK PITCH
θ : TRACK ANGLE

SIGNAL FOR SUPERIOR REPRODUCTION

MOVEMENT OF TAPE ACTUATOR

TAPE SPEED ON THE ROTARY DRUM ($V_A$)

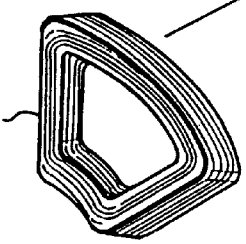
FIG. 19(a1)
108
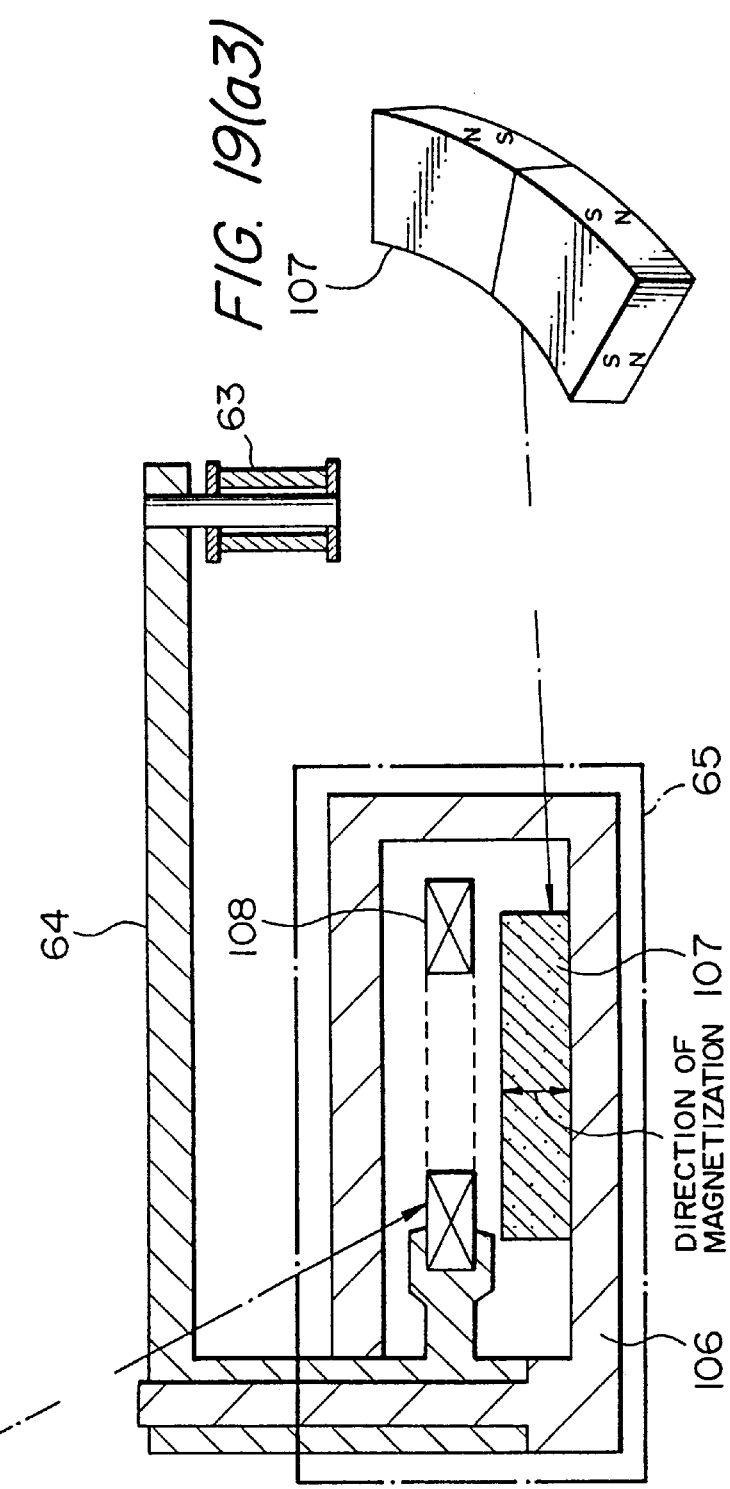
FIG. 19(a2)
FIG. 19(a3)
107
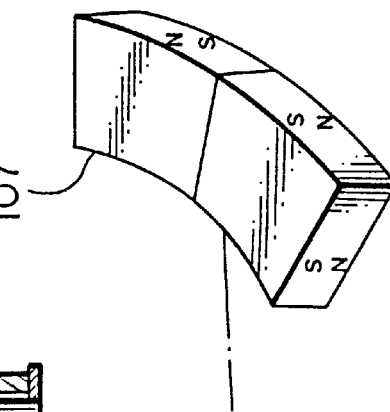

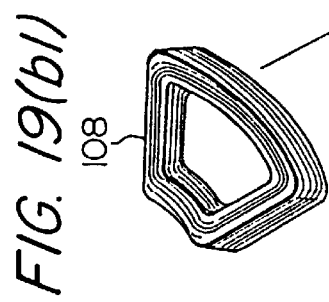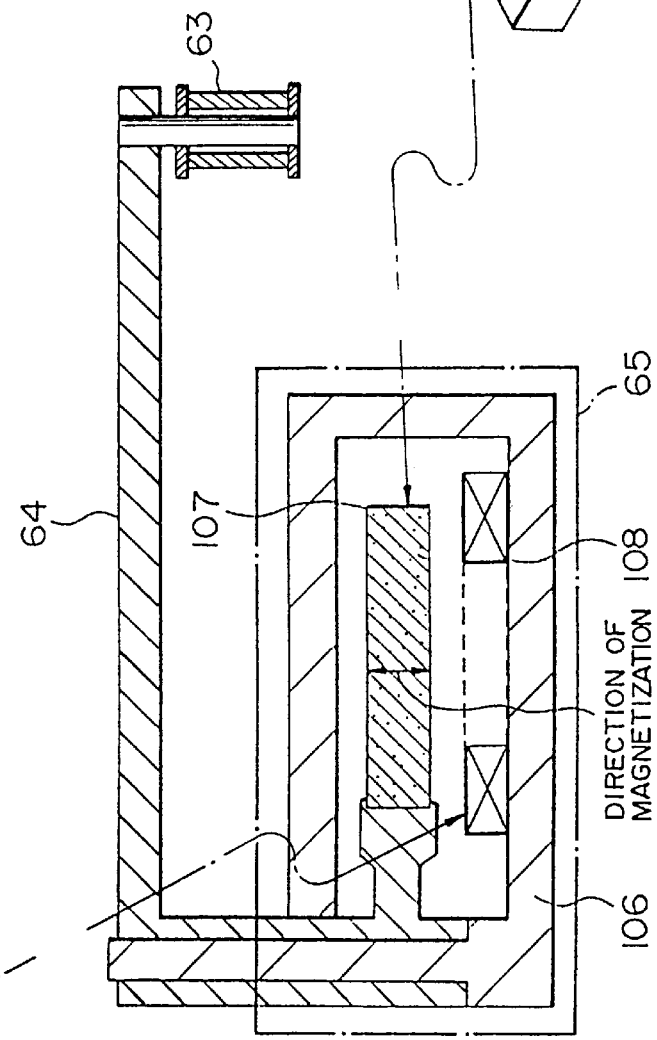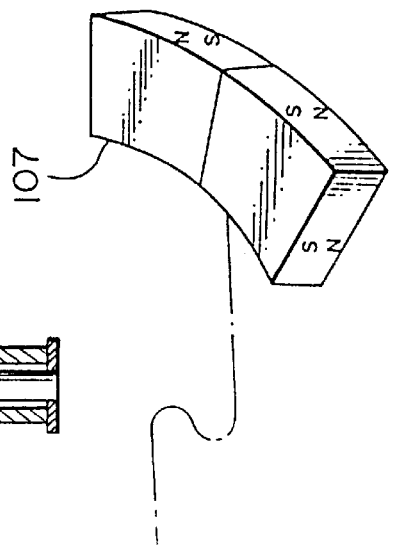

● REPRESENTS A POLE

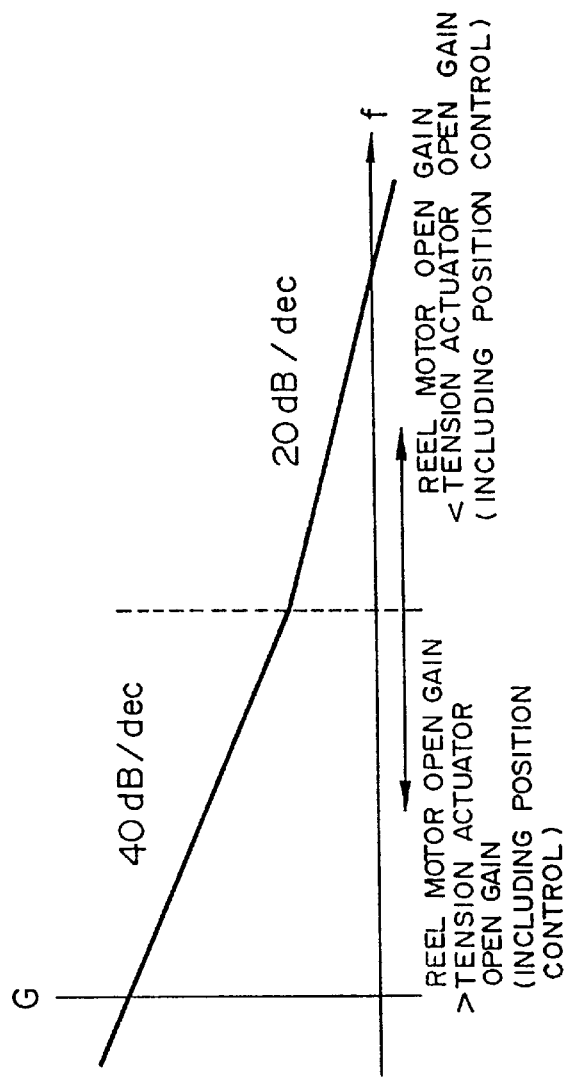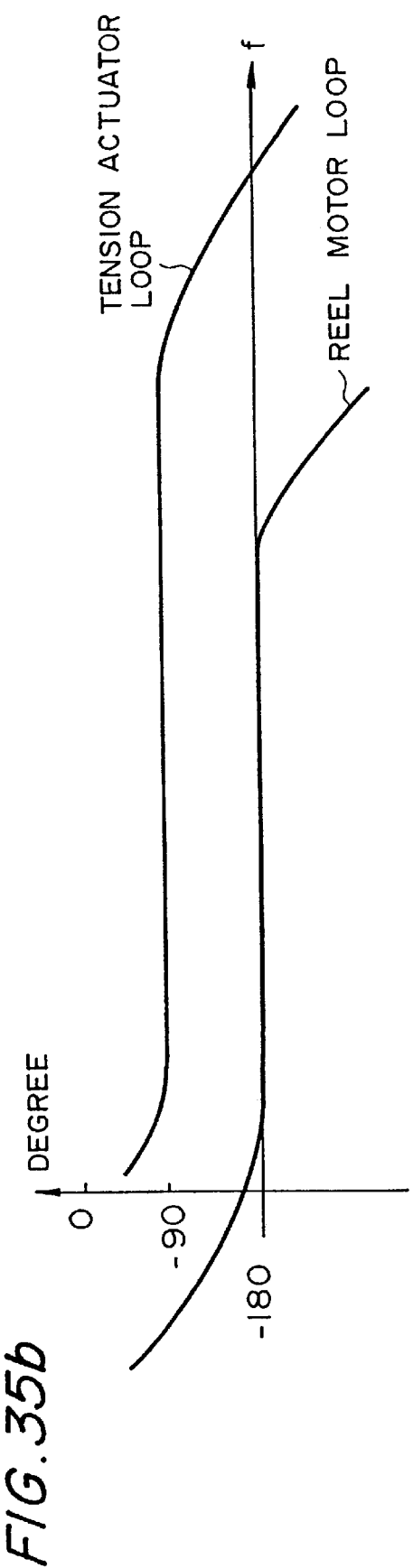
FIG. 35a
FIG. 35b x: TENSION CONTROL ACTUATOR DRIVING CURRENT SIGNAL y: TENSION CONTROL ACTUATOR POSITION SIGNAL

F: ESTIMATED TENSION

A~E: VARIABLE

J: INERTIA
F1: FEEDBACK GAIN
F2: FEEDBACK GAIN
F6: MECHANICAL CONSTANT
} CONSTANT

BLOCK DIAGRAM OF $$\beta K = \sum_{n=0}^{\infty} \alpha_{K-n}$$

MAGNETIC RECORDING AND REPRODUCING APPARATUS FOR CONTROLLING THE TENSION OF A MAGNETIC TAPE

This application is a divisional of application Ser. No. 08/745,102, filed on Nov. 7, 1996, U.S. Pat. No. 5,725,168 which was a Rule 1.62 continuation of Ser. No. 08/186,503 filed on Jan. 26, 1994; now abandoned; which was a Rule 1.62 continuation of Ser. No. 07/624,418 filed on Dec. 6, 1990; now abandoned, the entire contents of which are hereby incorporated by reference.

BACKGROUND OF THE INVENTION

1. Field of the Invention

The present invention relates to a magnetic recording and reproducing apparatus and, more particularly, to a high-speed reproducing system, a tracking control system and a tension control system for a video tape recorder (hereinunder referred to as "VTR") of a helical scanning system.

2. Description of the Related Art

In a conventional auto tracking reproducing apparatus in a VTR of a helical scanning system, a video signal reproducing magnetic head is generally mounted on an electromechanical transducing element (hereinunder referred to as "head actuator"). At the time of reproduction, the head actuator is driven perpendicularly to the direction of the travel of a recording track, thereby giving automatic following control over the magnetic head so as to prevent the magnetic head from leaving the recording track.

Various methods have been proposed and already put to practical use concerning a technique of enabling the magnetic head mounted on the head actuator to automatically follow the recording track, which is called an auto tracking control technique.

For example, several kinds (e.g., four kinds) of pilot signals for tracking low frequencies in a band other than a video signal band are overlapped with a video signal and separate pilot signals are recorded on several adjacent (four) tracks, as known in an 8-mm VTR format. In this pilot system, a tracking error signal is detected by a difference in a crosstalk level between the left and right tracks at the time of reproduction.

In a wobbling system which has been put to practical use in 1-inch VTR produced by Ampex, D-2 format digital VTR DVR-10 produced by Sony Corporation and the like, the magnetic head is forcibly vibrated minutely in the direction of the track width at a constant frequency which is called a wobbling frequency. The reproduction envelope signal from the magnetic head is synchronously detected at the wobbling frequency, whereby a tracking error signal is detected.

In a mountaineering system, which has been put to practical use in VHS VTR, NV-10000 produced by Matsushita Electric Industrial Co., Ltd., VHS VTR F75 produced by Mitsubishi Electric Copr. and the like, the reproduction envelope signal from the magnetic head is supplied to a sample-and-hold circuit at the central portion of the field which has been read. The voltage to be applied to the actuator or the rotation phase of the capstan motor is then changed by one step (e.g., increased) and the envelope level of the next frame is compared with the value of the sample and hold value. This series of operations is repeated until the envelope level of the next frame becomes smaller. When the envelope level of the next frame becomes smaller, the direction of the applied voltage is reversed and the envelope level of the reproduction signal is upwardly converged toward the maximum value.

In a conventional auto tracking reproducing apparatus, a tracking error is detected by the above-described various tracking error detecting methods and the detected tracking error is fed back by the head actuator which is accommodated in the rotary drum.

Such a movable head is not only used for dynamic track following (hereinunder referred to as "DTF") control for correcting a tracking error during normal-speed reproduction but also often used at the time of superior reproduction (high-speed reproduction, slow reproduction and still reproduction).

As an example of such a movable head used for noiseless superior reproduction, the system of a movable head described on p. 41 of *National Technical Report*. Vol. 28, No. Jun. 3, (1982) is schematically shown in FIG. 75.

In order to briefly explain the high-speed superior reproducing method using this known system, FIG. 76 shows the high-speed superior reproduction servo system. In FIG. 76, a rotary magnetic head 1 is driven by a head actuator 2 perpendicularly to the direction of the travel of the tape. From the reproduction envelope signal of the magnetic head 1, an amount of tracking error is detected by a tracking error detector 3 and a tracking error signal is output. An inclination correction pattern generator 4 corrects the inclination of the magnetic head 1 from the tape speed information so that the angle at which the magnetic head 1 scans a tape (not shown) agrees with the angle of the recording track (not shown) and generates a track trace pattern for the magnetic head 1. The tracking error signal from the tracking error detector 3 and the inclination correction pattern from the inclination correction pattern generator 4 are added by an adder 5.

The operation of a conventional system will now be explained. The angle at which the magnetic head 1 traces the tape at the time of normal-speed reproduction (hereinunder referred to as "speed 1") is the same as the angle of the recording track. However, at the time of reproduction at a different speed, since the angle at which the magnetic head 1 traces the tape does not agree with the angle of the recording track, off-track (hereinunder referred to as "inclination error") is produced and a noise is produced on a reproduced picture.

As an example, FIGS. 77 and 78 schematically show the relationship between the recording track pattern on the tape and the trajectories of the magnetic head 1 produced at the time of reproduction at a speed five times as high as the normal speed (hereinunder referred to as "speed 5") in the forward direction and the reverse direction, respectively. In FIGS. 77 and 78, the symbol A represents a trajectory of the magnetic head 1 produced at the time of normal-speed reproduction, B a trajectory of the magnetic head 1 produced at the time of reproduction at speed 5, and C a trajectory of the magnetic head 1 produced at the time of reproduction at speed 5 in the reverse direction. As is obvious from FIGS. 77 and 78, the trajectory of the magnetic head 1 must be corrected to be A from B or C for the purpose of noiseless reproduction.

FIG. 79 schematically shows an inclination error pattern of the magnetic head 1 produced at the time of reproduction at a speed n times as high as the normal speed (hereinunder referred to as "speed n", n is any given real number).

It is now assumed that a VTR has a guard bandless recording system utilizing an azimuth loss. If it is assumed that T is a ½ period of the rotary drum and $t_p$ is a track pitch, the inclination error which may be caused at the time of reproduction at speed n is represented by $t_p(n-1)$, wherein n is an integer. In this way, the inclination error pattern is represented by a function having n as a parameter. In other words, the inclination error pattern changes depending upon the tape travelling speed. The inclination correction pattern generator shown in FIG. 76 is so designed as to generate an inclination correction pattern by utilizing tape speed information such as a capstan FG signal.

When the inclination correction pattern is supplied to the head actuator 2, the inclination of the magnetic head 1 is corrected so as to move in parallel to the trajectory of the recording track even at the time of reproduction at a different speed. However, the mere displacement of the magnetic head 1 in conformity with the angle of the recording track further generates off-track due to the linearity of the trajectories of the recording track and the magnetic head 1 or the phase deviation of the track. In order to prevent such off-track, an auto tracking control system by a closed loop, which is represented by the surrounding broken line in FIG. 75, is generally added.

Any system such as the pilot system, wobbling system and mountaineering system described above may be adopted as the controlling method for the auto tracking control system, but in order to obtain a high-definition image even at the time of production at a different speed, since it is necessary that the magnetic head 1 follows the nonlinearity of the recording track (hereinunder referred to as "track rolling"), it is desirable to adopt the pilot system or the wobbling system which allows a comparatively wide controlled region. Since the controlling method and operation of the auto tracking control system have already been known, a detailed explanation thereof will be omitted here.

The tape tension control will now be explained.

FIG. 80 shows the structure of a magnetic tape travelling system of a video tape recorder of a VHS system as a magnetic recording and reproducing apparatus which is described on p. 187 of *Introduction to Magnetic Recording Technique*, by Yokoyama, edited by Sogo Denshi Shuppansha. In FIG. 80, a video tape (magnetic tape) is supplied from a feed reel 6 and the tension of the magnetic tape travelling system is detected by a back tension post 7. The information recorded on the video tape is temporarily erased by an all-width erase head 8. The magnetic tape travelling system is stabilized by impedance rollers 9 and 10. A rotary drum 11 includes an upper cylinder 12 and a lower cylinder 13. A video head 14 is secured to the upper cylinder 12. The sound signal on the linear track of the video tape is erased by a sound erase head 15, and thereafter a sound and a control pulse are recorded on the linear track by a sound control head 16. A pinch roller 18 is provided so as to clamp a capstan shaft 17 and a video tape at a constant pressing force. The capstan shaft 17 is opposed to the pinch roller 18 so as to control the deviation of the trajectory of the video head 14 from the video track on the video tape by causing the video tape to travel. A take-up reel 19 is provided for taking up the video tape.

FIG. 81 shows the structure of a conventional tension control mechanism (tension servo mechanism). In FIG. 81, the rotation of the feed reel 6 is suppressed by a hub brake 20. The tension of the magnetic tape travelling system is detected by a tension control arm 21. The force proportional to the amount of displacement of the tension control arm 21 is applied to the hub brake 20 by a spring 22, the spring 22 being capable of varying the force which is applied to the tension control arm 21. A tension adjust lever 23 for adjusting the reference tension of the tension control mechanism is connected to the spring 22.

The operation of the conventional tension control mechanism will now be explained.

The video tape supplied from the feed reel 6 is clamped between the pinch roller 18 and the capstan shaft 17 and stretched by the rotation of the capstan shaft 17. Thereafter, the video tape is wound around the take-up reel 19. During this time, it is necessary that the tension of the magnetic tape travelling system is controlled to a constant value so that the spaces between the video tape and the all-width erase head 8, the video head 14, the sound erase head 15, the sound control head 16 and the like are optimum. Needless to say, when the tension of the travelling system is increased, the spaces between the heads and the tape are reduced, so that the high-frequency characteristics of the recording and reproducing system are enhanced but the scuffs of the tape are increased and the durability of the apparatus in the still state for continuously reproducing the same track is deteriorated. In addition, the wear of the heads are increased. On the other hand, if the tension of the travelling system is reduced, since the spaces between the heads and the tape are increased, the high-frequency characteristics of the recording and reproducing system are deteriorated.

As a countermeasure, a conventional VTR is provided with a tension control mechanism such as that shown in FIG. 81. In FIG. 81, for example, if the tension of the magnetic tape travelling system is increased, since the balance between the tension control arm 21 and the spring 22 is disturbed, the spring 22 is extended. At this time, the hub brake 20 is relaxed and the rotation of the feed reel 6 is made free, whereby the amount of feed of video tape is increased. As a result, the tension of the magnetic tape travelling system is restored to the original tension. In this way, the tension of the magnetic tape travelling system is kept constant.

In a high-definition TV or a digital VTR for digitally recording and reproducing a video signal and a sound signal, since the amount of information recorded is greatly increased, the technique of high-density recording and reproduction with high-accuracy DTF control are essential in order to enable long-time recording on a cassette tape of a limited size.

In a DTF apparatus in a conventional VTR, since the means for tracking error correction is merely a movable head accommodated in the drum, the DTF control capacity is determined by the performance of the head actuator for moving the movable head.

As the head actuator 2 which is generally used for DTF control in a wide frequency band with a high accuracy, one which has no phase shift up to a comparatively high frequency, for example, up to the vicinity of 1 KHz to several KHz is selected by virtue of its good control capacity. The head actuator 2 which does not cause a phase shift up to a high frequency is required to have a mechanical characteristic which does not resonate up to a high frequency. The primary mechanical resonance frequency of a general actuator is obtained by dividing the root of the quotient obtained by dividing the spring constant of the actuator by the mass of the movable portion of the actuator by $2\pi$. A high primary resonance frequency is therefore obtained either by lightening the mass of the movable portion of the actuator or by increasing the spring constant of the actuator.

As described above, a movable head is generally not only used for DTF control at the time of normal-speed reproduction but is also often used at the time of superior reproduction. In a high-speed noiseless reproducing apparatus in a conventional VTR, the tracking error is corrected by moving the magnetic head in the direction of the width of the recording track by the head actuator. The amount of tracking error which is correctable is therefore limited to the range in which the head actuator is movable. For this reason, the range in which the head actuator for driving the magnetic head is movable is preferably as wide as possible. In a conventional structure, however, the head actuator must be accommodated in the rotary drum, the outer diameter of which is determined by the standard, so that a small-sized head actuator is naturally required.

To meet such demand, a piezoelectric element consisting of two pasted piezoelectric sheets (hereinunder referred to as "bimorphous cell"), a lamination type piezoelectric element with a displacement enlarging mechanism, such as a lever and a buckling spring attached thereto, and a moving coil supported by a spring and electromagnetically driven in a magnetic circuit (hereinunder referred to as "electromagnetic actuator") have been proposed as a small-sized head actuator which has a wide movable range, and some of these have been put to practical use.

The cases of using these head actuators for DTF control and high-speed noiseless reproduction will be considered in the following discussion.

It is first assumed that a bimorphous cell is used as a head actuator. A bimorphous cell is known among piezoelectric elements as an element which has a large amplitude for the driving voltage. The amount of displacement $\xi$ of a bimorphous cell is represented by the following equation:

$$\xi = d_{31} \times V \times \frac{l^2}{t^2} \times S_k \times R$$

wherein $\xi$: displacement, V: applied voltage, d31: piezoelectric constant, l: effective length, t: thickness of one sheet of piezoelectric element, $S_k$: electrode coefficient (0.94 to 0.95), R: loss factor (0.9)

The piezoelectric constant d31 is a function of the applied voltage V, and when the applied voltage V is large, $d_{31}$ also becomes large. $S_k$ and R are constants determined by the configuration of the bimorphous cell.

Thus, it is understood that the amount of displacement $\xi$ of the bimorphous cell is determined by various factors.

In order to increase the primary mechanical resonance frequency of a bimorphous cell for DTF control, it is necessary to increase the thickness t of one sheet of piezoelectric and reduce the effective length l. In other words, it is necessary to reduce l/t. However, if l/t is reduced, the amount of displacement $\xi$ of the bimorphous cell is also reduced by the square of l/t, which is disadvantageous to the bimorphous cell for high-speed superior reproduction which requires a large amplitude. That is, a bimorphous cell for DTF control and a bimorphous cell for high speed superior reproduction have antipodal requirements. In most cases, the system of a bimorphous cell is therefore composed with more importance attached to either DTF control or high-speed superior reproduction.

For example, in a tape format having a wide track pitch such as the tapes of a publicly used VTR of VHS system and β system and an 8-mm tape, since DTF control with a comparative accuracy is not required, the head actuator is mainly used for high-speed superior reproduction, as in known systems.

In this case, a head actuator having a large piezoelectric constant $d_{31}$ is selected so as to have a large amplitude and a small mechanical resonance gain. However, it is the effective length l of the bimorphous cell in the term of a square that mainly influences the amount of displacement $\xi$, and the larger the effective length l, the larger the amount of displacement $\xi$.

As the head actuator is accommodated in the rotary drum having a limited diameter, as described above, the effective length l is also limited. Various attempts have been made at increasing the effective length l as much as possible. For example, there are an annular bimorphous cell 2a and carrying heads 14a and 14b shown in FIG. 82, which is disclosed in Japanese Patent Laid-Open No. 22285/1980 and leaf bimorphous cells 2b and 2c shown in FIG. 83, which are disclosed in Japanese Patent Publication No. 41130/1988. However, even if the amount of displacement $\xi$ is increased by increasing the effective length l in this way, there remains still another problem.

FIG. 84 shows the relationship between the effective length of a bimorphous cell and the inclination of a magnetic head. As is clear from FIG. 84, a large amplitude increases the inclination of the magnetic head, which inevitably results in the deterioration in the picture quality.

On the other hand, in a tape format having a narrow track pitch such as the tapes of a high-definition TV VTR and a digital VTR, since DTF control with a high accuracy in a wide frequency band is essential, a bimorphous cell having a high primary mechanical resonance frequency is selected even at the sacrifice of the possible speed in high-speed superior reproduction.

As described above, it is impossible that a bimorphous cell simultaneously satisfies both requirements for DTF control in a wide frequency band with a high accuracy and for high-speed superior reproduction.

Secondly, it is assumed that a lamination type piezoelectric element with a displacement enlarging mechanism attached thereto is used as a head actuator. An example of this type of head actuator is described in NEC Technical Reports, Vol. 40, No. 5. pp. 118 to 122 (1987). In this example, no inclination of the head is caused by displacement unlike a bimorphous cell, but since a lamination type piezoelectric element having a small amount of displacement is used as a driving element, it is impossible to obtain a large amount of displacement. Even if the amount of displacement is largely increased by a level or a buckling spring, when the head actuator is accommodated in the rotary drum of the VTR, the displacement is influenced by the centrifugal force of the displacement enlarging mechanism, thereby causing an offset in the displacement.

Thirdly, it is assumed that an electromagnetic actuator is used as a head actuator. An example of the electromagnetic actuator is disclosed in Japanese Patent Laid-Open No. 173219/1988. An electromagnetic actuator is known to have a comparatively large amount of displacement in comparison with the above-described two actuators. The structure of an electromagnetic actuator is shown in FIG. 85.

In FIG. 85, the head 14 is held by a movable coil 24 and the movable coil 24 is supported around a permanent magnet 25 in such a manner as to be movable in the axial direction. The position of the head 14 is therefore adjustable as desired by supplying an appropriate driving current to the movable coil 24.

Such an electromagnetic actuator has many advantages when it is used for high-speed superior reproduction. For example, a driving voltage V of several volts is sufficient, and there is no hysteresis or no inclination of the head. The high reliability is secured. There is no deterioration with time. In addition, since an electromagnetic actuator is cheap, it is suitable to practical use for a publicly used VTR. However, a general electromagnetic actuator for superior reproduction has a frequency response characteristic such as shown in FIG. 86. When an electromagnetic actuator is used for superior reproduction, since the spring constant is set at a weak value with respect to the force generated by the coil in order to increase the amount of displacement, the mechanical resonance frequency is low. In addition, it is necessary to sufficiently separate the driving coil from the magnetic head through a certain member in order to avoid the influence of the magnetic field generated from the driving coil while driving the actuator. Since the secondary resonance frequency caused by this member exists comparatively close to the first resonance frequency, the DTF control system must be composed by a compensation outside the resonance for controlling in a low frequency band than the primary resonance frequency. That is, since it is impossible to enlarge the controlled region, a DTF control in a wide frequency band with a high accuracy is not realized.

If the spring constant is increased for DTF control, DTF control in a wide frequency band with a high accuracy is possible. However, in order to use such an actuator for superior reproduction, it is necessary to increase the force generated by the driving coil for the purpose-of obtaining a displacement with a large amplitude. It is therefore necessary to apply a large current, which is a problem in the respect of heat generation or the like.

Consequently, it is also difficult that an electromagnetic actuator has a DTF control capacity and a high-speed superior reproducing capacity at the same time.

To sum up the above explanation, it is impossible in a conventional apparatus to simultaneously realize DTF control in a wide controlled region such as several hundred Hz with a high accuracy and noiseless reproduction at a high speed such as several ten times as high as the normal speed.

The problems of a tension control device in a conventional magnetic recording and reproducing apparatus will now be explained.

FIGS. 87 and 88 show a conventional magnetic recording and reproducing apparatuse, and in particular, a tape tension control device described in Japanese Patent Laid-Open No. 56036/1990. FIG. 87 shows a recording and reproducing state, and FIG. 88 shows a high-speed tape travelling state.

A magnetic tape is drawn out of a tape cassette (not shown) and constitutes a tape travel path such as that shown in FIG. 87. A tension lever 28, and arms 29 and 30 are integrally rotatable around a hinged support 31.

At the time of recording and reproduction, a tension post 33 is brought into contact with the magnetic tape and simultaneously a tension band 34 is brought into contact with a feed reel 35 by a slider 32, as shown in FIG. 87. The magnetic tape is fed toward a take-up reel 36 by a capstan at a constant speed and supplied from the feed reel 35. At this time, the moment of the tension lever 28 produced by a spring 38 between a tension release lever 37 and the tension lever 28 is balanced with the resultant force of the moment of the tension lever 28 produced by the force applied to the tension post 33 by the tension between tape guides 39 and 40 and the moment produced by the frictional force between the tension band 34 and the feed reel 35. The tension of the magnetic tape is mainly controlled by the frictional force applied to the feel reel 35 by the tension band 34.

For example, if the tape tension becomes larger than the balanced value due to an external disturbance, the tape tension between the tape guide 39 on the feeding side and the tape guide 40 on the take-up side as seen from the tension post 33 also becomes large. As a result, the tension post 33 is pushed out to the left-hand side of the balanced position shown in FIG. 87. The tension lever 28 is thereby rotated counterclockwise around the hinged support 31 and simultaneously the arm 30 is also rotated counterclockwise. With the reduction in the contact force between the tension band 34 and the feed reel 35, the frictional force is reduced, and consequently the tension is relaxed, whereby the tension post 33 is restored to the balanced position in the end.

On the other hand, when the tape tension becomes smaller than the balanced value due to an external disturbance, the frictional force between the tension band 33 and the feed reel 35 becomes large and, as a result, the tension is increased, whereby the tension post 33 is restored to the balanced position.

The tape tension is kept constant in this way at the time of recording and reproduction.

During high-speed tape travel, the tension post 33 is moved to a position at which the tension post 33 is out of contact with the magnetic tape by the slider 32. The tension band 32 is relaxed to a position at which the tension band 33 is out of contact with the feed reel 35, so that the tension control mechanism is separated from the tape travelling system. The tension control mechanism is also separated from a capstan 41 and a pinch roller 42. In the case of high-speed tape travel from the feed reel 35 to the take-up reel 36, the take-up reel 36 is rotated at a desired speed to wind the magnetic tape therearound, and a constant load is applied to the feed reel 35 to an extent which prevents the relaxation of the magnetic tape. On the other hand, in the case of high-speed tape travel from the take-up reel 36 to the feed reel 35, the feed reel 35 is rotated at a desired speed to wind the magnetic tape therearound, and a constant load is applied to the take-up reel 35 to an extent which prevents the relaxation of the magnetic tape.

In the tape tension control mechanism of a conventional magnetic recording and reproducing apparatus having the above-described structure, a special tape tension control other than the application of a load in the direction contrary to the direction of the travel of the tape is not exerted during high-speed tape travel. Therefore, the conventional tape tension control mechanism cannot respond to a transient tension change, and the tape is sometimes damaged, or by a change in the contacting state between the magnetic head and the tape caused by a tension change, a fluctuation in the output which leads to deterioration in information is apt to be caused.

In addition, the tension controlled region for the conventional tension control device is narrow, and a tension change which can be suppressed by the conventional tension control device is only not more than several Hz. Therefore, in a VTR for high-density recording and reproduction such as a digital VTR adopting this tape tension control device, it is impossible to constantly keep the optimum space between the magnetic head and the magnetic tape, thereby making good recording and reproduction impossible.

SUMMARY OF THE INVENTION

Accordingly, it is an object of the present invention to eliminate the above-described problems in the known systems and to provide a magnetic recording and reproducing apparatus which is capable of realizing both DTF control in as wide a controlled region as several hundred Hz with a high accuracy and noiseless reproduction at a high speed such as several ten times of the normal speed without deterioration in picture quality.

It is another object of the present invention to provide a magnetic recording and reproducing apparatus which is capable of realizing the constantly optimum contact between the head and the tape by a tension control in a wide frequency band with a high accuracy, for thereby enabling good recording and reproduction.

To achieve these objects, a magnetic recording and reproducing apparatus according to the present invention is provided with a tape drawing actuator and a tape tension actuator on the magnetic tape exit side and the magnetic tape entrance side, respectively, of a rotary drum with a magnetic head provided thereon in a magnetic tape travel path in addition to a conventional head actuator.

These tape actuators are operated differentially and are capable of freely changing the tape travelling speed on the head surface.

Use of such tape actuators enables not only DTF control and tension control separately from each other but also track control and tension control in a high-frequency band with a high accuracy in combination with DTF control and tension control.

Each of the tape actuators is preferably composed of a tape drawing or pushing roller, an arm for rotatably holding the roller with respect to a predetermined rotary shaft, an arm driving portion for driving the arm and a position sensor for detecting the displaced position of the arm driving portion. Electrical and mechanical characteristics of both tape actuators are preferably set to be equal in order to allow them the differential action.

In the present invention, the head actuator and the tape drawing actuator are connected in a common DTF control system and constitute a control loop for eliminating a tracking error in cooperation with the negative feedback of a tracking error signal of the movable head to both actuators.

The head actuator compensates for a small amplitude in a high-frequency band of a tracking error, while the tape drawing actuator compensates for a large amplitude in a low-frequency band of a tracking error.

In order to combine DTF control with tension control, the control voltage generated from the tracking control loop of the tape drawing actuator is supplied to the tape tension actuator, and by the differential action of both tape actuators, a desired stable tape tension is obtained, for thereby realizing a good contact between the tape and the head.

In order to properly control the tape tension actuator, it is preferable that the dynamic characteristic of the tape tension actuator is electrically estimated and a tension estimating device for electrically simulating the relationship between the voltage to be input to the tape tension actuator and the displacement of the tape tension actuator is provided. This relationship is expressed by (input voltage)/(displacement) transfer characteristic and the external tension disturbance applied to the tape tension actuator can be estimated therefrom.

Therefore, if the high-frequency component of the tension error signal is negatively fed back to the tape tension actuator and the low-frequency component of the tension error signal is negatively fed back to the feed reel motor so that the estimated tension agrees with a preset reference tension, tension control in a wide frequency band is enabled.

In this way, according to the present invention, tracking control in a wide frequency band and a wide dynamic range with a high accuracy is enabled in the normal reproduction mode in cooperation with the head actuator having a large high-frequency band gain and the tape actuators having a large low-frequency band gain. By this division of the frequency band, tracking control in a wide frequency band is realized even in a tape format having a narrow track pitch.

According to the present invention, the tape actuators change the tape travelling speed by the differential action of the tape drawing actuator and the tape tension actuator, and the change in tension is suppressed by both tape actuators.

The change in tension caused by the electrical or mechanical characteristics of the actuator itself or an external disturbance when the pair of tape actuators reciprocate is suppressed by feed backing the signal generated from the tension estimating device to the tape tension actuator and the feed reel motor.

By such simultaneous control of DTF and tension, a tracking error is eliminated and a good contact between the tape and the head is obtained, for thereby enabling high-quality signal reproduction during normal-speed reproduction.

In the high-speed reproduction mode, the tape is subjected to a rocking motion by both tape actuators between the entrance and the exit of the rotary drum while causing the tape to travel at a high speed, and in the state in which the tape speed is relatively lowered with respect to the head, a signal is intermittently reproduced.

In this way, it is possible to intermittently obtain a high-quality reproduced image even in a high-speed tape travelling state.

In order to rock the tape actuators, a triangular signal having a frequency synchronous with 1/m (m is a positive integer) of the rotational frequency of the rotary drum is applied to the actuators.

It is preferable that the tape tension actuator and the feed reel motor are also subjected to tension control during such noiseless high-speed superior reproduction.

The present invention is further characterized in that the tension at the time of recording and reproduction is controlled to be the optimum value by using the tape tension actuator.

In the present invention, tension control by the tape tension actuator is realized independently of DTF control. For this purpose, the tape tension actuator provides a desired tension for the tape at the tape entrance side of the rotary drum and the tension control system uses the (input voltage)/(displacement) transfer characteristic. The tension control system estimates the tension which the tape tension actuator receives from the tape travelling system and exerts feedback control of the tape tension actuator and the feed reel motor so that the estimated tension agrees with the reference tension.

As described above, according to the present invention, it is possible to control the tape tension in a wide frequency band with a high accuracy and to obtain the optimum tape tension both in recording and in reproduction.

The above and other objects, features and advantages of the present invention will become clear from the following description of the preferred embodiments thereof, taken in conjunction with the accompanying drawings.

BRIEF DESCRIPTION OF THE DRAWINGS

FIGS. 19($a$1), ($a$2) and ($a$3) are sectional views of an embodiment of the tape actuator in accordance with the present invention;

FIGS. 19($b$1), ($b$2) and ($b$3) are sectional views of another embodiment of the tape actuator in accordance with the present invention;

FIGS. 35$a$ and 35$b$ show the open loop characteristics of the tension control system in accordance with the present invention;

FIGS. 63 to 65 are plan views of a magnetic recording and reproducing apparatus with the tape actuators in accordance with the present invention mounted thereon, wherein FIG. 63 shows the state of normal-speed recording/reproduction;

and FIGS. 64 and 65 show the state of superior reproduction;

DESCRIPTION OF THE PREFERRED EMBODIMENTS

Embodiments of the present invention will be explained hereinunder with reference to the accompanying drawings.

Figure 1:
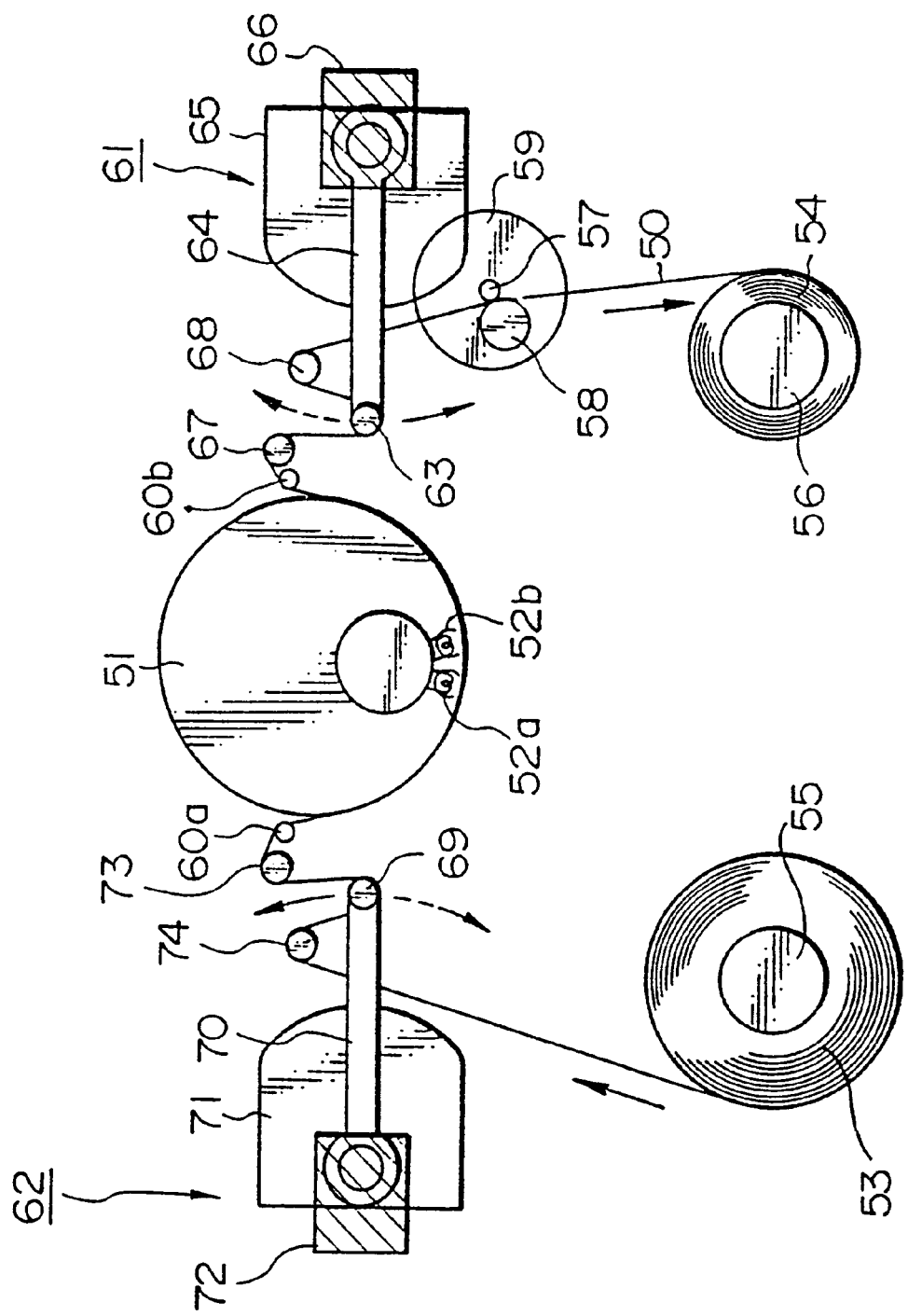
FIG. 1 schematically shows a first embodiment of a magnetic recording and reproducing apparatus according to the present invention.

FIG. 1 shows a first embodiment of a magnetic recording and reproducing apparatus according to the present invention. In FIG. 1, a rotary drum 51 with a magnetic tape 50 wound therearound accommodates two magnetic heads 52a and 52b. The magnetic tape 50 is drawn out of a feed reel 53 and wound around a take-up reel 54. Both reels 53, 54 are driven by motors 55 and 56, respectively. In order to feed the magnetic tape 50 in the direction of the travel at a constant speed, a capstan 57 and a pinch roller 58 for clamping the magnetic tape 50 therebetween are provided. The capstan 57 is driven by a capstan motor 59. In order to wind the magnetic tape 50 around the rotary drum 51 at a predetermined inclination angle, slant poles 60a and 60b are provided on the entrance side and the exit side, respectively, of the rotary drum 51.

The present invention is characterized in that a tape drawing actuator 61 and a tape tension actuator 62 are provided on the exit side and the entrance side, respectively, of the rotary drum 51.

The tape drawing actuator 61 includes a movable tape pass roller 63 which comes into contact with the magnetic tape 50, and a roller arm 64 for holding the pass roller 63 is rocked by a driver 65. The rocking angle of the roller arm 64 is detected by a position sensor 66.

Fixed tape pass rollers 67 and 68 are provided on both sides of the trajectory of the movable tape pass roller 63, and the gap between the fixed tape pass rollers 67, 68 is so set as to allow the movable tape pass roller 63 to pass therethrough. In this embodiment, the movable tape pass roller 63 passes the intermediate point of the fixed tape pass rollers 67, 68 and at this time the gap between the movable tape pass roller 63 and the fixed tape pass roller 67 is equal to the gap between the movable tape pass roller 63 and the fixed tape pass roller 68.

Similarly to the tape drawing actuator 61, the tape tension actuator 62 also includes a moveable tape tension roller 69, a roller arm 70, a driver 71 and a moveable position sensor 72, and fixed tape pass rollers 73 and 74 are provided on both sides of the trajectory of the movable tape tension roller 69.

Principle of Operation of High-speed Superior Reproduction

Figure 2:
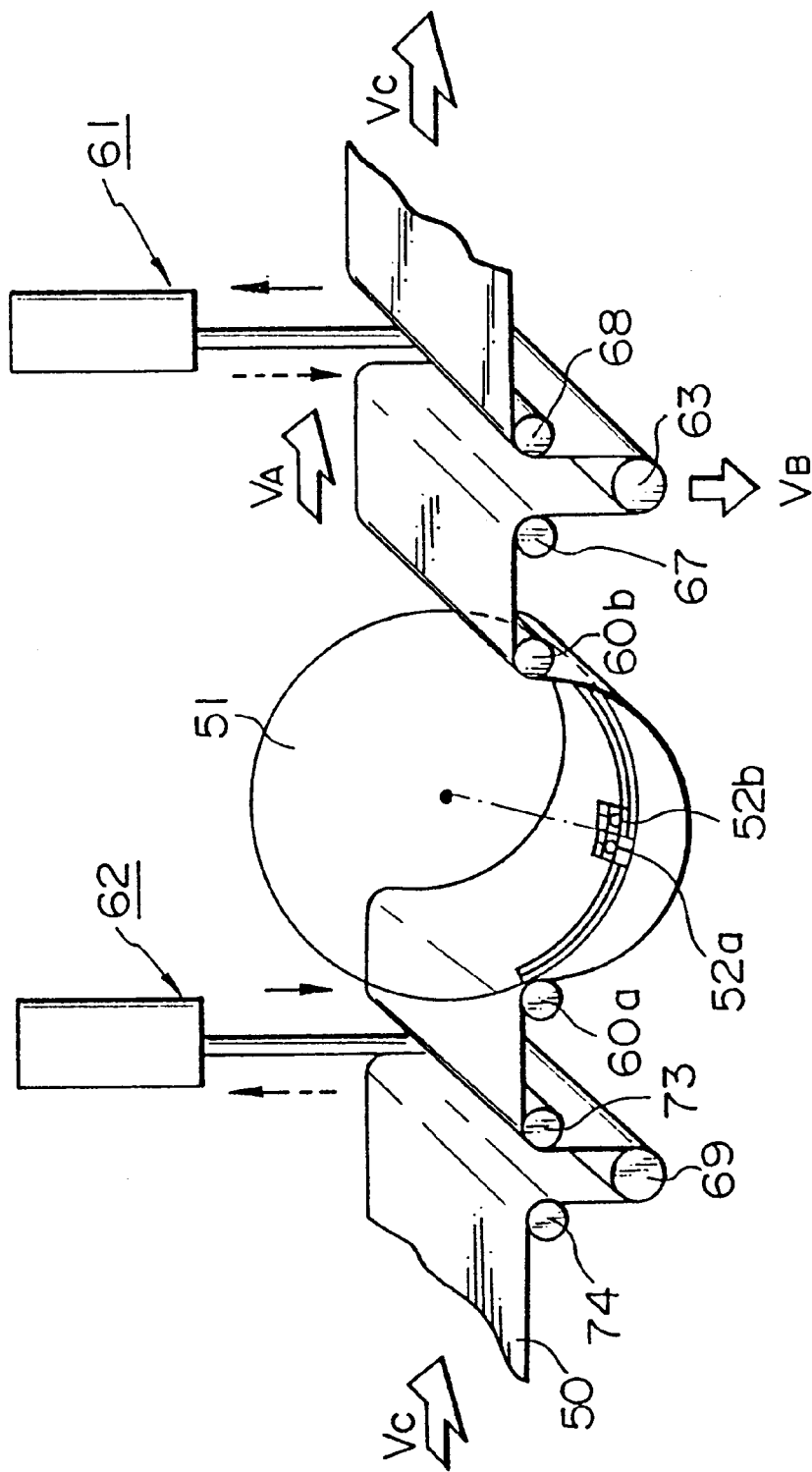
FIG. 2 is a perspective view explaining the principle of the present invention.

FIG. 2 is a perspective view explaining the principle of the operation at the time of high-speed superior reproduction.

In FIG. 2, the speed of each part of the apparatus and the speed of the magnetic tape are schematically shown, wherein $V_A$ is the speed of the magnetic tape 50 on the rotary drum 51, $V_B$ is the moving speed of the movable tape pass roller 63 of the tape drawing actuator 61 and $V_C$ is the speed of the magnetic tape 50 driven by the capstan motor 59 or the take-up reel motor 56.

High-speed superior reproduction is an operation of intermittently reproducing a picture while causing the tape at a speed for any given times as high as the normal speed.

Conventionally, the head is caused to follow the track only by the head actuator during this high-speed tape travel, so that the high speed which enables reproduction is limited.

In the present invention, in order to solve this problem, the tape drawing actuator 61 and the tape tension actuator 62 provided on the exit side and the entrance side, respectively, of the rotary drum 51, are differentially operated so as to produce a period in which the travelling speed of the magnetic tape 50 is relatively low with respect to the magnetic head 52 even during high-speed tape travel. Since high-speed reproduction is carried out in this period, reproduction with a good quality is enabled even during high-speed tape travel.

Figure 3:
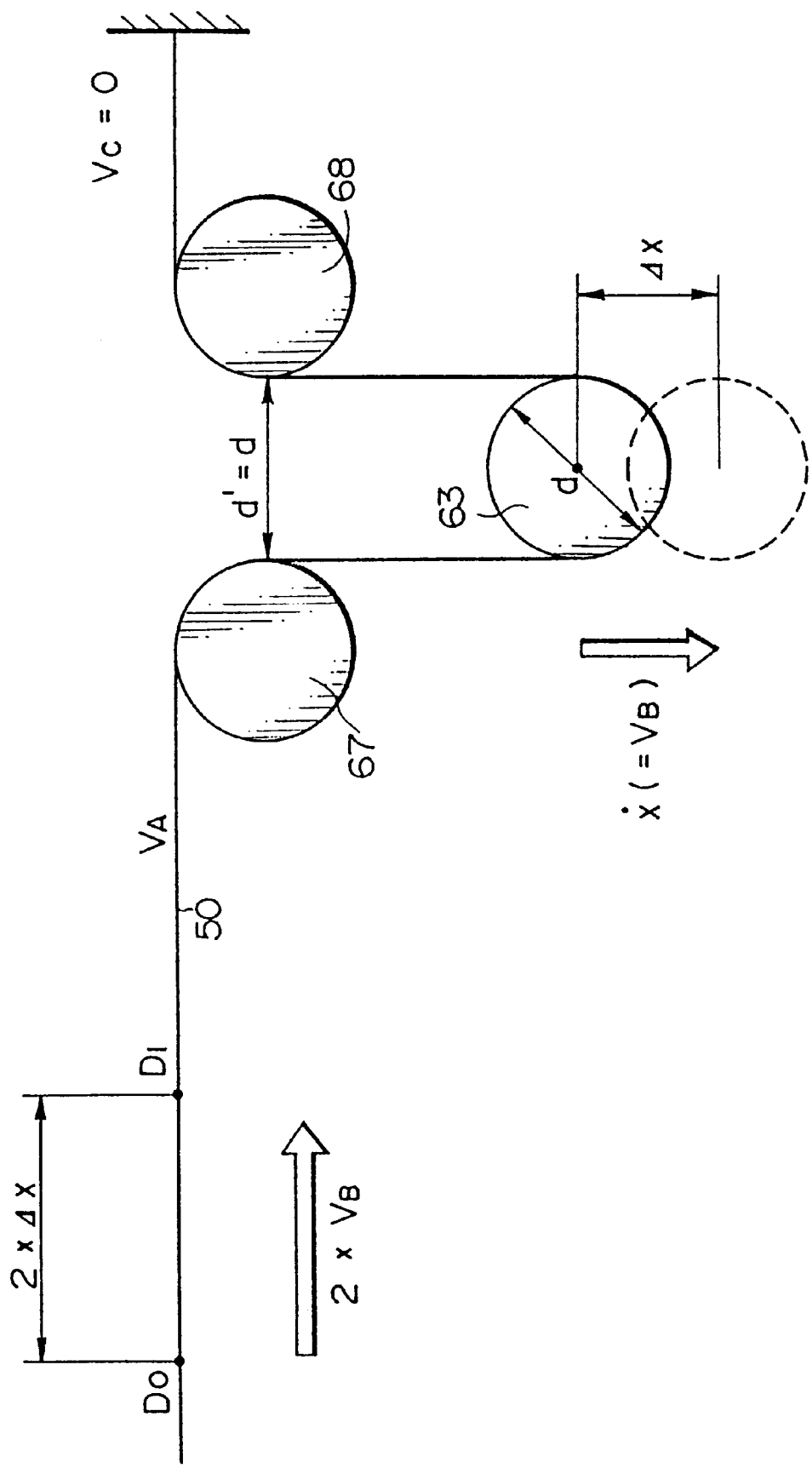
FIGS. 3 and 4 are explanatory views schematically showing a change in the tape travelling speed caused by the operation of a tape actuator in accordance with the present invention.

It is now assumed that the positional relationship between the fixed tape pass rollers 67, 68 and the movable tape pass roller 63 is such as that schematically shown in FIG. 3. In FIG. 3, the gaps d' between the two fixed tape pass rollers 67 and 68 is equal to the diameter d of the movable tape pass roller 63.

A static system will first be considered because it is easier to understand. It is here assumed that one end of the magnetic tape 50 is fixed and the movable tape pass roller 63 is moved by a distance Δx within a time Δt, as shown in FIG. 3. An arbitray point $D_0$ on the free end side of the magnetic tape 50 is moved to the point $D_1$ which is 2×Δx distant from the point $D_0$. Therefore, the moving speed of the point $D_0$ at that time is 2 times as high as that of the movable tape pass roller 63. In other words, if it is assumed that the speed of the movable tape pass roller 63 is $V_B$, the speed of the free end side of the magnetic tape 50 is 2×$V_B$. Since the movable tape pass roller 63 must pass through the gap between the two fixed tape pass rollers 67 and 68 for tape loading, as is clear from FIG. 1, the following relationship must hold:

d'>d.

However, if the difference between d and d' is Δd, Δd is preferably as small as possible. This is because as Δd becomes larger, the above-described linearity of the speed of the free end side of the magnetic tape 50 and the moving speed of the movable tape pass roller 63 is disturbed more and the controllability is deteriorated. Therefore, in the explanation of the principle of this embodiment, it is assumed that Δd=0 and the linearity holds, and in a later explanation, Δd will be taken into consideration.

The case in which the magnetic tape 50 is moved at a stationary speed by the capstan motor 59 will next be considered. Since the fixed end of the magnetic tape 50 is considered to move at a speed of $V_C$, the speed $V_A$ of the other end of the magnetic tape 50 is represented as follows:

$$V_A = V_C + 2 \times V_b.$$

The fixed tape pass rollers 73, 74 and the movable tape pass roller on the tape entrance side of the rotary drum 51 are also provided such that a similar relationship holds.

The relationship between the speed $V_B$ of the movable tape pass rollers 63 (the movable tape tension roller 69) and the speed $V_A$ of the magnetic tape on the rotary drum 51 shown in FIG. 2 is as described above.

Returning to FIG. 2, when the tape speed $V_C$ becomes higher than the dynamic track following (DTF) speed allowable to the head actuator in the rotary drum 51, which has been explained in the known systems, the movable tape pass roller 63 is moved in the direction of the relaxation of the magnetic tape 50 and the movable tape tension roller 69 is moved in the direction of the stretch of the magnetic tape 50 so as to lower the speed of the magnetic tape 50. In other words, by differentially operating the movable tape pass roller 63 and the movable tape tension roller 69 in the opposite phases by the same amount, the speed $V_A$ is lowered to a speed which allows the head actuator DTF for a constant period. Thus, it is possible to prevent a change in tension by moving the movable tape pass roller 63 and the movable tape tension roller 69 in the opposite phases by the same amount.

A method of controlling the speed $V_A$ of the magnetic tape 50 on the rotary drum 51 to the speed which allows the head actuator DTF and noiseless reproduction by driving the movable tape pass roller 63 and the movable tape tension roller 69 by the tape drawing actuator 61 and the tape tension actuator 62, respectively will now be described.

Figure 5:
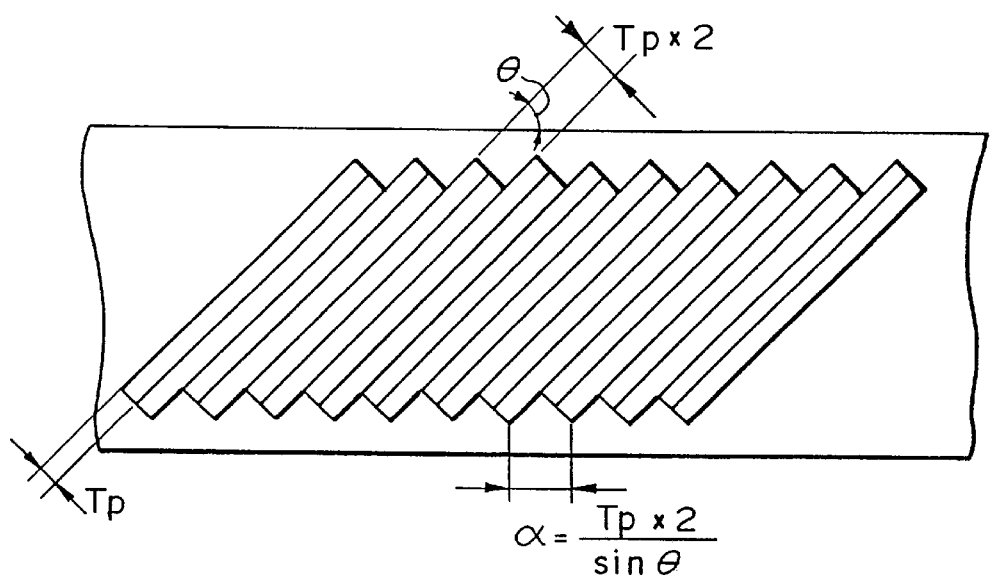
FIG. 5 schematically shows the recording track pattern of a VTR.

FIG. 5 schematically shows an example of a VTR recording format. If the magnetic tape speed at the time of normal-speed reproduction is v, v is represented by the following equation:

$$v = f\alpha \text{(m/sec)}$$

wherein f is the rotational frequency (Hz) of the rotary drum 50, and $$\alpha = \frac{2 \times T_p}{\sin\theta}$$

wherein $T_p$ represents a track pitch and θ represents a track angle.

If it is assumed that the tape speed V', which a conventional DTF servo system composed of the head actuator accommodated in the rotary drum 51 can follow, is n times as high as the normal speed, V' is represented by the following equation:

$$V' = nv (n \text{ is an integer})$$

As described above, when $V_C$>V', in other words, at the time of high-speed reproduction, the movable tape pass roller 63 and the movable tape tension roller 69 are moved in the opposite phases by the same amount at a speed of $V_B$ so as to intermittently lower the speed $V_A$ of the magnetic tape 50 on the rotary drum 51 to the speed V' which allows a conventional DTF system to follow. In this way, noiseless reproduction which is conventionally impossible in high-speed reproduction is intermittently enabled.

Figure 6:
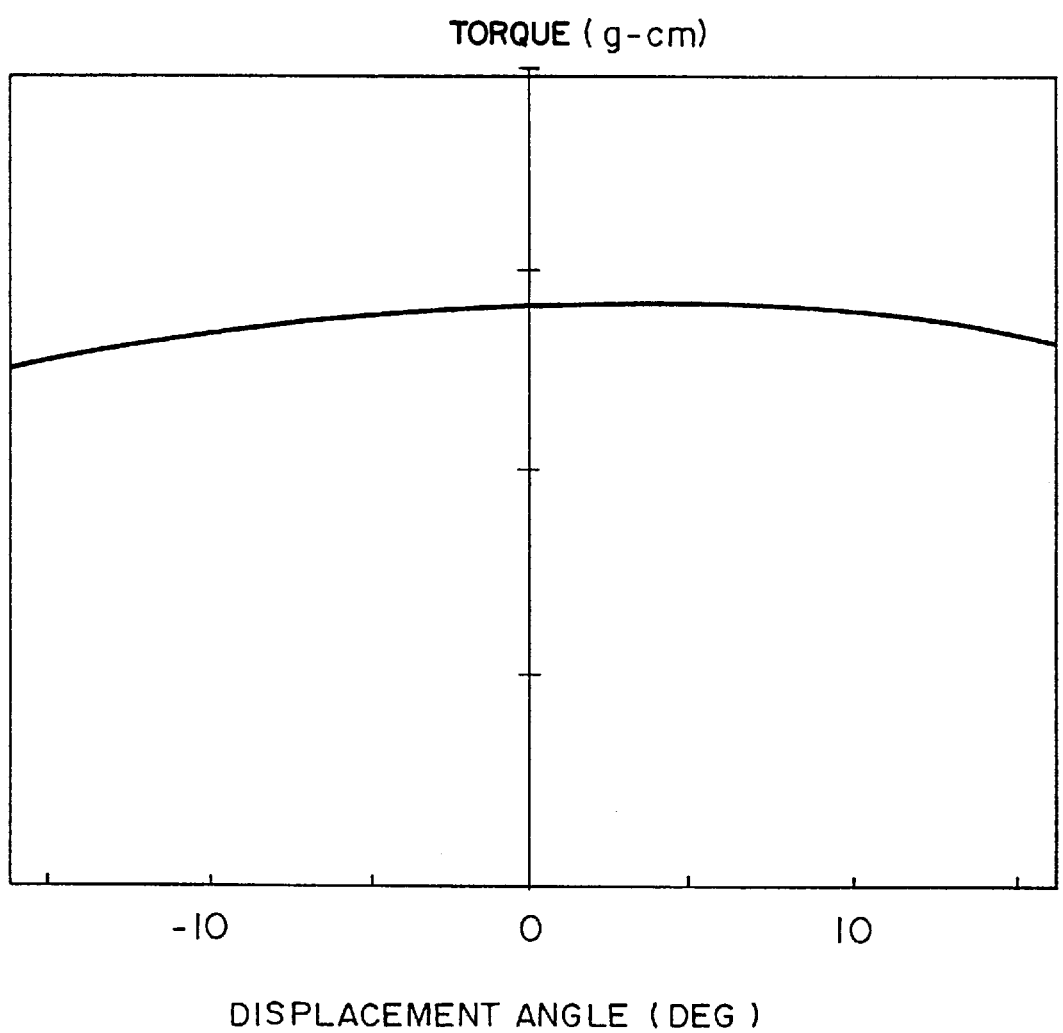
FIG. 6 shows the (displacement angle)/(torque) characteristic of a tape actuator according to the present invention.

Additionally, the characteristics of the displacement angles and the torques of the tape actuators 61, 62 have a slight nonlinearity, as shown in FIG. 6.

Figure 7A:
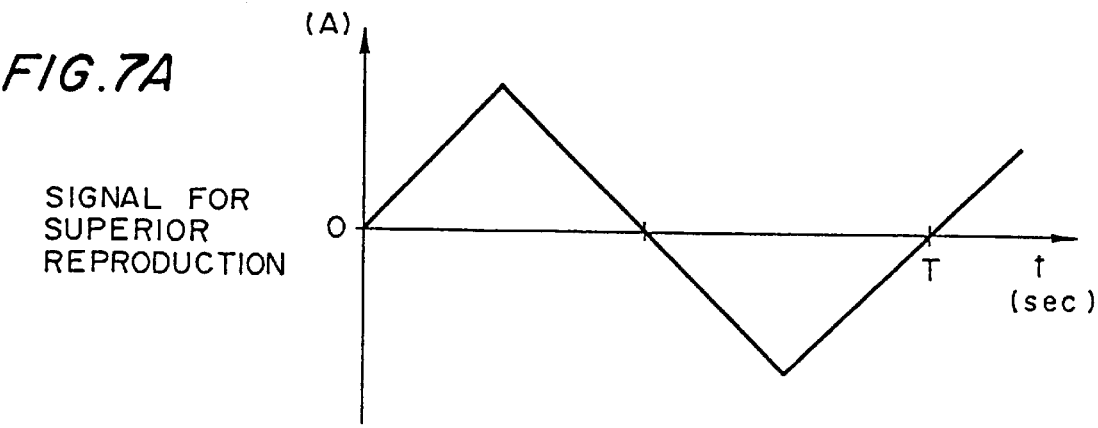
FIGS. 7A–7C are time charts showing the operation of each element at the time of high-speed noiseless reproduction.

The tape drawing actuator 61 and the tape tension actuator 62 are preferably driven at a speed $V_B$ by a triangular signal having a duty of 50% such as that schematically shown in FIG. 7A in order to prolong the reproduction-possible period as much as possible with consideration of the reduction ratio of the tape speed on the rotary drum 51.

Figure 7B:
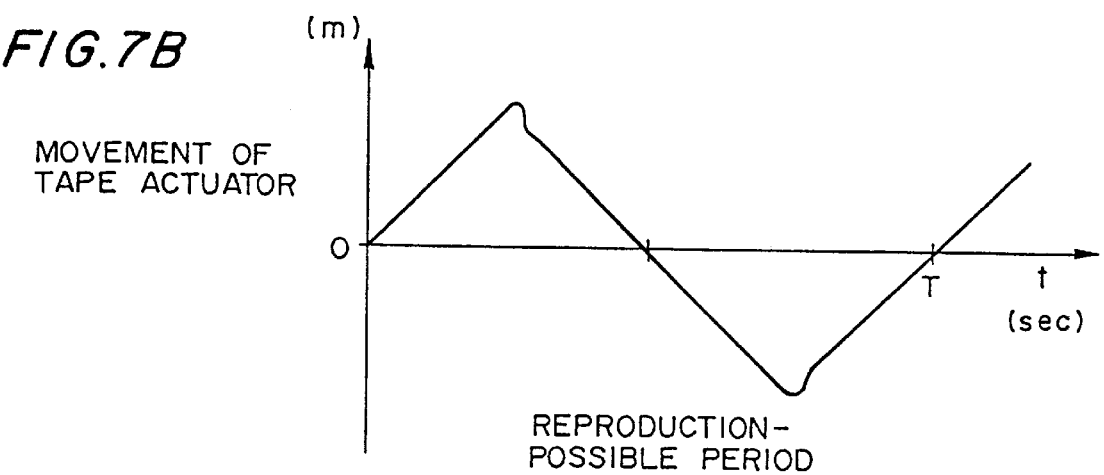
Figure 7C:
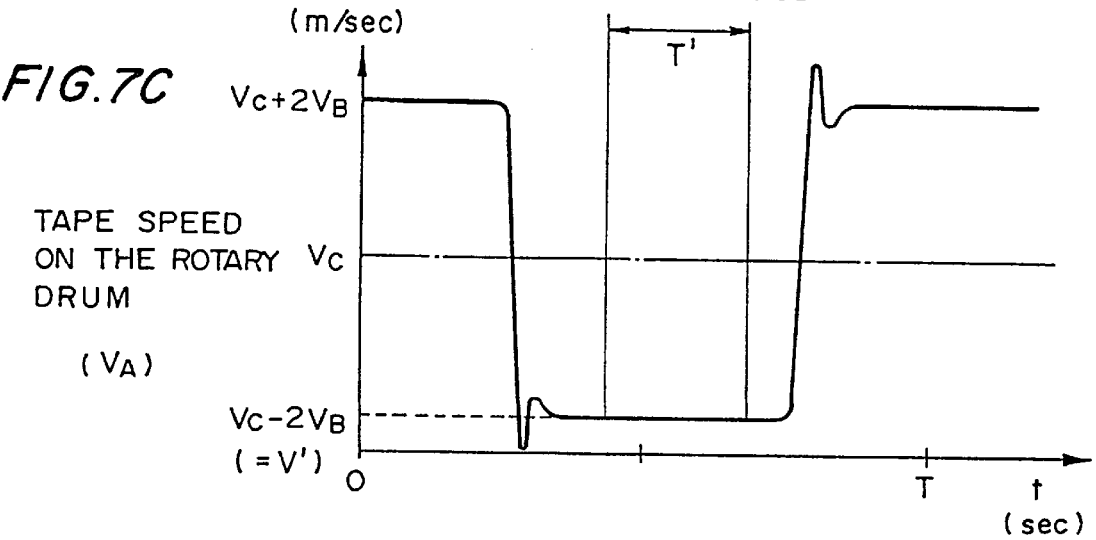

In this case, the speed $V_A$ of the magnetic tape 50 on the rotary drum 51 obtained from the above equation $V_A = V_C + 2|V_B|$ is such as that as schematically shown in FIG. 7C.

In FIG. 7C, if the tape speed $V_A$ on the rotary drum 51 is selected so that $V_A$ is V', which is the speed allowing the head actuator DTF, $V_A$ takes the minimum value, as represented by the following equation, which is the most efficient,:

$$V_A(\min) = V_C - 2 \times V_B = V'.$$

Figure 4:
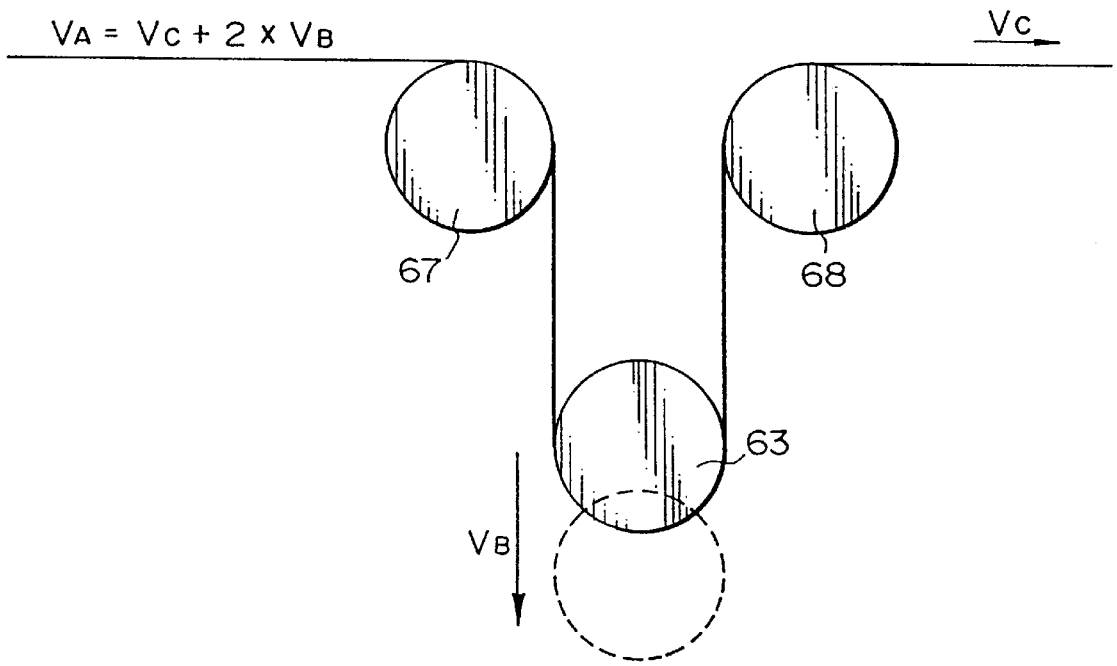

In this case, since $V_B$ is in the opposite direction in FIG. 4, it is represented by $-V_B$. At this time, the noiseless reproduction-possible period T', in other words, the period in which the rectangular wave $V_A<V'$ in FIG. 7C must be at least the period which enables the magnetic head 52 to reproduce one screen, namely, not less than 1/f second. Therefore, in order to enable reproduction of not less than one screen in the noiseless reproduction-possible period T', the one cycle time T of the rectangular wave shown in FIG. 7C must be an integral number of at least two times of the rotational frequency 1/f of the rotary drum 51. In this way, the tape actuators 61, 62 are driven synchronously with the rotation of the rotary drum 51.

From the explanation of the principle, it is understood that intermittent noiseless reproduction is possible at the time of high-speed reproduction. Full-time noiseless high-speed reproduction which is continuous without a pause of screen, although it is composed of a series of successive stop-frames, is also enabled by storing the noiselessly reproduced screens in a picture memory and outputting the stored pictures in a period in which noiseless reproduction is impossible.

Servo System for High-speed Reproduction

Figure 8:
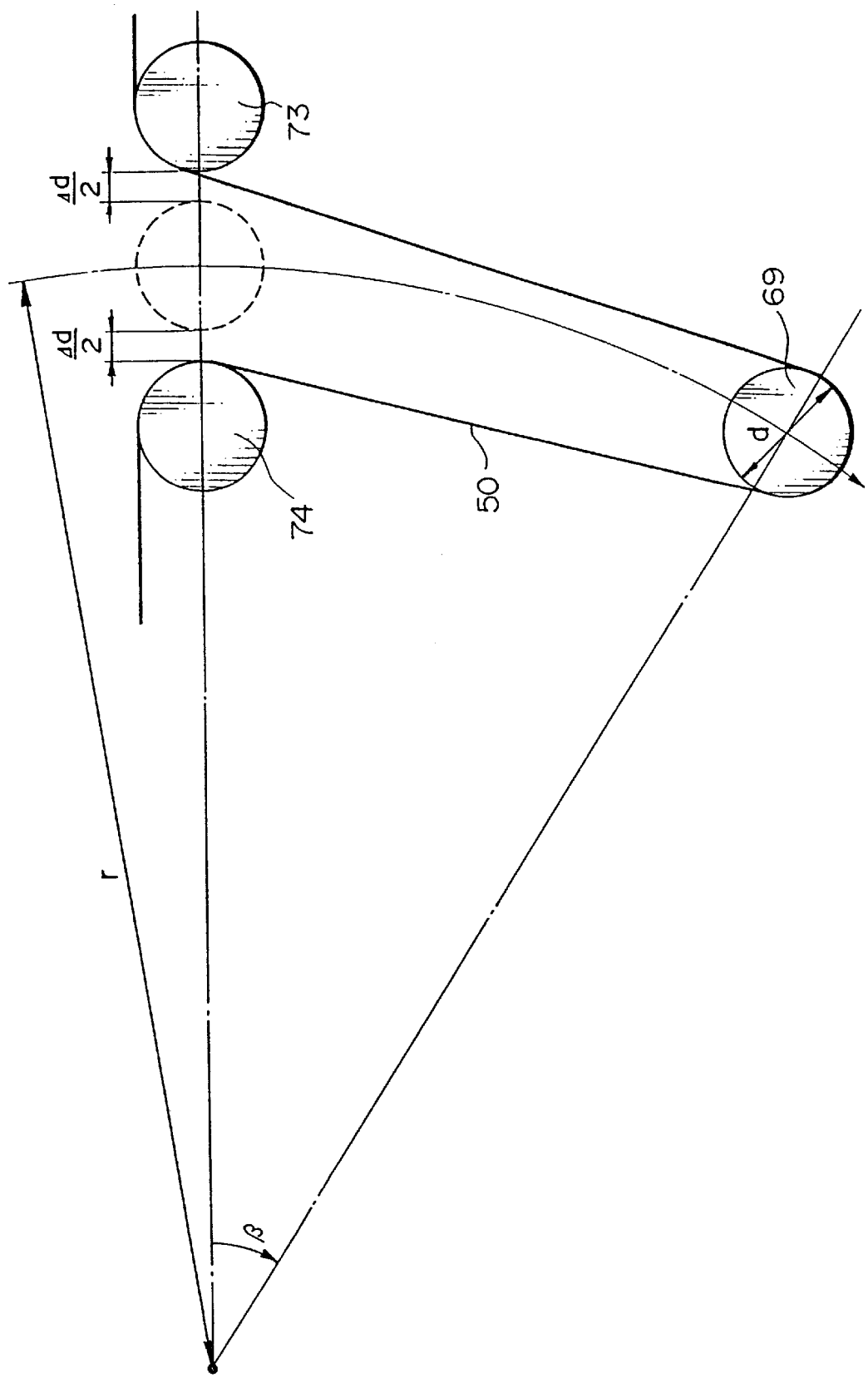
FIG. 8 schematically shows the mechanical positional relationship between the fixed tape pass rollers and the rotation axis of the movable tape pass roller and the tape actuator in accordance with the present invention.
Figure 9:
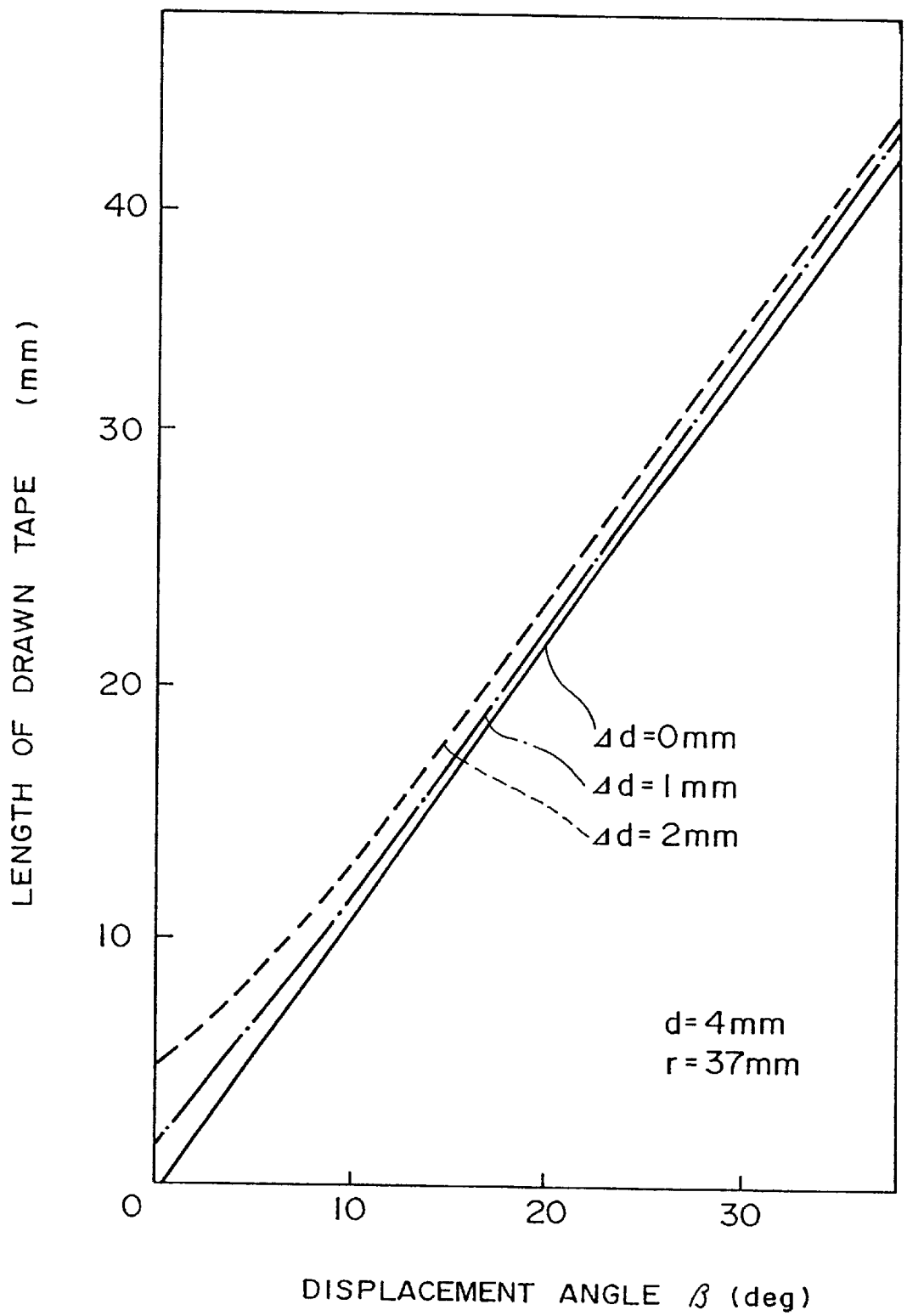
FIG. 9 shows the relationship between the displacement angle and the length of the drawn tape in FIG. 8.

The servo system in the magnetic recording and reproducing apparatus for realizing the above-described principle of operation will here be explained. As is obvious from FIG. 1, the tape drawing actuator 61 and the tape tension actuator 62 are composed of actuators which practice not linear motion but arcuate motion, as explained in the principle of operation. When the arcuate motion is approximated to linear motion, a nonlinear error is caused in this structure in principle. FIG. 8 schematically shows the positional relationship between the movable tape tension roller 69 (the movable tape pass roller 63) and the fixed tape pass rollers 73, 74 (67, 68) in the first embodiment in order to show this error. In FIG. 8, γ represents the length of the arm 70 (64) and β represents the displacement angle of the arm 70(64). The relationship between the displacement angle β of the movable tape tension roller 69 and the length of the drawn magnetic tape 50 when the relationship shown in FIG. 8 is satisfied is shown in FIG. 9. As shown in FIG. 9, in the ideal state wherein Δd=0 mm, an approximate linearity is obtained, but the larger Δd becomes, the more remarkable becomes the nonlinearity in the area in which the movable tape tension roller 69 is close to the fixed tape pass rollers 73, 74 (in the region in which the displacement angle β is 0 to 10° C. in FIG. 9). Accordingly, in this embodiment, Δd is set at 1 mm in the system so that the nonlinearity is almost negligible.

Figure 10:
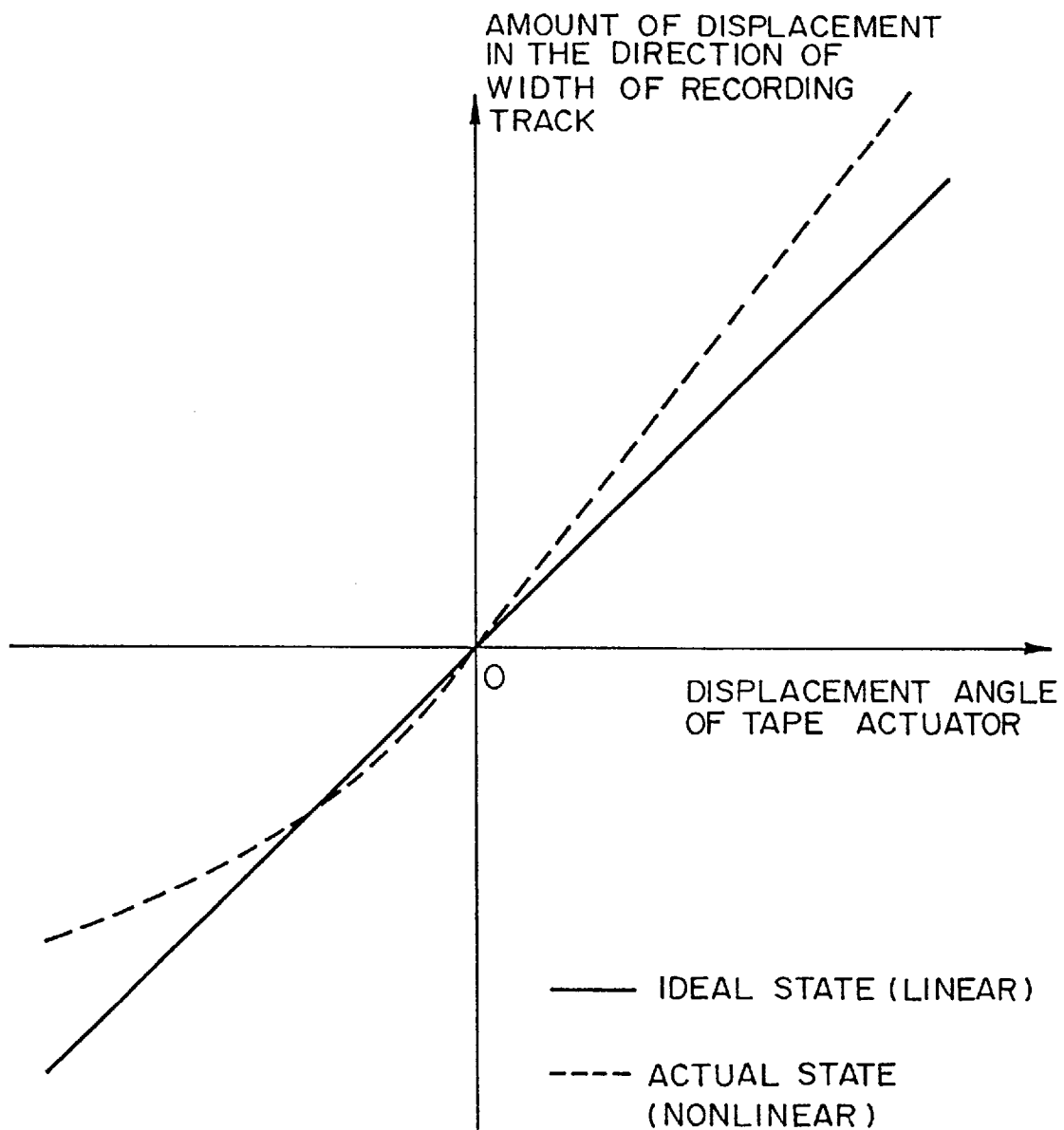
FIG. 10 shows the relationship between the displacement angle and the amount of displacement in the direction of the width of the recording track of the tape drawing actuator in the first embodiment.
Figure 11:
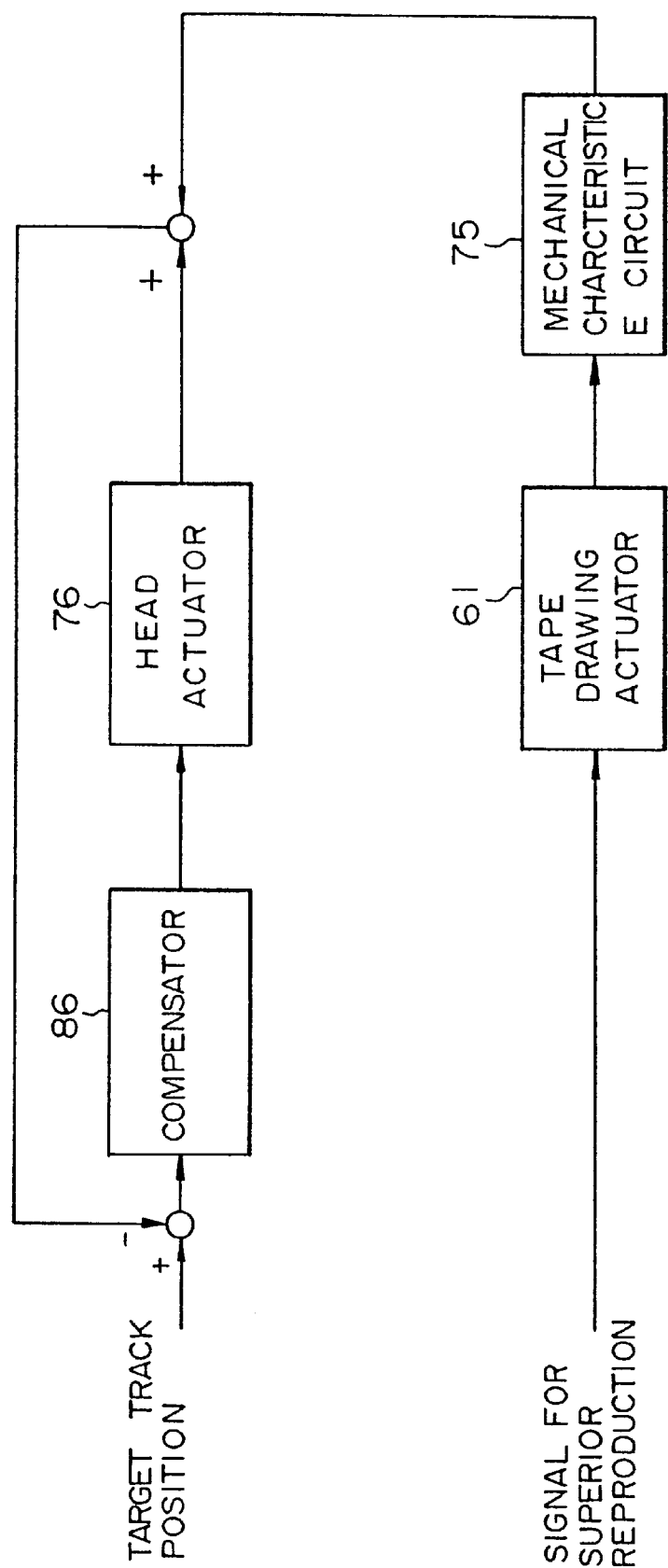
FIG. 11 is a block diagram of a tracking control system in superior reproduction in the case in which the ideal mechanical characteristics are obtained in accordance with the present invention.

It is, however, the general case that the nonlinear error increases due to the mechanical restriction of the tape deck or nonuniformity of the mechanical setting accuracy, so that it is necessary to take this nonlinear error into consideration in the control system. For example, as shown in FIG. 10, the nonlinear error is large in comparison with that shown in FIG. 9. When the mechanical characteristic E introduced from a circuit represented by 75 in FIG. 11 is nonlinear as shown in FIG. 10, there is a risk of the nonlinear error exceeding the range in which it is possible to correct the tracing of the head actuator 76 in the DTF control shown in FIG. 11. The present embodiment therefore requires a DTF control system in a wider dynamic range with a higher accuracy than in a conventional DTF control system.

To meet this requirement, in the present embodiment, the track range is corrected not only by a head actuator having a narrow dynamic range but also by tape actuators having a wide dynamic range.

Figure 12:
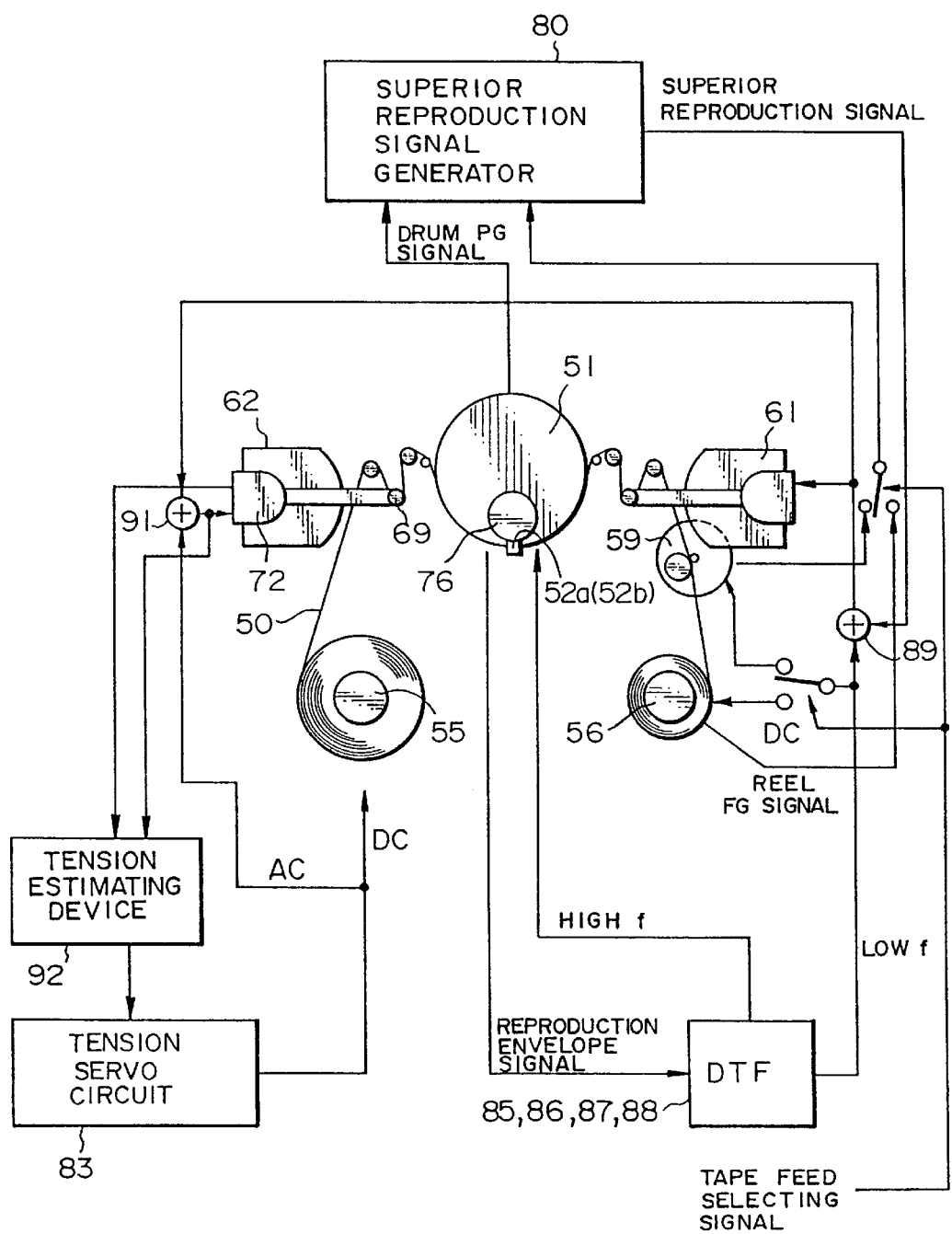
FIG. 12 is a block diagram of a servo system in the first embodiment.

FIG. 12 is a schematic block diagram of a servo system in the present invention.

FIG. 12 includes the concrete flow of signals in the apparatus shown in FIG. 1 which is subjected to high-speed reproduction control, DTF control and tension control.

The structure of DTF control will be briefly explained in the following discussion. An envelope signal reproduced by the magnetic heads 52a and 52b is supplied to a DTF circuit. The DTF circuit obtains a tracking error signal from the envelope signal and the high-frequency component thereof is fed back to the head actuator 76, the low-frequency component thereof is fed back to the tape drawing actuator 61 and the DC component thereof is fed back to the capstan motor 59 or the reel motor 56. In order to prevent a tension change caused by the DTF operation of the tape drawing actuator 61, a driving signal for the tape drawing actuator 61 is also supplied to the tape tension actuator 62 through an adder 91.

The structure of tension control will be briefly described in the following discussion. A movable roller position signal for detecting the position of the movable tape tension roller 69 and a driving signal supplied to the tape tension actuator 62 are supplied to a tension estimating device 92. The tension estimating device 92 estimates the tape tension on the movable tape tension roller 69 and outputs an estimated tension signal to a tension servo circuit 83. The tension servo circuit 83 compares the estimated tension signal with a reference tension signal to obtain a tension error signal. The low-frequency component of the tension error signal is fed back to the reel motor 55 and the high-frequency component thereof is fed back to the tape tension actuator 62.

The structure of high-speed reproduction control will be briefly explained in the following. A capstan FG signal (or a reel FG signal output while the reel motor is driven, for example at the time of high-speed reproduction) which indicates the tape travelling speed and a drum PG signal are supplied to a superior reproduction signal generator 80. The superior reproduction generator 80 generates a superior reproduction signal for operating the tape drawing actuator 61 and the tape tension actuator 62 from these two signals.

The details of each control will be described later.

The operation of the servo system will be explained in the following discussion. Normal-speed reproduction will first be explained. When the magnetic tape 50 travels at a normal reproducing speed, the superior reproduction signal generator 80 generates no correction pattern, so that the tape drawing actuator 61 is fixed at a predetermined position. The position of the tape drawing actuator 61 may preferably be either mechanically fixed or electrically fixed by a position controller with a closed loop constituted of a position sensor (not shown) provided on the tape drawing actuator 61.

The tape tension actuator 62 is fixed to a predetermined position in the same way as the tape drawing actuator 61, and exerts tension control for suppressing the change in the tension of the magnetic tape 50 and maintaining the tension at a constant value by a closed loop.

Since the tension control system is constituted by a closed loop, as described above, control in a wider frequency band than a conventional mechanical tension control is enabled and the performance of the tension control system is enhanced.

The details of the structure of the principle of tension control will be described later.

Since the DTF operation in the range in which the speed of the magnetic tape 50 is correctable by the head actuator 76 is completely the same as that in conventional high-speed superior reproduction, an explanation thereof will be omitted. In this case, the superior reproduction signal generator 80 generates no signal, either.

However, the present embodiment is different from the known systems because a tracking error is corrected by the cooperation of the head actuator 76 and the tape drawing actuator 61, so that DTF control having a wide dynamic range is realized.

The operation of the servo system in a high-speed range in which the speed of the magnetic tape 50 cannot be corrected by the head actuator 76, which is the main part of the present invention, will now be explained. When the apparatus is operated at a high speed which makes the correction of the speed of the magnetic tape 50 by the head actuator 76 impossible, noise bars or mosaics are displayed in the reproduced screen in a conventional apparatus.

In the present embodiment, by operating the tape drawing actuator 61 and the tape tension actuator 62 in accordance with the above-described principle of operation, the speed of the magnetic tape 50 on the rotary drum 51 is periodically lowered to a range in which the speed of the magnetic tape 50 is correctable by the head actuator 76. While the magnetic tape speed is in the range which enables the head actuator 76 to correct the tape speed, in other words, in the reproduction-possible period T', the amount of relative positional deviation between the recording track on the magnetic tape 50 and the magnetic head 52, namely tracking error, is corrected by a DTF control system which will be described in detail in FIG. 12. A tracking error signal is obtained by the known wobbling method, pilot method or the like. In this way, it is possible to obtain a good reproduced picture without a noise caused by off-track in the reproduction-possible period T'.

The reproduction-possible period T is at least 1/f second, as described in the explanation of the principle.

A superior reproduction signal for driving the tape drawing actuator 61 and the tape tension actuator 62 is output from the tape superior reproduction signal 80. The superior reproduction signal 80 detects the speed of the magnetic tape speed which cannot be corrected by the head actuator 76 from the inputs of a tape speed signal such as a capstan FG signal and a drum PG signal. On the basis of the principle described in the explanation of the principle, the superior reproduction signal generator 80 outputs a driving voltage pattern for operating the tape drawing actuator 61 and the tape tension actuator 62 so as to form a speed pattern such as that shown in FIG. 7C. In a period other than the reproduction-possible period T, since no reproduced picture is obtained, if a good picture reproduced in the reproduction-possible period T' is stored in a picture memory or the like in every cycle period, and the stored picture is output in a period other than the reproduction-possible period T', continuous high-speed reproduction is enabled. By this operation, a good reproduced picture free from noise, which is impossible in a conventional servo system, is continuously obtained, although it is composed of a series of successive stop-frames.

As described above, since the tape tension actuator 62 constantly keeps acting by a closed loop in a tape tension servo system in a wider range than a conventional mechanical actuator, the magnetic tape 50 is maintained at the optimum tape tension in any state. By virtue of this effect, the magnetic recording and reproducing apparatus of the present embodiment enables a good reproduced picture to be obtained in a wide tape speed range from a low speed to a high speed.

Figure 13:
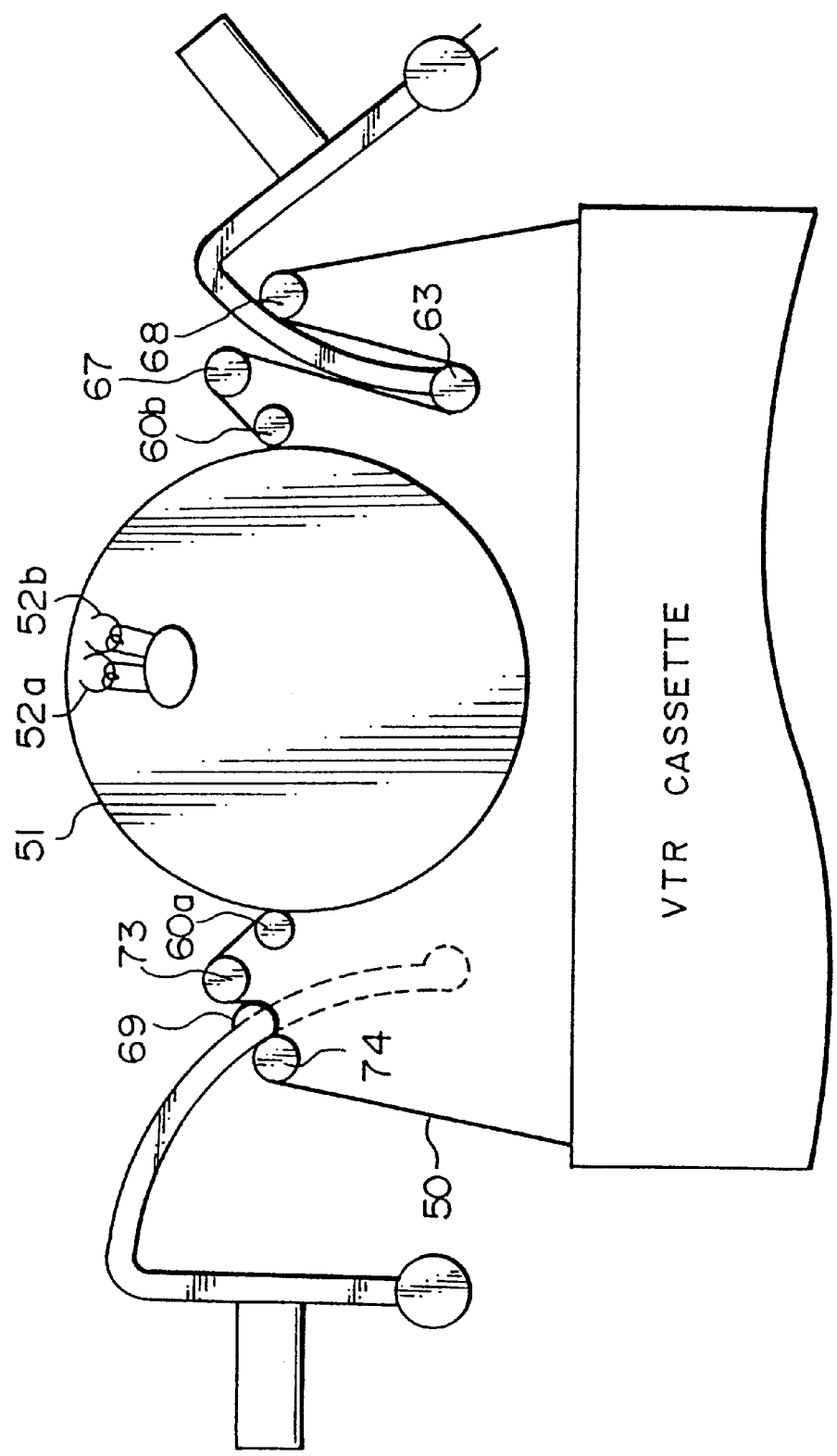
FIG. 13 schematically shows a modification of the tape actuators in accordance with the present invention.

The tape actuators 61, 62 may practice arcuate motion, as shown in FIG. 13.

DTF Control

The operation of DTF control according to the present embodiment will be explained in the following.

Figure 14:
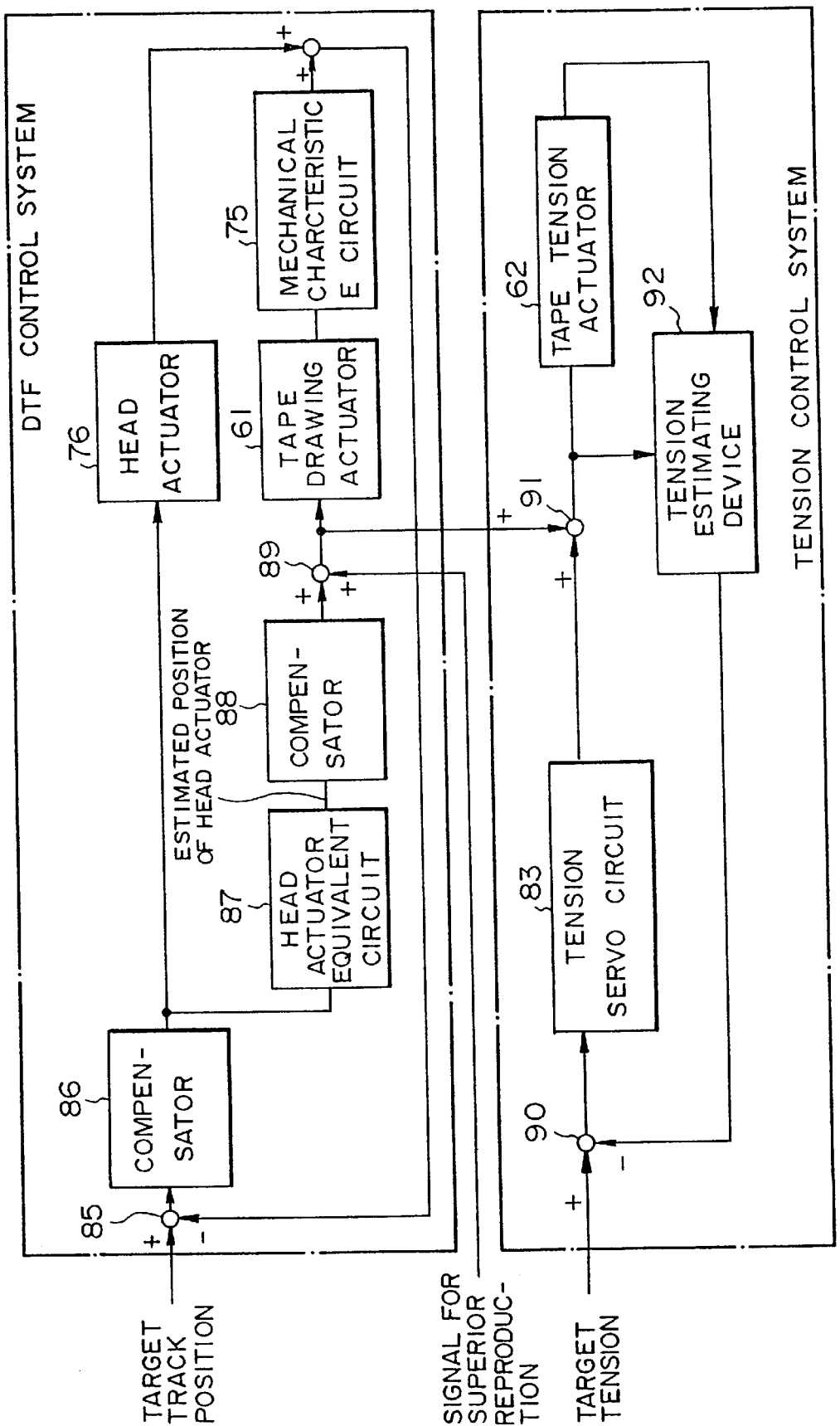
FIG. 14 is a block diagram of the DTF control system in the first embodiment.

FIG. 14 is a block diagram showing an example of DTF control. In the present embodiment, a tracking error signal is detected from a reproduction signal supplied from the magnetic head 52 in a pilot system shown in the related art, and the head actuator 76 and the tape drawing actuator 61 are electrically coupled for tracking control. In other words, a two-stage coupling control system is adopted in the present embodiment.

In FIG. 14, the DTF control outputs from the actuators 76 and 61 are added to the target track position by an adder 85 and a tracking error signal is supplied to both actuators 76 and 61 through a compensator 86.

The output of the compensator 86 is directly supplied to the head actuator 76 and simultaneously supplied to the tape drawing actuator 61 through a head actuator equivalent circuit 87, a compensator 88 and an adder 89. Therefore, the output of the equivalent circuit 87 indicates the value estimated by the head actuator 76. A signal for superior reproduction is supplied to the other input terminal of the adder 89.

The tension control system includes the tension estimating device 92 and the tension servo circuit 83 shown in FIG. 12. A tension estimating signal is supplied from the tension estimating device 92 to the tension servo circuit 83. A driving signal supplied to the tape drawing actuator 61 of the DTF control system is supplied to an adder 91 together with the output of the tension servo circuit 83.

The output of the adder 91 is supplied to the tape tension actuator 62 and output to the tension estimating device 92 for outputting an estimated tension which the tension roller of the tape tension actuator 62 receives from the tape. The output of the tension estimating device 92 is supplied to a subtracter 90.

The tension estimating device 92 electrically simulates the relationship between the input voltage of the tape tension actuator 62 and the displacement of the tape tension roller 69 by using the (input voltage)/(displacement) transfer characteristic in this embodiment.

Such a two-stage coupling control system is known, for example, as disclosed on pp. 203 to 208 of the transactions of Optical Memory Symposium '85 held on Dec. 12 to 13, 1985. In the field of optical disk tracking control, it is known as a control in a dynamic range.

In the field of tracking control of a VTR, however, a tracking error is conventionally corrected only by the head actuator 76 accommodated in the rotary drum 50, which makes such a two-stage coupling control system inapplicable. In the present embodiment, since the tape drawing actuator 61 is newly provided as a tracking error correcting device, application of a two-stage coupling control system is possible, so that DTF control in a wide frequency band and a wide dynamic range with a high accuracy is enabled.

In the embodiment shown in FIG. 14, the present embodiment is applied to a digital VTR. In a digital VTR, since the amount of recording information increases, high-density recording by narrowing the track pitch is essential in order to meet the demand for a higher picture quality, multifunctions, long-time recording and the like. The recording track generally has a nonlinearity of a track (hereinunder referred to as "track rolling") mainly caused by a mechanical factor. Since the track pitch becomes smaller than the amount of track rolling with such a reduction in the track width, in order to exactly trace the narrow track, DTF control having a controlled region at least 10 times as large as the fundamental frequency of the track rolling is required. The fundamental frequency of track rolling depends upon the rotational frequency of the rotary drum. For example, when the rotational frequency of the rotary drum is 1,800 rpm, the DTF control system is required to have a controlled region of not less than 300 Hz.

Figure 15:
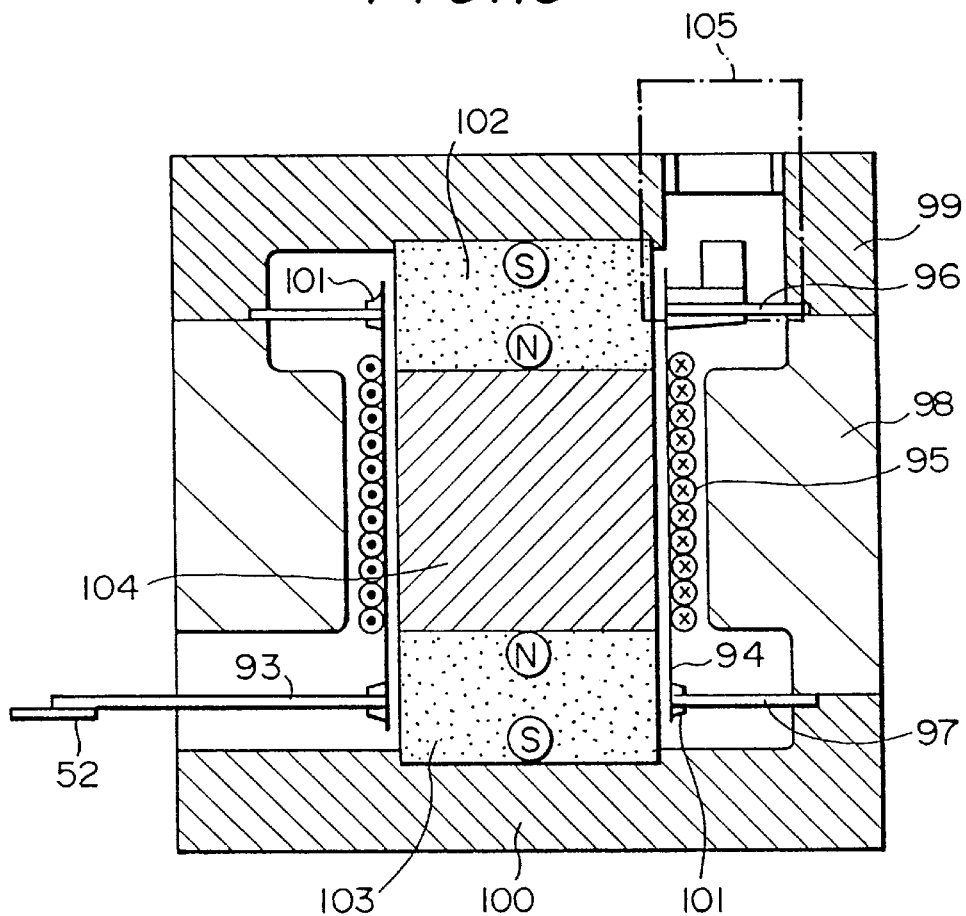
FIG. 15 is a sectional view of the structure of the head actuator in the first embodiment.

In order to have a wide controlled region, the head actuator 76 is required to have a good controllability. In this embodiment, an electromagnetic actuator shown in FIG. 15 is adopted.

The magnetic head 52 is supported by a coil bobbin 94 through a leaf spring 93, and an exciting coil 95 is wound around the coil bobbin 94.

The coil bobbin 94 is axially and movably supported at both ends by a cylindrical yoke 98 and discal yokes 99, 100 through gimbal springs 96, 97. A mounting member composed of a polymer material is provided at each joint between the gimbal spring 96 (97) and the coil bobbin 94.

Within the coil bobbin 94, cylindrical permanent magnets 102, 103 are fixed between the yokes 99 and 100, and a center yoke 104 is provided between both permanent magnets 102, 103.

Figure 85:
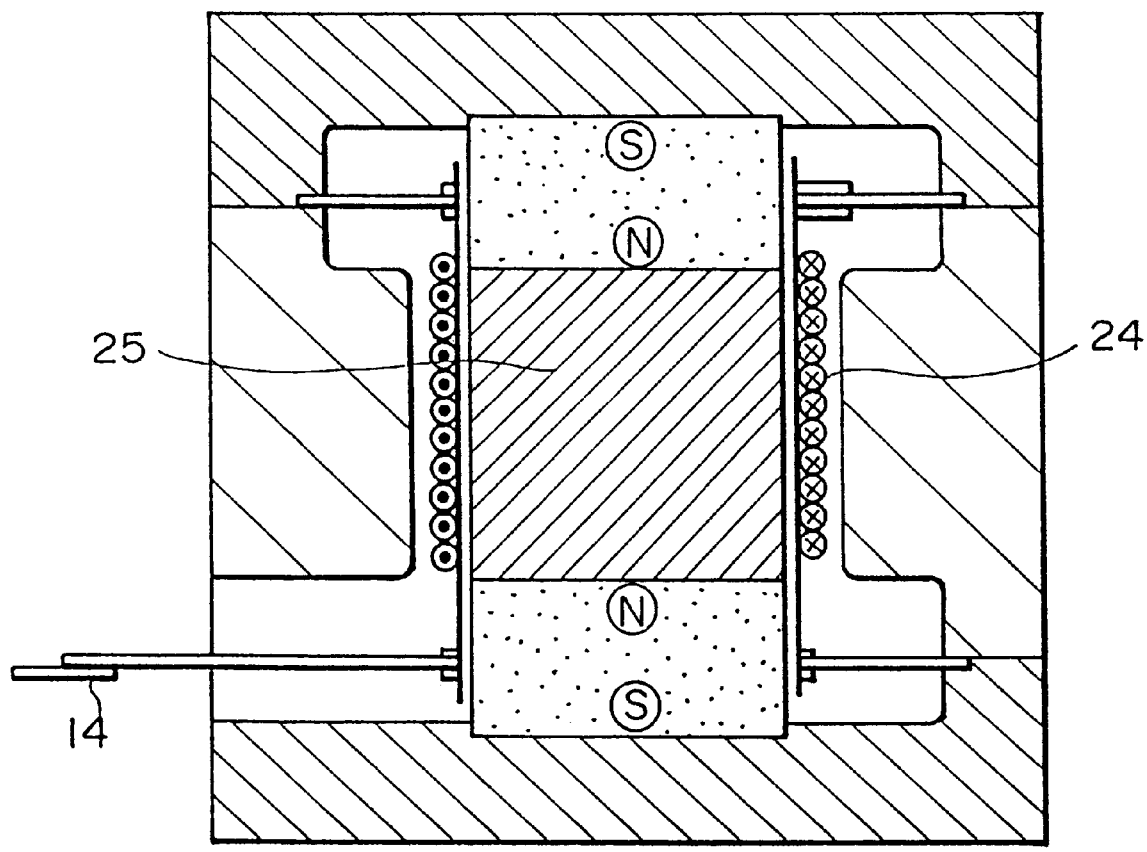
FIG. 85 is a sectional view of a conventional head actuator.
Figure 86:
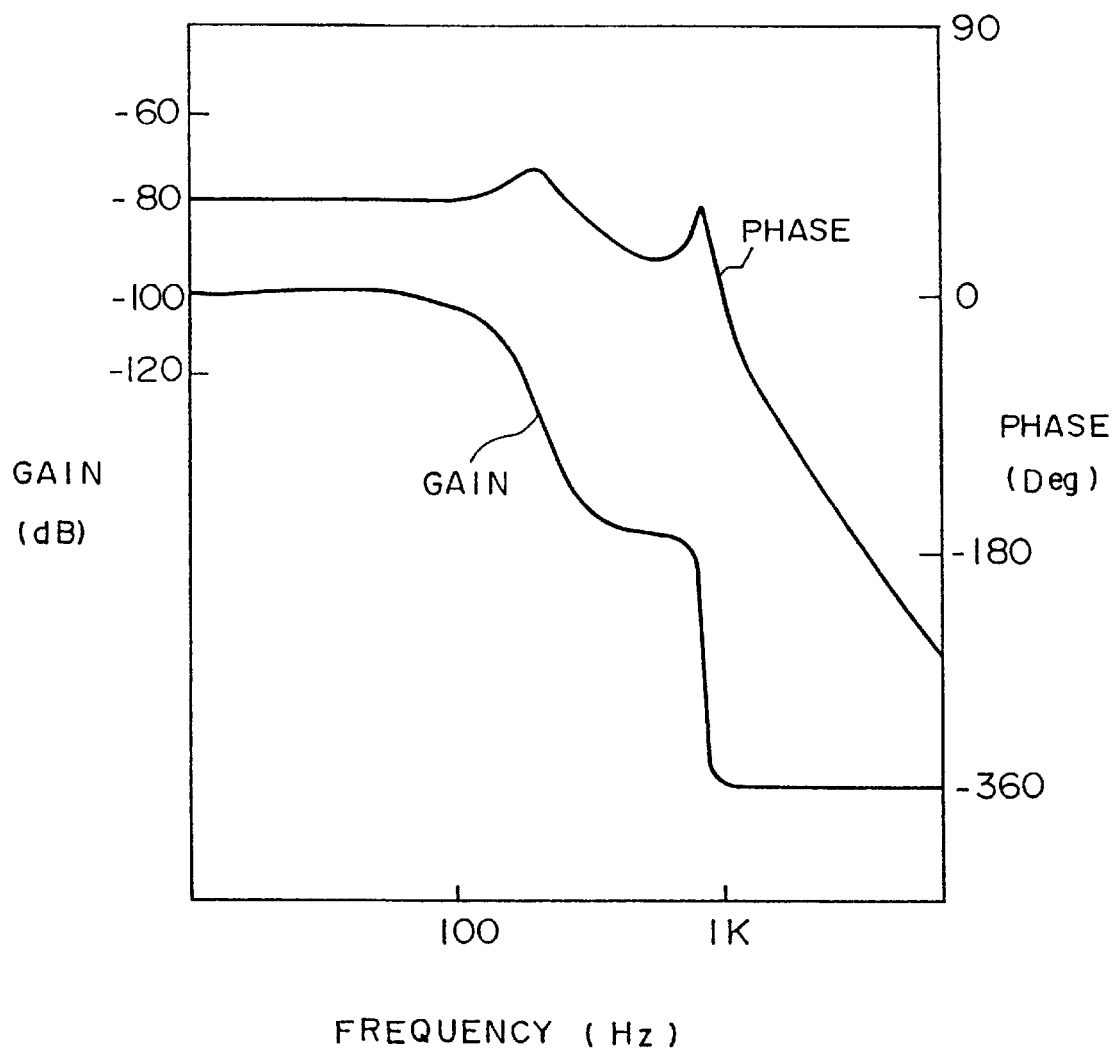
FIG. 86 shows the frequency characteristic of the head actuator shown in FIG. 85.
Figure 87:
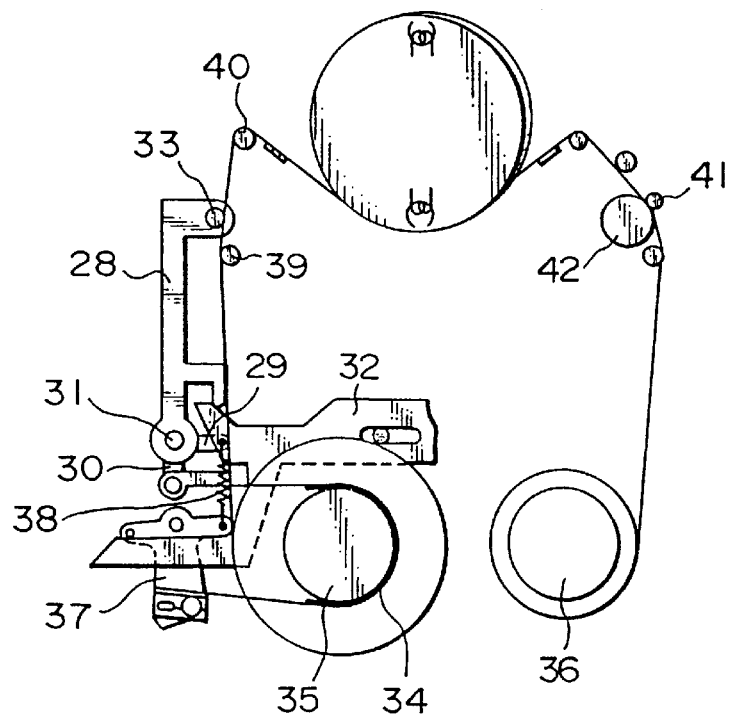
FIG. 87 shows the structure of another magnetic tape travelling system in a conventional VTR.
Figure 88:
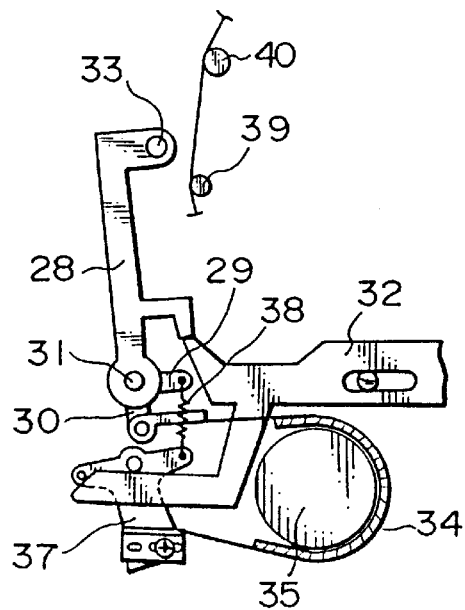
FIG. 88 shows the structure of the tension control system in the VTR shown in FIG. 87.

Thus, the magnetic head actuator 76 having the above-described structure can move the head 52 as desired by appropriately controlling the exciting current applied to the exciting coil 95 in the same way as in a conventional actuator shown in FIG. 85.

As is clear from FIG. 15, a magnetic head position detector 105 constantly detects the position of the head 52 optically or electromagnetically.

In FIG. 15, although a bimorphous cell or other elements may be used as the head actuator 76 so long as it has a good controllability, since this embodiment is applied to a publicly used digital VTR, an electromagnetic actuator is adopted with importance attached to inexpensive inexpensiveness and high reliability characteristics. Even if an electromagnetic actuator is used, coexistence of DTF controllability and superior reproducibility is impossible, as described in the known systems. The electromagnetic actuator in this embodiment has a structure giving priority to DTF controllability. By increasing the elastic modulus of the gimbal springs 96, 97 shown in FIG. 15, the primary mechanical resonance frequency is heightened, for thereby obtaining a characteristic that the phase is flat 0° up to a frequency of about 1 KHz. However, when the elastic modulus of the gimbal springs 96, 97 is increased in this way, the resonance peak gain is increased, for thereby deteriorating the controllability. To prevent this, in this embodiment, the position information on the movable portion of the head actuator is detected by the head position detector 105, as shown in FIG. 15. The position signal and the driving voltage for the head actuator 76 are input to a speed estimating device composed of a circuit which electrically simulates the (input voltage)/(displacement) transfer characteristic of the head actuator 76, and the speed of the movable portion of the head actuator 76 is estimated. The estimated speed is negatively fed back to the exciting coil 95 for electrical damping. Thus, the head actuator 76 functions as an actuator having a good controllability up to a high frequency band.

By using such an actuator as the head actuator 76, a DTF control system which is capable of DTF control in a wide frequency band with a high accuracy is indeed realized, but since the elastic modulus of the gimbal springs is increased as a result of attaching importance to DTF controllability, a large current is required when the actuator is driven at a large amplitude, and problems, such as the generation of heat at that time, limit the tolerable amplitude to a narrow range. In other words, the dynamic range is narrowed.

Figure 16:
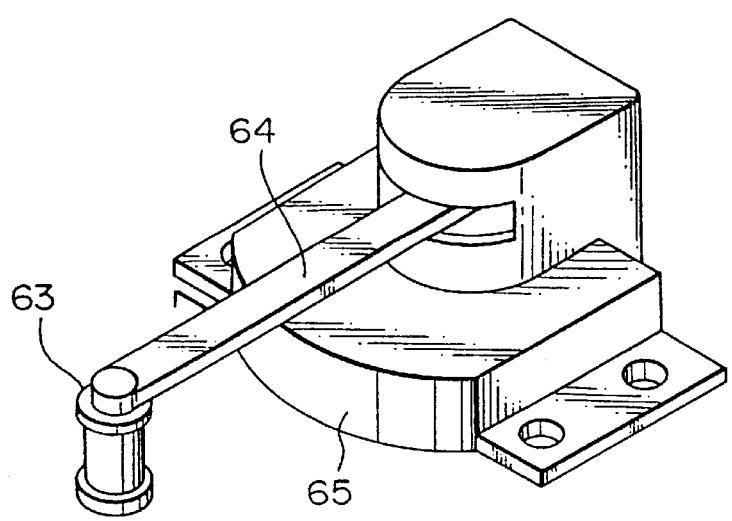
FIG. 16 schematically shows a tape actuator in accordance with the present invention.
Figure 17:
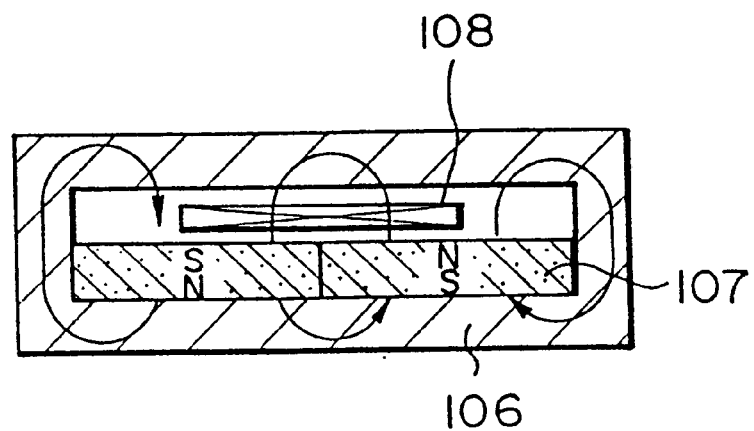
FIGS. 17 and 18 schematically show the magnetic circuit explaining the principle of driving the tape actuator.

As a countermeasure, in the present embodiment, the head actuator 76 compensates mainly for a small amplitude in a high-frequency band of a tracking error, while the newly provided tape drawing actuator 61 compensates for a large amplitude in a low-frequency band of a tracking error. The tape drawing actuator 61 is designed as a voice coil type electromagnetic driven actuator which has no support spring, as shown in FIG. 16, so as to have a large low-frequency gain. The tape drawing actuator 61 has a similar structure to a magnetic circuit which has been put to practical use as a swing arm actuator, which is a tracking arm actuator of a hard disk driving apparatus. FIG. 17 shows the magnetic circuit of the tape drawing actuator 61, FIG. 18 shows the principle of driving the tape drawing actuator 61 and FIGS. 19(a1), (a2) and (a3) and 19(b1), (b2) and (b3) are sectional views of the tape drawing actuator 61 according to first and second embodiment.

The roller arm 64 is rotatably supported by a yoke 106 of the driver 65, and a permanent magnet 107 is fixed to the yoke 106 as illustrated in the FIG. 19(a) embodiment.

Figure 18:
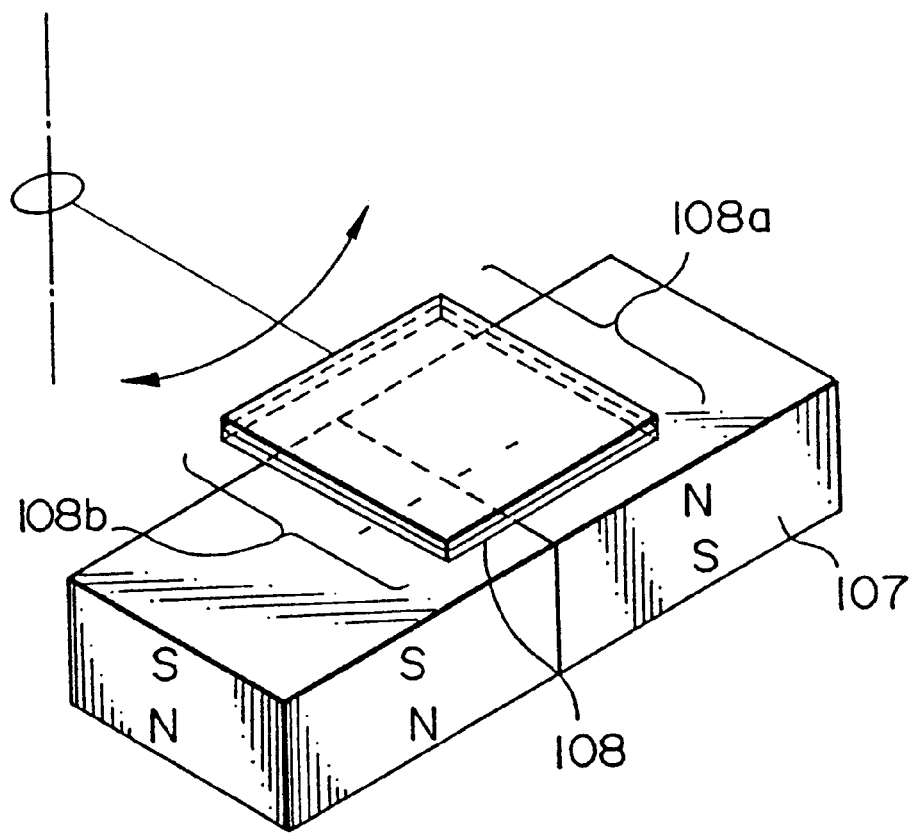

As is clear from FIGS. 17 and 18, the permanent magnet is magnetized such that the directions of magnetization are opposite on left and right sides. A movable coil 108 is fixed to one end of the roller arm 64 and is movable perpendicularly relative to the direction of the magnetization of the permanent magnet 107, as illustrated in the FIGS. 19(a1), (a2) and (a3).

In this way, by supplying an appropriate current to the coil 108, it is possible to rotate the moveable tape pass roller 63 to any given position by the electromagnetic action of the coil 108 and the permanent magnet 107.

In the FIGS. 19(b1), (b2) and (b3), permanent magnet 107 is fixed to one end of roller arm 64 and coil 108 is fixed to yoke 106. The manner in which the tape drawing actuator of the FIG. 19(b1), (b2) and (b3) operates is similar to and would be understood in view of the FIG. 19(a1), (a2) and (a3), and thus is not described further.

In FIGS. 17, 18 and 19 the magnetized tape drawing actuator 61 is shown, and it is preferable that the tape tension actuator 62 has a similar structure.

Figure 20:
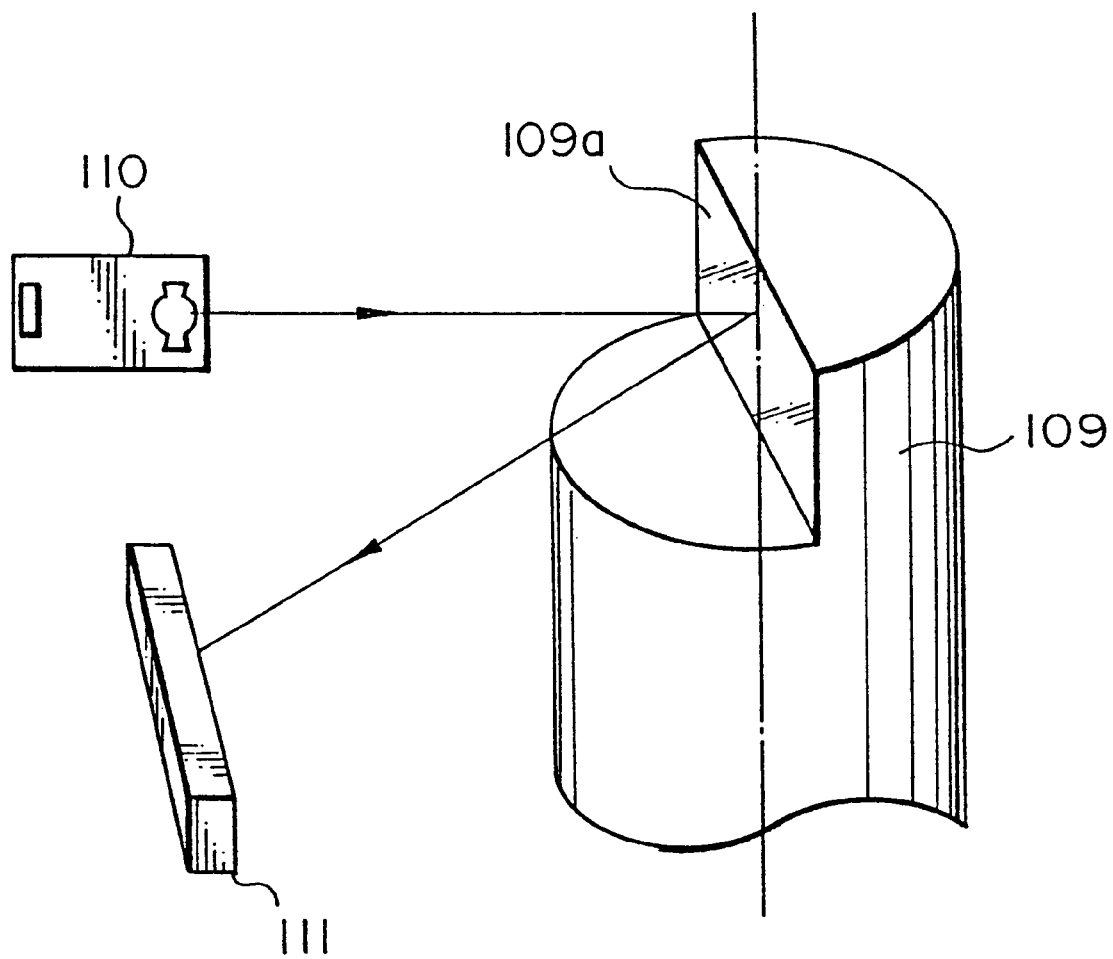
FIG. 20 shows an example of a position sensor of the tape actuator in the first embodiment of the present invention.

FIG. 20 shows an example of an actuator roller position sensor. In FIG. 20, a rotary shaft 109 of the actuator is provided with a mirror surface portion 109a. The light from a light emitting device 110 is reflected by the mirror surface portion 109a and is received by a light receiving device 111.

The light emitting device 110 is preferably composed of a combination of a laser oscillator and a collimator or the like.

As is obvious from FIG. 20, the rotational angle of the rotary shaft of the tape drawing actuator 61 is detected by the light receiving device 111, for thereby making it possible to know the position of the moveable tape pass roller 63.

Figure 21:
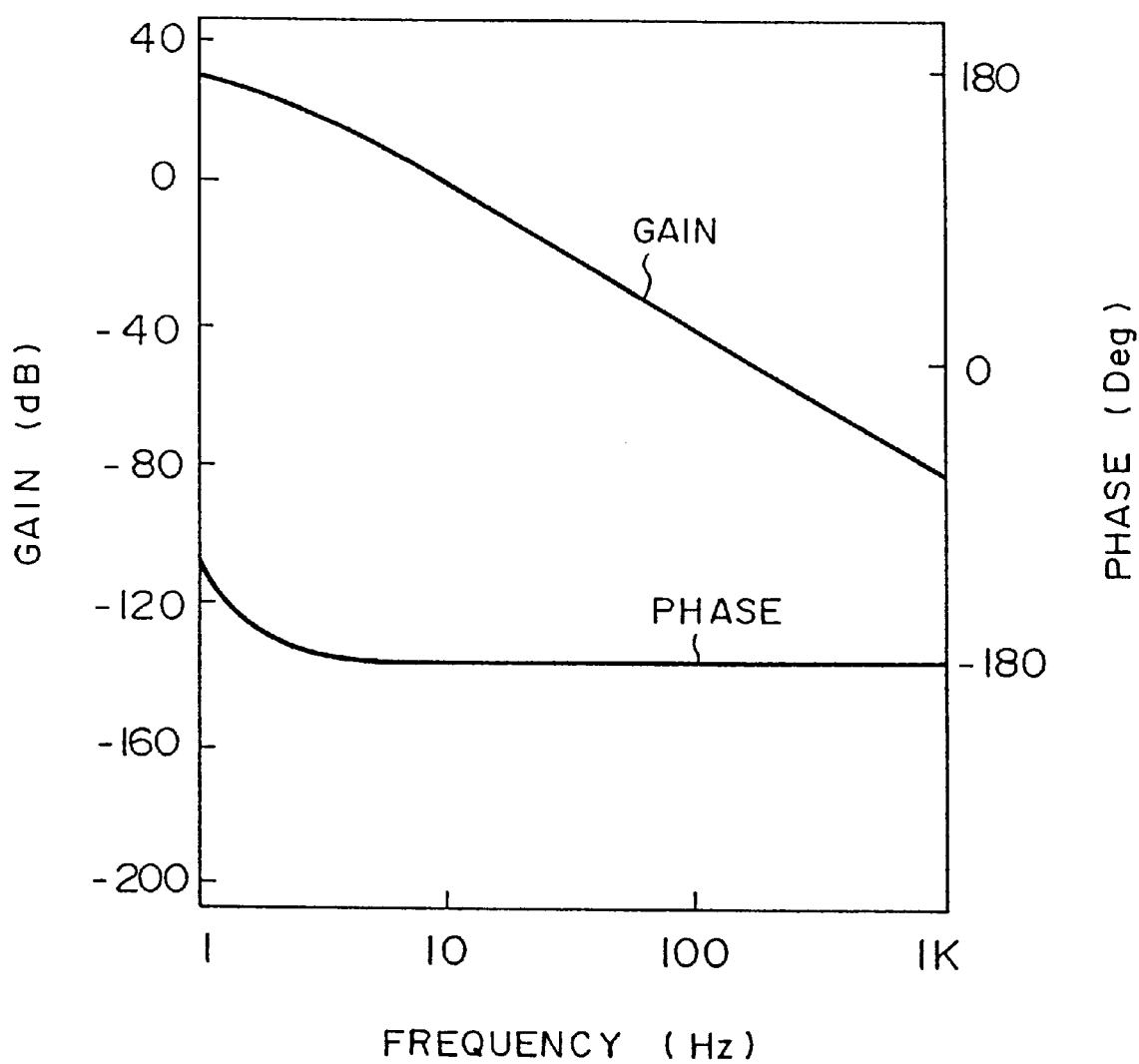
FIG. 21 shows the frequency characteristic of the tape actuator in accordance with the present invention.

The torque characteristic of the tape actuator having the above-described structure is almost flat irrespective of the displacement angle, as shown in FIG. 6. The (displacement angle)/(voltage) frequency characteristic of a tape actuator is free from a mechanical resonance up to a high frequency band, as shown in FIG. 21, so that the actuator has a good controllability.

In the present embodiment, the head actuator 76 and the tape drawing actuator 61 are controlled by a common control system for correcting a tracking error. The coupling frequency of the two-stage coupling control (the frequency at which the gains of the control loops of both actuators become equal) is determined as follows. The fundamental frequency of a tracking error caused by a nonlinearity error due to the mechanical characteristic E during high-speed superior reproduction which requires a wide dynamic range is mainly determined by the frequency of the driving pattern of the tape drawing actuator 61. Since the tape drawing actuator 61 is driven by a frequency synchronous with the rotational frequency of the drum, e.g., a triangular signal having a frequency of X Hz during high-speed superior reproduction, as described above, the amplitude of a low-frequency component of a tracking error of not more than X Hz becomes large, so that this component must be mainly corrected by the tape drawing actuator 61 having a wide movable range.

For this reason, the coupling frequency is set in the vicinity of X Hz in this embodiment. In this embodiment, X=7.5. In other words, by selecting the common frequency in this way, it is possible to assign a high-frequency component of a tracking error mainly to the head actuator 76, which has a high high-frequency followability and a low-frequency component of a tracking error mainly to the tape drawing actuator 61 which has a large low-frequency torque and a high low-frequency followability. In this way, in a two-stage coupling control system, two actuators simultaneously follow one controlling target and the controllability for following the target is divided into two parts depending upon the frequency band. Therefore, when the phase difference of the actuator control systems is 180° at the coupling frequency, the total gain becomes −∞ dB (antiresonance is caused). In this embodiment, the system is stabilized by the structure in which the movement of the tape drawing actuator 61 follows the movement of the head actuator 76 and the amount of phase compensation at the coupling frequency is determined by pole-positioning.

Figure 22:
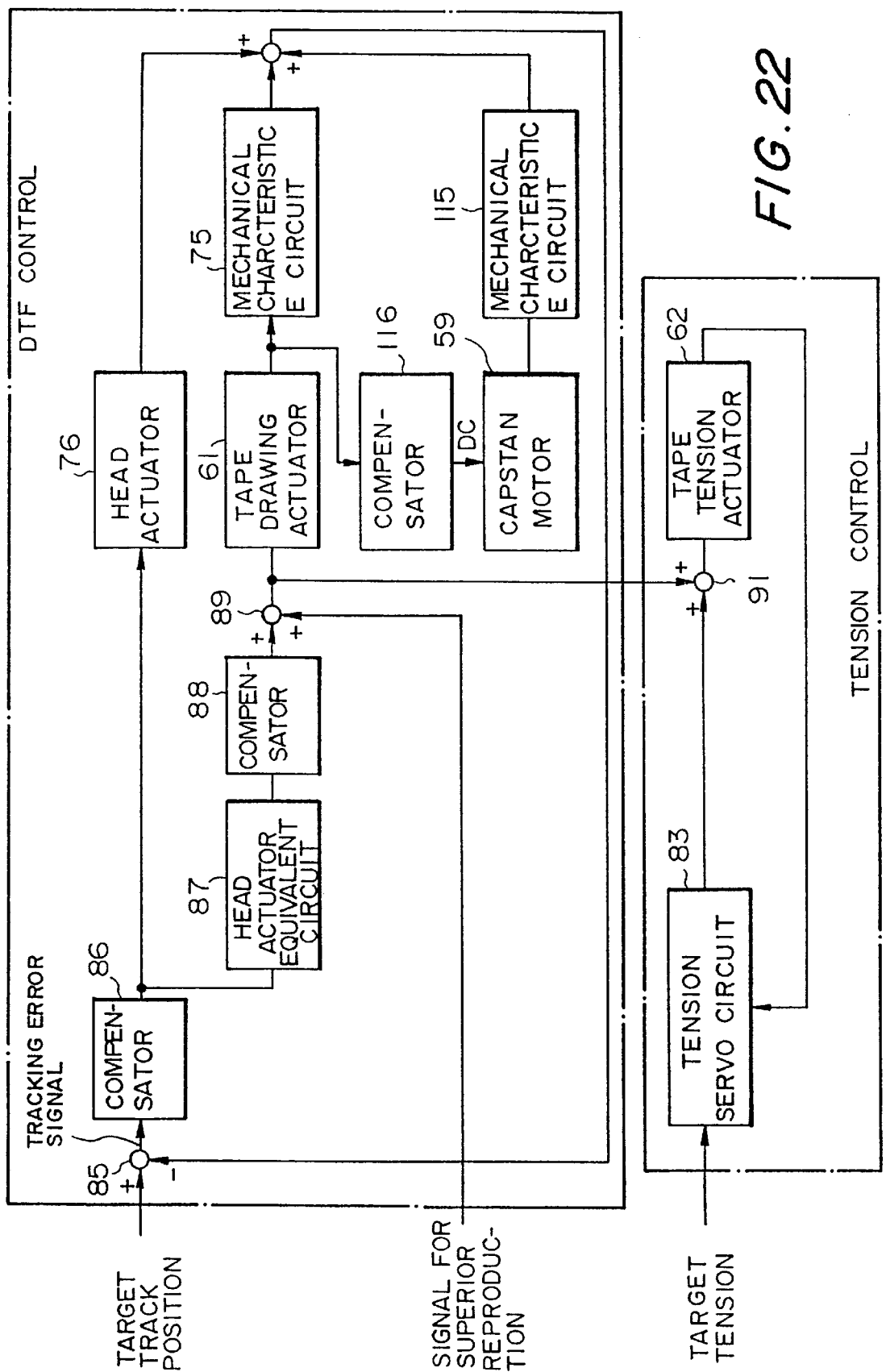
FIG. 22 is a block diagram showing another example of the DTF control system.

In the control system shown in FIG. 14, since the DC component or the low-frequency component of a tracking error signal is corrected only by the tape drawing actuator 61, the amount of correction is sometimes restricted. FIG. 22 shows an example of a control system in which the correction of a low-frequency component is assigned to the tape drawing actuator 61 and the capstan motor 59 or the reel motor 56. In this control system, the position of the movable tape pass roller 63 is detected and the DC component of the deviation of the detected position from the reference position (e.g., the center point of the movable range) is fed back to the capstan motor 59 or the reel motor 56. By this structure, the two actuators 76, 61 of the two-stage coupling system are constantly operated within the respective movable ranges.

Operation of DTF control

The principle of DTF control has been described above. The operation thereof will now be described with reference to the block diagram shown in FIG. 23, which is obtained by rewriting the DTF control system shown in FIG. 14.

Figure 23:
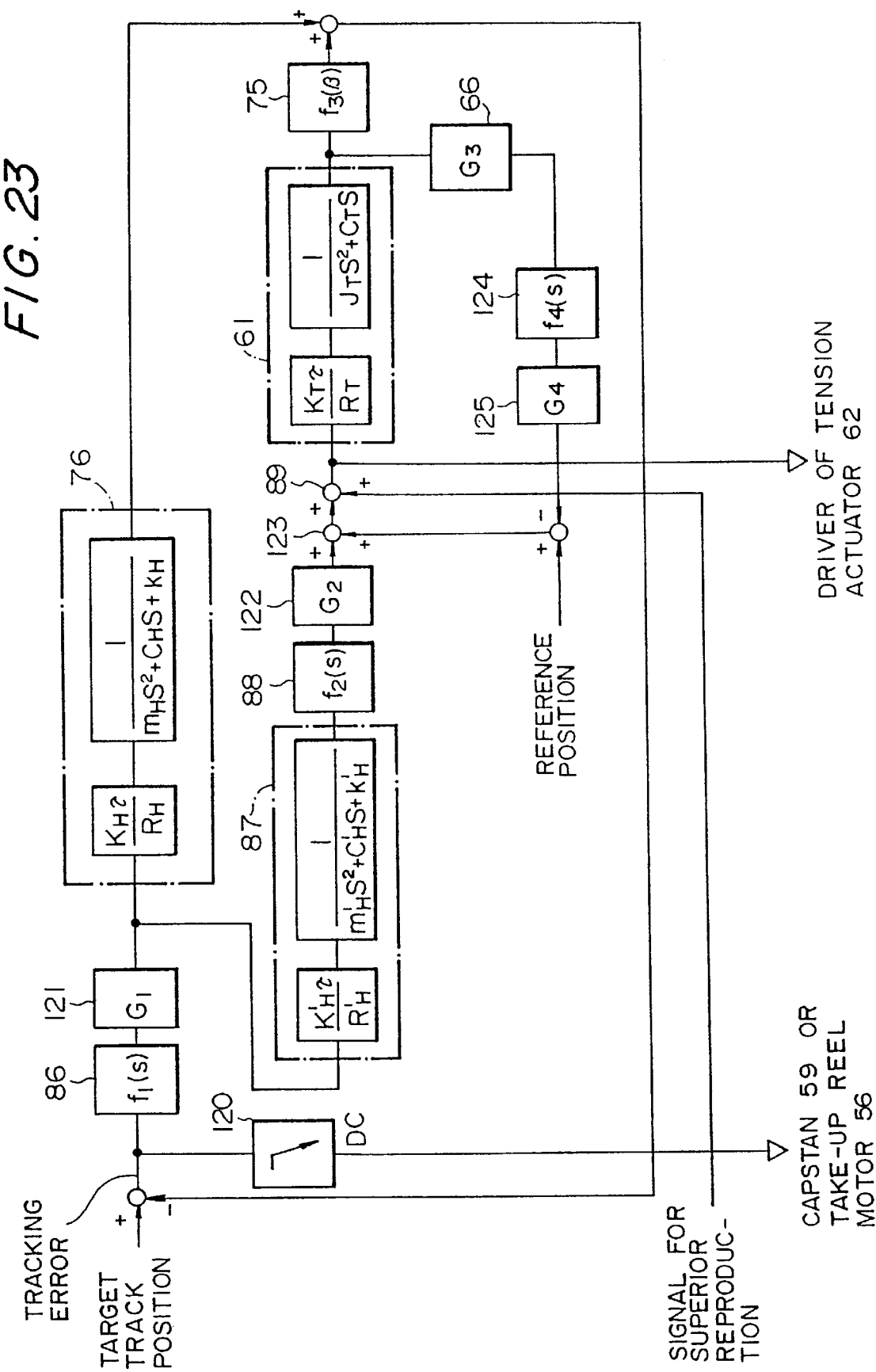
FIG. 23 is a block diagram of a DTF control circuit in the present invention which is represented by transfer functions.

FIG. 23 is a block diagram of DTF control in this embodiment of the present invention which is represented by transfer functions. The symbol s represents a Laplace operator.

In FIG. 23, the reference numeral 120 represents a transfer function circuit as a means for separating a tracking error signal into a low-frequency component and a high-frequency component. The high-frequency component is fed back to the DTF control system and a low-frequency component is fed back to the capstan motor 59 or the reel motor 56. The reference numeral 86 is a transfer function circuit representing a compensation filter, which is a primary low pass filter represented by the following equation:

$$f_1(s) = \frac{1}{1 + T_1 S}.$$

The reference numeral 121 is a transfer function representing the gain of an amplifier for adjusting the servo gain for DTF control. The head actuator 76 is represented by a transfer function circuit representing the (input voltage)/(displacement) transfer characteristic. The symbols $KH_r$, $R_T$, $m_H$, $C_H$ and $R_H$ are transfer functions representing a torque constant, coil resistance, mass of the movable portion, viscosity coefficient and elastic modulus, respectively. The reference numeral 87 is a transfer function circuit representing the filter electrically simulating the frequency characteristic of the head actuator 76 and represents an equivalent circuit of the head actuator 76. The reference numeral 88 is a transfer function circuit representing a compensator, which is a read lag filter represented by the following equation;

$$f_2(S) = \frac{1 + n_2 T_2 S}{1 + T_2 S}.$$

The reference numeral 122 is a transfer function representing a gain of an amplifier. The tape tension actuator 61 is represented by a transfer function circuit for the (input voltage)/(displacement angle) characteristic. The symbols $KH_r$, $R_T$, $J_T$ and $C_T$ are transfer functions representing a torque constant, coil resistance, inertia of the rotary portion and viscosity coefficient of the rotary portion respectively. The reference numeral 75 is a nonlinear function of the rotational angle β which represents the relationship between the displacement angle of the tape drawing actuator 61 and the amount of displacement thereof in the direction of the width of the recording track, shown in FIG. 10. If the tape drawing actuator 61 is used in a narrow range in which the rotational angle is restricted, for example, in the vicinity of the point at which the displacement angle of the dt and the amount of displacement thereof in the width of the recording track are $\beta_0$, $f_3$ (β) can be approximated to $$\frac{d f_3(\beta_0)}{d \beta} = \text{constant}.$$

A position sensor 66 is represented by a transfer function circuit for the gain of the sensor representing the (input voltage)/(displacement angle) characteristic. The reference numeral 124 is a transfer function circuit representing a compensation filter for stabilizing the position control loop for electrically fixing the position of the tape drawing actuator 61. The compensation filter is a read lap filter represented by the following equation:

$$f_4(s) = \frac{1 + n_4 T_4 S}{1 + T_4 S}.$$

The reference numeral 125 is a transfer function representing the gain of an amplifier for determining the loop gain of the position control loop.

Figure 24:
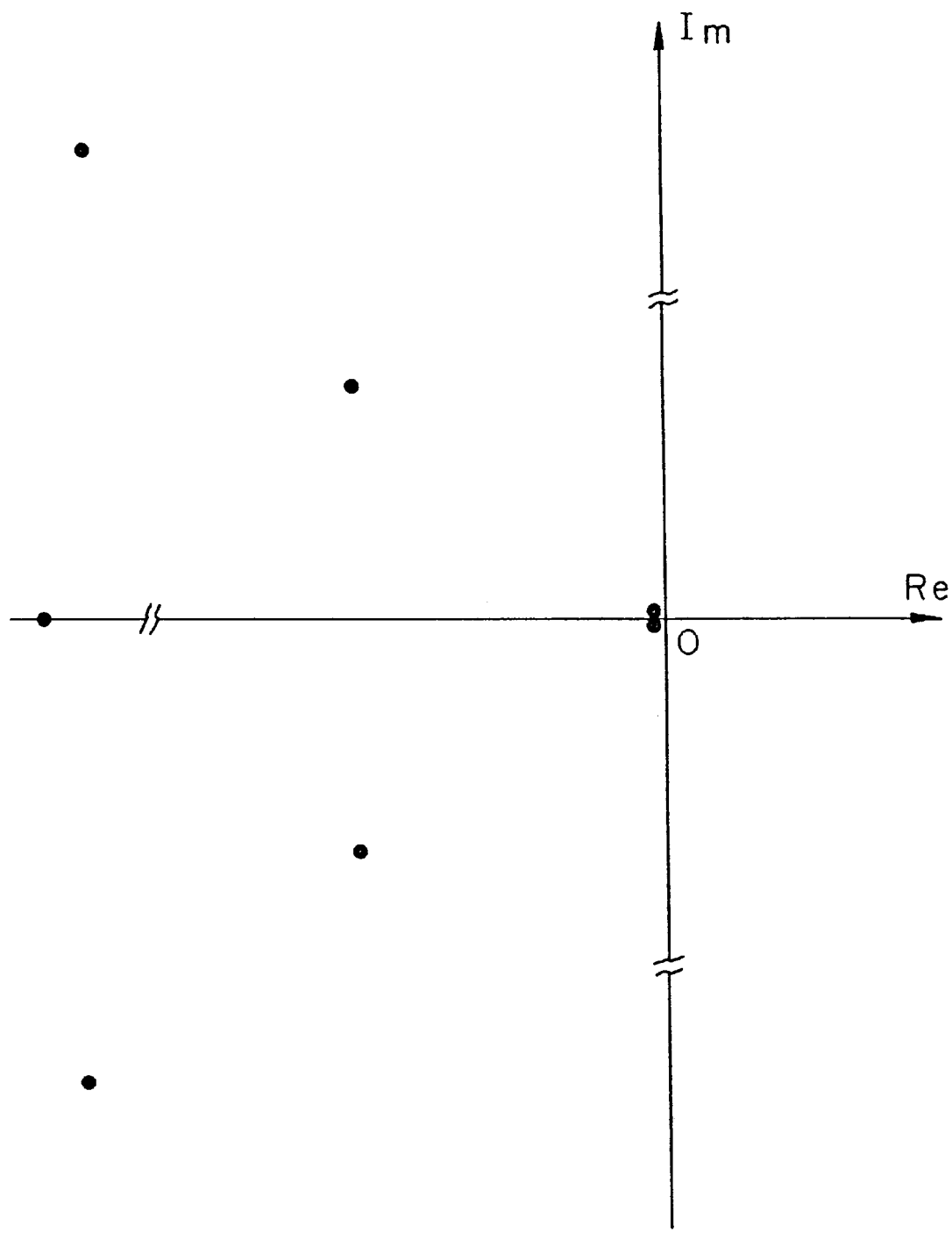
FIG. 24 shows the pole-positioning in the DTF control system in accordance with the present invention.

A tracking error signal obtained from a reproducing signal of the magnetic head by a pilot system is passed through the low pass filter 120 in which the cut-off frequency is several Hz, and the low-frequency component is fed back to the capstan motor 59 or the reel motor 56. Simultaneously, the phase of the tracking error signal is compensated by the compensator 86 composed of a primary delay filter having a low frequency in which the cut-off frequency is several Hz and the tracking error is amplified by the amplifier 121. The amplified tracking error is supplied to the drive amplifier (not shown) of the head actuator 76 so as to drive the head actuator 76. As a result, the magnetic head 52 is moved and the first control loop is closed. The output of the amplifier 121 is input to the head actuator equivalent circuit 87, which is a filter electrically simulating the (input voltage)/(displacement) characteristic of the head actuator 76, and a secondary delay filter in this embodiment in which the cut-off frequency is the primary resonance frequency of the head actuator 76. The output signal is supplied to the compensator 88 so that the two-stage control loop including the first control loop is stabilized. For example, this signal is supplied to the compensator 88 composed of the filter represented by the following equation:

$$f_2(S) = \frac{1 + n_2 T_2 S}{1 + T_2 S}.$$

wherein the transfer functions $T_2$ and $n_2$ are so determined that all the poles of the control system shown in FIG. 24 are disposed in the region of the negative real axis (convergent pole-positioning). The output of the compensator 88 is amplified by the amplifier 122 to a gain which enables the output to couple with the first loop at X Hz and is supplied to a drive amplifier (not shown) through an adder 123 of the position control loop of the tape drawing actuator 61 and the adder 89 for a signal for superior reproduction so as to drive the tape drawing actuator 61. As a result, the magnetic tape 50 is moved in the direction of travel through the mechanical characteristic E circuit 75 shown in FIG. 14 and the second control loop is closed so as to correct the tracking error.

Figure 25:
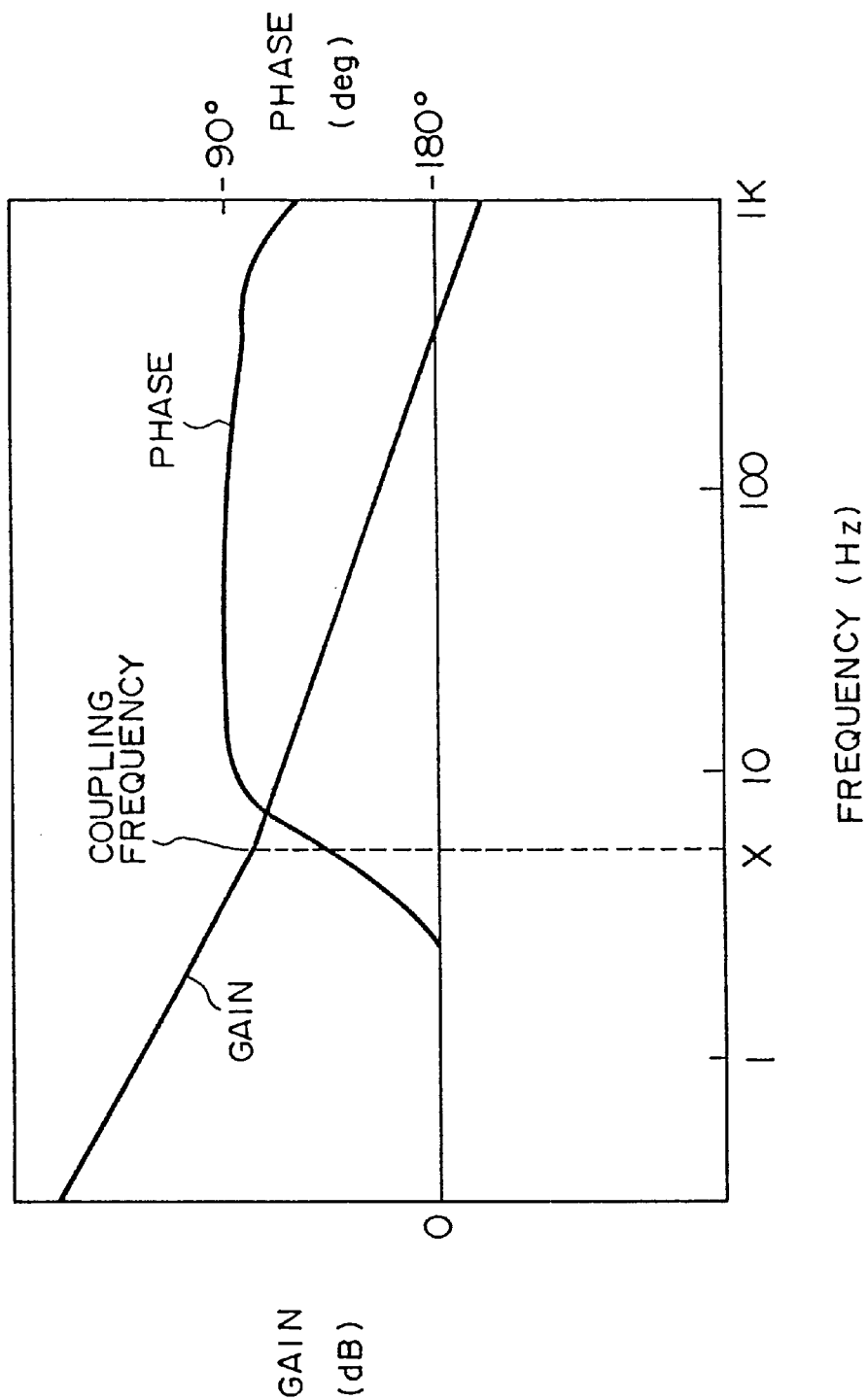
FIG. 25 shows the open loop characteristic of the DTF control system in accordance with the present invention.

In this embodiment, by the above-described two electrically coupled two-stage coupling control loop, DTF control in a wide frequency band and a wide dynamic range with a high accuracy is realized. The open loop characteristic thereof is shown in FIG. 25.

In the system shown in FIG. 23, a part of the DC component of a tracking error is corrected by the tape drawing actuator 61. Since the movable range for the tape drawing actuator 61 is limited, the remaining DC component is fed back to the capstan motor 59 or the reel motor 56. Naturally, the servo gain at this time is so constituted as to be higher than that of the two-stage coupling control system composed of only the tape drawing actuator 61.

According to this structure, since the two actuators 76, 61 of the two-stage coupling control system are almost exempt from the correction of the DC component, they can constantly operate in the movable range.

However, according to this system, since DTF control is exerted by feedback of the low-frequency component of a tracking error to the tape drawing actuator 61 and moving the magnetic tape 50 in the direction of travel, change in tension is caused in principle. To prevent this, in this embodiment, by applying the driving voltage for the tape drawing actuator 61 also to the tape tension actuator 62, as shown in FIG. 14, the two tape actuators 61, 62 are differentially operated in any mode (e.g., normal-speed reproduction mode or high-speed superior reproduction mode). This differential action is aimed at suppression of change in tension caused by the tracking operation of the tape drawing actuator 61. However, only when the electrical and mechanical characteristics of the two tape actuators 61, 62 are completely equal, the exact suppression is possible. Actually, even if an equal voltage is applied to the two tape actuators 61, 62, it is generally impossible to operate the two tape actuators 61, 62 in completely the same way due to the nonuniformity of mechanical and electrical characteristics and a change in tension is inevitable. In the present embodiment, the change in tension is corrected to the optimum tension value in any mode by a tension control system by a closed loop which will be described in detail hereinunder.

Operation of Tension Control System

The operation of a tension control system in this embodiment will now be explained.

Figure 81:
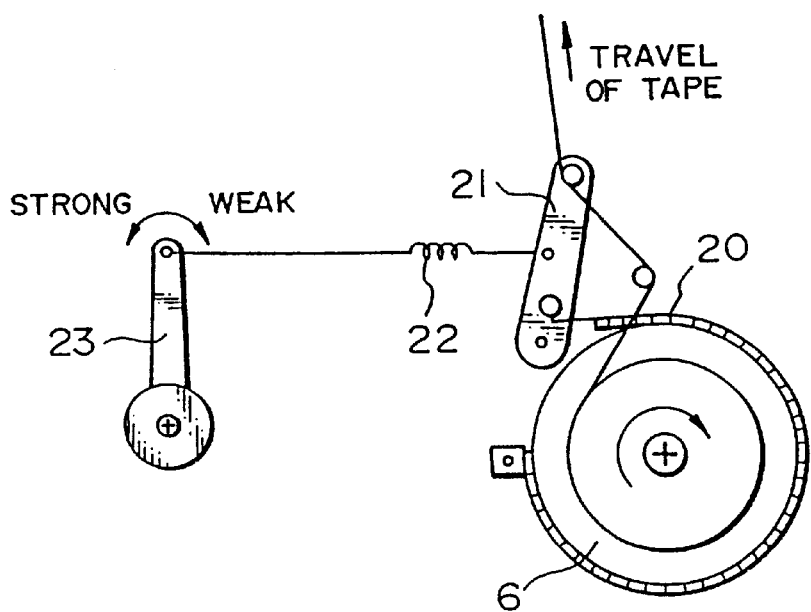
FIG. 81 shows a conventional tension control mechanism.
Figure 82:
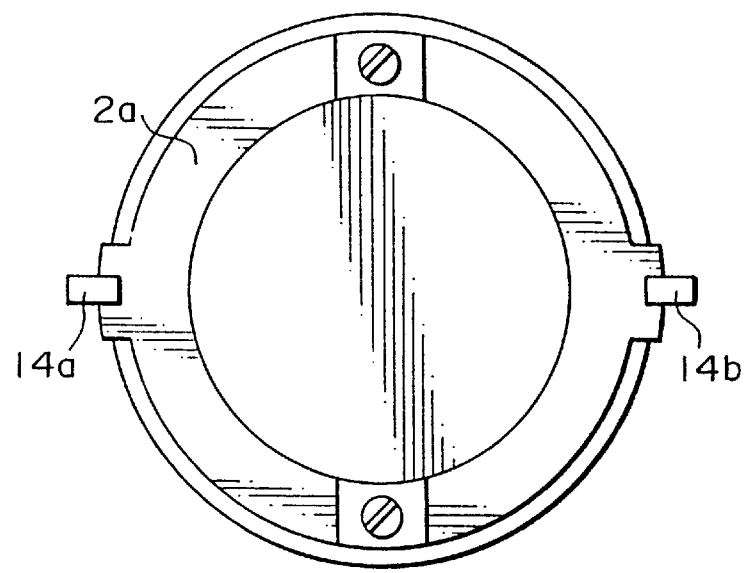
FIGS. 82 and 83 are plan views of conventional head actuators.
Figure 83:
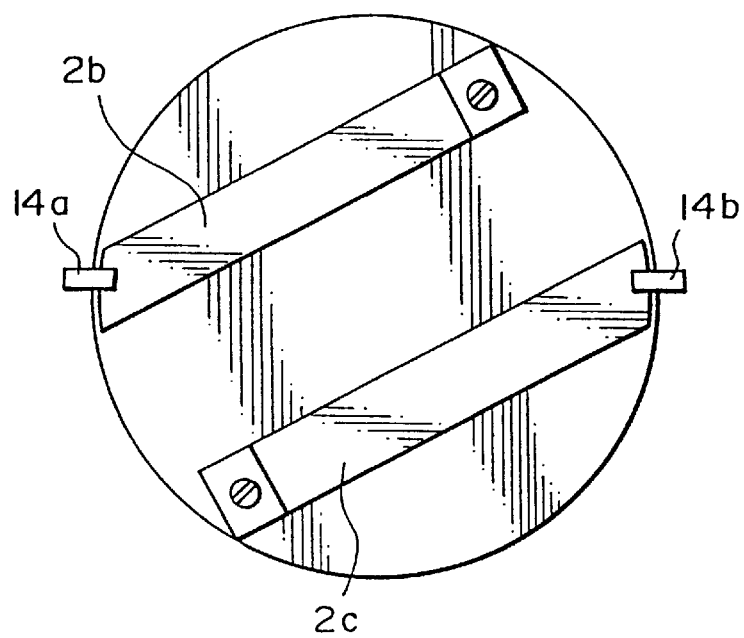
Figure 84:
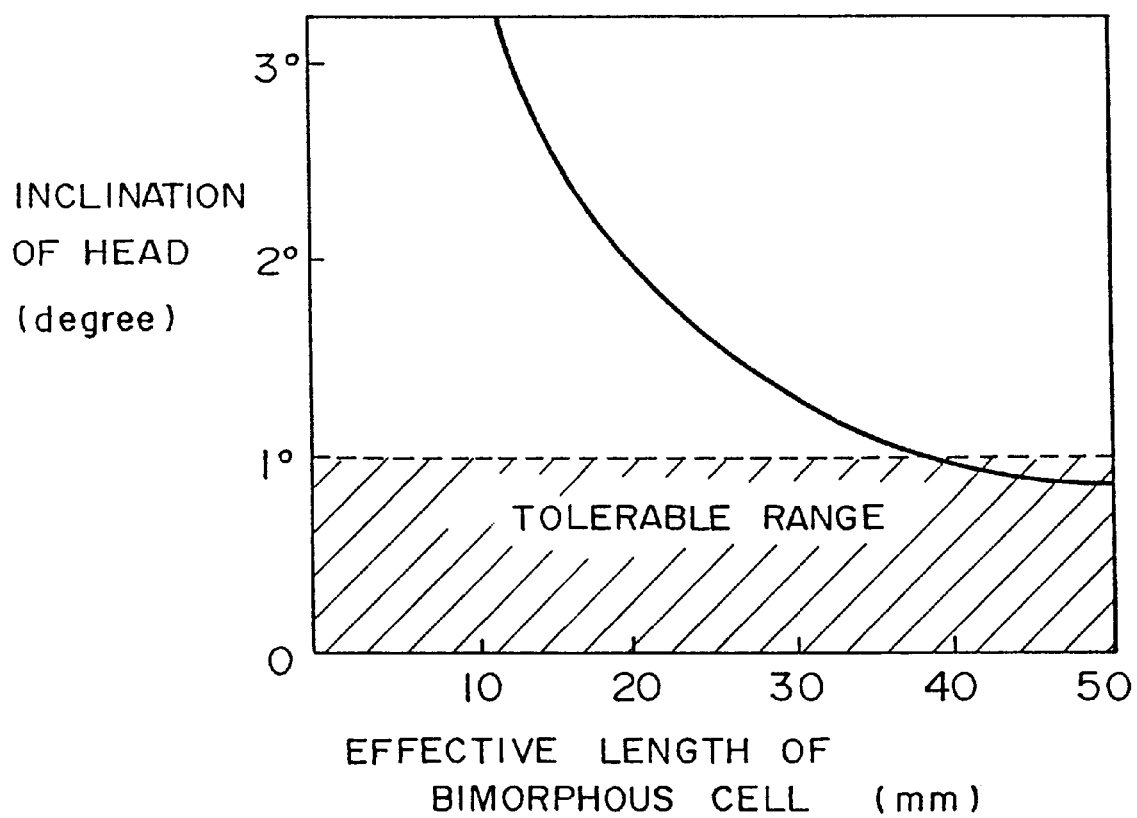
FIG. 84 shows the relationship between the effective length of the bimorphous cell and the inclination of the magnetic head in a conventional head actuator.

In a conventional tension control, when the force of the spring 22 is balanced with the tape tension, the amount of displacement of the tension control arm 21 is regarded as the tension, and the amount of displacement is fed back to the reel motor 6 as the detected tension value, as shown in FIG. 81.

Strictly speaking, however, it is up to the spring resonance frequency of the tension control arm 21 which is supported by the spring 22 that the amount of displacement of the tension control arm 21 supported by the spring 22 is proportional to the tape tension, and beyond the spring resonance frequency, the phase of the change in the tension applied to the tension control arm 21 is deviated from the phase of the change in the position of the tension control arm 21. Actually, the phase is shifted by 90 degrees at the spring resonance frequency and by 80 degrees at a higher frequency. As a countermeasure, in a conventional tension control system, the controlled region is limited by the phase shift of the spring support system including the tension control arm 21. This means that the tension detectable by the tension control arm 21 is limited to the frequency band of not higher than the spring resonance frequency of the spring support system including the tension control arm 21. It will naturally be considered to lighten the tension control arm or increase the spring constant in order to heighten the spring resonance frequency. However, there is a limitation in lightening the tension control arm, and if the spring constant is increased, the tension control arm 21 does not move much even if there is a change in tension, for thereby lowering the detection accuracy.

In this embodiment, the tension control arm is not mechanically supported by a spring. However, the tension control area is supported by what is called electrically supported by a spring by electrical position control. In addition to the electrical position control, the frequency band in which the tension is detectable is enlarged and, as a result, tension control with a high accuracy is also enabled. This method is shown in FIG. 26.

Figure 26:
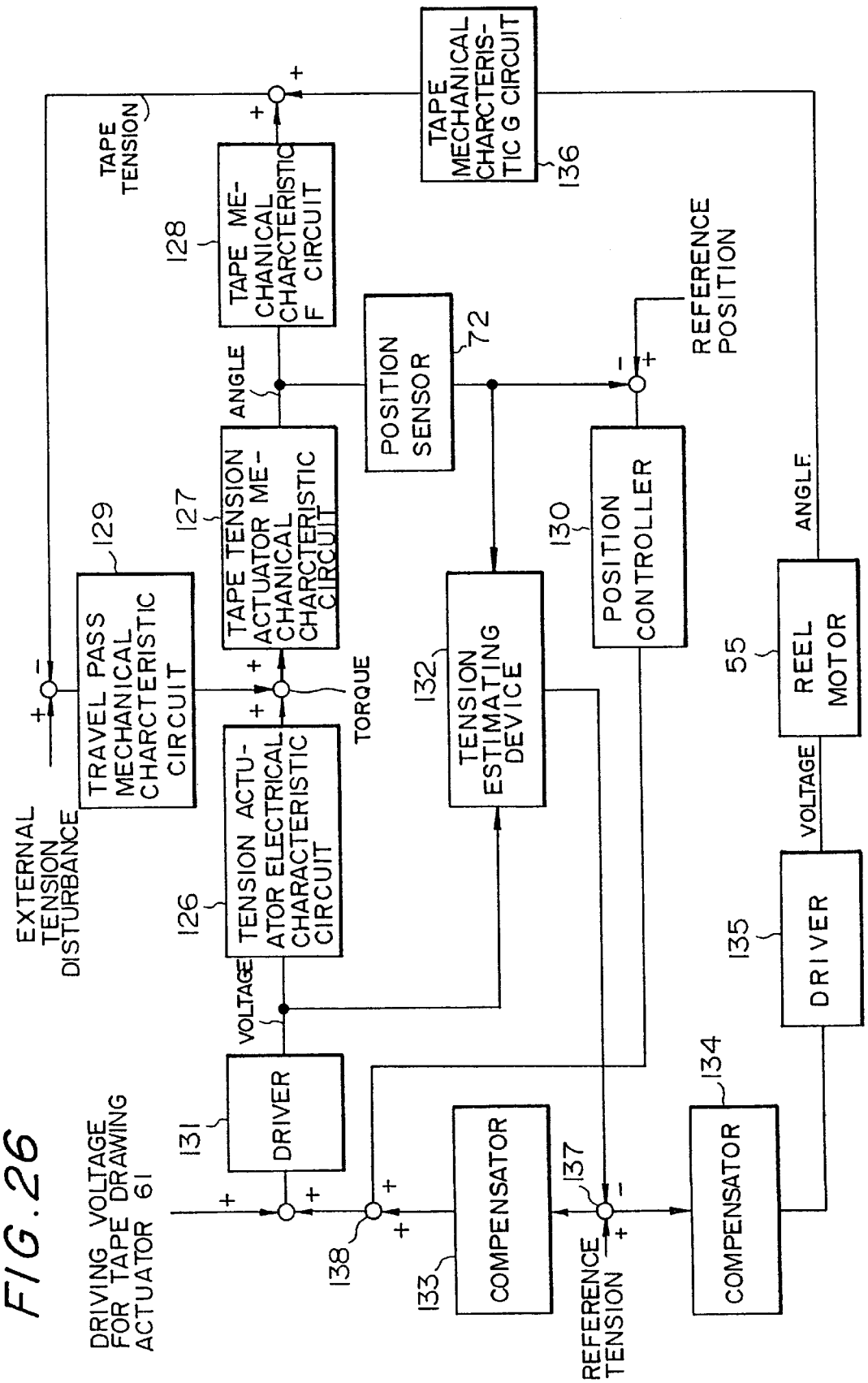
FIG. 26 is a block diagram of a tension control system in accordance with the present invention.

FIG. 26 is a block diagram of a tension control system in this embodiment. In FIG. 26, the reference numeral 126 represents a circuit for an electrical characteristic of the tension actuator 62 representing the (generated torque)/(input voltage) characteristic. The reference numeral 127 represents a circuit for a mechanical characteristic of the tension actuator 62 representing the (displacement angle)/(supplied voltage) characteristic. The reference 128 represents a circuit for a tape mechanical characteristic F which is determined by various characteristics such as the length of the arm 70 of the tape tension actuator 62, the geometrical positional relationship between the tape tension roller 69 and the fixed tape pass rollers 73, 74, the (stress)/(strain) characteristic of the magnetic tape 50 in the longitudinal direction and the sectional area of the magnetic tape 50. The reference 129 represents a circuit for a travel path mechanical characteristic which is determined by various characteristics such as the geometrical positional relationship between the tape tension roller 69 and the fixed tape pass rollers 73, 74, the balance of the forces of the magnetic tape 50 and the tape tension roller 69 and the geometrical positional relationship between the tape tension roller 69 and the rotary shaft of the driver 71 for the tape tension actuator 62.

The reference numeral 130 represents a position controller for electrically fixing the tape tension actuator 62 at the reference position. The reference 131 represents a driver for driving the tape tension actuator 62. The reference numeral 132 represents a tension estimating device for electrically estimating the tape tension from the driving voltage or driving current and the detected amount of displacement output from the position sensor 72. The reference numeral 133 and 134 represent compensators for feedback of the difference between the estimated tension value output from the tension estimating device 132 and the reference tension value, namely, the amount of tension change caused by external disturbance to the tape tension actuator 62 and the feed reel motor 55 so as to stabilize the loop. A driver 135 drives the feed reel motor 55.

The reference numeral 136 represents a circuit for a tape mechanical characteristic G representing the tape tension changing characteristic caused by a change in the rotational angle. A subtracter 137 calculates the difference between the estimated tension value output from the tension estimating device 132 and the reference tension value. An adder 138 adds the position control signal from the position controller 130 to the tension control signal from the compensator 133.

In FIG. 26, the total tension of the magnetic tape travelling system is obtained by adding an external tension disturbance (an external disturbance caused by the dynamic friction received by the tape from the shaft and the drum and a change in the frictional coefficient of the tape and an external disturbance in the longitudinal direction of the tape) to the sum of the change in the tension value caused by the change in the rotational angle of the tape tension actuator 62 and the tension change caused by the change in the rotational angle of the reel motor 55. On the basis of the thus-obtained tension, the tape tension actuator 62 is displaced.

The driver 71 for the tape tension actuator 62 has already been described with reference to FIG. 17, but it will be explained in more detail hereinunder. The magnetic circuit is closed by the yoke 106 and the permanent magnet 107 which is magnetized in the direction perpendicular to the rotating surface of the movable coil 108 and in which the direction of magnetization is divided into two opposite directions with respect to the rotary arcuate direction. Therefore, a high magnetic flux density is obtained in the perpendicular direction to the rotating surface of the movable coil 108. When a current is applied to the movable coil 108, the movable coil 108 is rotated by the force caused at the portions indicated by the reference numerals 108a, 108b in FIG. 18 according to the Fleming's left-hand rule. Furthermore, in order to measure the amount of displacement of the arm 70 or the tape tension roller 69, an optical position sensor such as that shown in FIG. 20 is provided, as described above.

The structure shown in FIG. 20 is suitable to the case in which the fundamental wave of tension change is a high frequency and in a wide dynamic range. It goes without saying that in the case in which the fundamental wave of tension change is a comparatively low frequency and has a small amplitude, it is possible to use an LED, which is cheaper, as the light emitting device 110 and a separation detector, which is cheaper, as the light receiving portion 111. It is also possible to detect the position by a magnetic device, which is cheaper, as shown in FIGS. 27 and 28.

Figure 27:
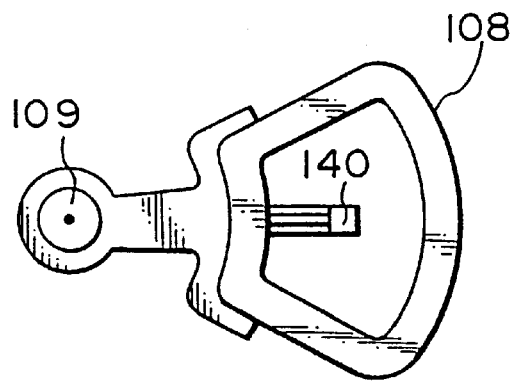
FIGS. 27 and 28($a$) and ($b$) show other examples of a position sensor of the tape actuator in accordance with the present invention.

In FIG. 27, a Hall element 140 is provided on the arm integrally with the exciting coil 108 and the Hall element can electrically detect the rotational position of the tape tension roller 63 in cooperation with the permanent magnet 107.

Figure 28A:
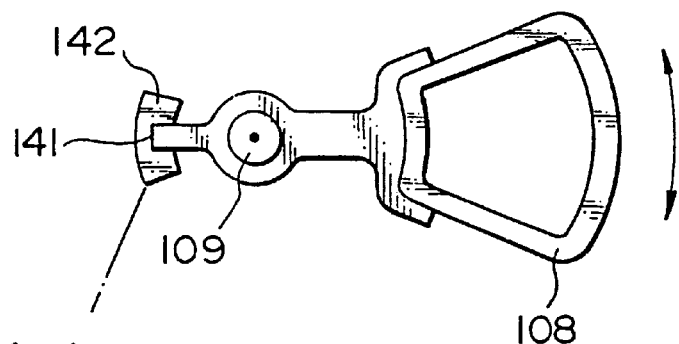
Figure 28B:
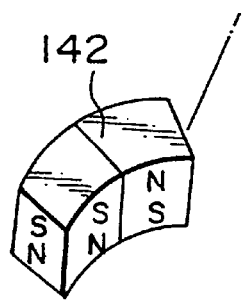

In FIGS. 28(a) and (b), a Hall element 141 is provided on the exciting coil 108 on the opposite side of the rotary shaft 109, and the permanent magnet 142 fixed for position detection and the Hall element 141 can electrically detect the position of the tape tension roller 63 in cooperation with each other.

By the above-described structure, the tape tension actuator 62 is driven by an electromagnetic force and can detect its own amount of displacement.

In this embodiment, since the tension estimating device 132 constitutes what is called a co-dimensional observer (hereinunder referred to as "tension estimating device") in the modern control theory which electrically simulates the transfer characteristic (driving current/displacement) of the tape tension actuator 62, it is possible to detect the tape tension applied to the tape tension actuator 62 in a wider frequency band in comparison with the conventional mechanical tension detector such as that shown in FIG. 81.

Figure 29:
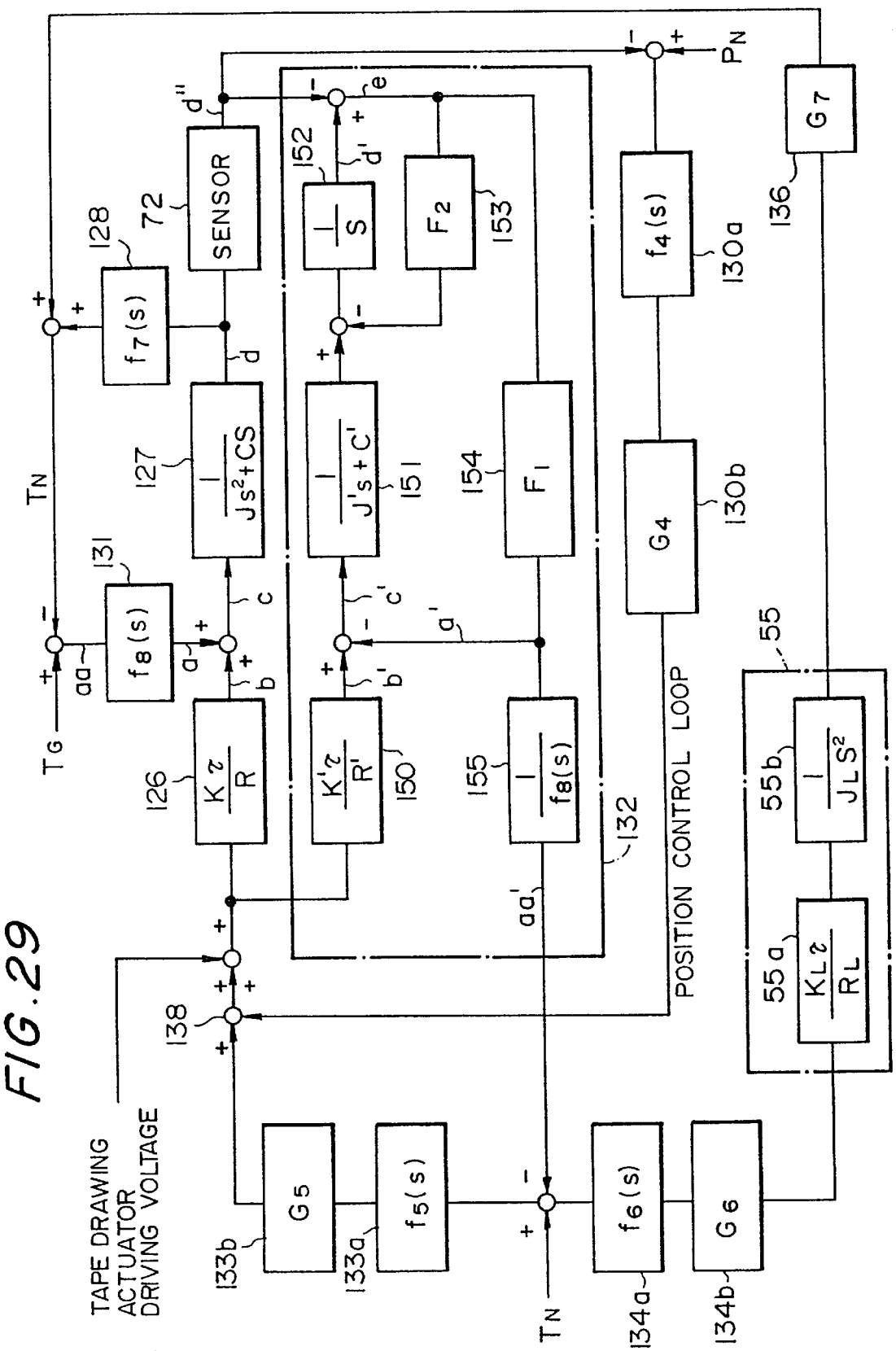
FIG. 29 is a block diagram of a tension control circuit in the present invention which is represented by transfer functions.

The above-described principle will be explained in more detail. FIG. 29 shows the transfer functions of the tension estimating device 132.

FIG. 29 is obtained by converting the block diagram of the tension control system shown in FIG. 26 into the transfer functions of the control theory. The symbol s is a Laplace operator.

The reference numeral 126 represents a transfer function including the coil resistance R in the tape tension actuator 62 and the force constant $K_\tau$ of the electromagnetic driving portion, 127 represents a transfer function including the inertia J of the movable portion of the tape tension actuator 62 and the viscosity function C, 128 represents a transfer function indicating the transfer characteristic of the change in the tape tension with respect to the change in the rotational angle of the tape tension actuator 62, and 131 represents a transfer function indicating the transfer characteristic which the tape tension imparts to the tape tension actuator 62.

The reference numeral 130a represents a phase lead filter, which is a compensator for compensating a position error signal which is a difference between the position signal output from the position sensor 72 of the position control group for electrically fixing the reference position of the tape tension actuator 62 and the reference position signal $P_N$, and 130b represents the gain of an amplifier for determining the loop gain of a position control feedback loop. The reference numeral 133a represents a high pass filter, which is a part of the compensator 133 for feeding back a comparatively high frequency component in the controlled region in the tension control system to the tape tension actuator 62, and 133b represents the gain of an amplifier for determining the loop gain of a feedback loop with respect to the tape tension actuator 62. The reference numeral 134a represents a low pass filter, which is a part of the compensator 133 for feeding back a comparatively low-frequency component in the controlled region of the tension control system to the feed reel motor 55, and 134b is the gain of an amplifier for determining the loop gain of the feedback loop with respect to the reel motor 55. The reference numeral 55a represents a transfer function including the coil resistance $R_L$ and the torque constant $K_{LZ}$, and 55b represents a transfer function including the rotational inertia $J_L$ of the reel motor 55. The reference numeral 136 is a transfer function representing the (tape tension)/(angle) characteristic which indicates the influence of the change in the angle of the reel motor 55 on the tape tension.

The reference numeral 150 is a transfer function circuit electrically simulating the transfer function 126, and 151 and 152 are transfer function circuits electrically simulating the transfer function 127 by the equivalent conversion of the control theory. The reference numeral 153 and 154 are the feedback gains of the observer (tension control system) which are fed back so as to converge the differences between the output of the position sensor 72 and the respective outputs of the transfer function circuits 150, 151 and 152 on zero in order that the dynamic characteristics of the transfer function circuits 150, 151 and 152 which electrically simulate the characteristic of the tape tension actuator 62 agree with the characteristic of the actual tape tension actuator 62. The reference numeral 155 is a transfer function represented by the inverse characteristic of the transfer function 131.

In FIG. 29, when a driving voltage to be input to the tape tension actuator 62 is input to the transfer function circuit 150 which electrically simulates the coil resistance R and the force constant Kτ, the output b' of the tension estimating device 132 becomes the estimated value of the actual driving force b of the tension control system. The transfer functions of the circuits 151 and 152 are collectively represented by the following equation:

$$\frac{1}{J'S} \cdot \frac{1}{S} \cdot \frac{1}{J'S^2} \tag{1}$$

Since the transfer function circuits 151 and 152 simulate the transfer function of the mechanical characteristic of the tape tension actuator 62, when the output b' of the transfer function circuit 150 is input, the output d' of the transfer function circuit 152 ought to be the estimated value of the rotational angle d of the tape tension actuator mechanical characteristic circuit 127. However, the transfer function circuits 151 and 152 are provided with integrators therewithin, and even if the transfer functions are the same as the characteristic output from the circuit 127 in the tape tension actuator 62 with respect to the frequency characteristics, the dynamic characteristics thereof are not equal thereto due to a difference in the initial values of the integrators. Therefore, the difference e between the actual amount of displacement d" detected by the position sensor 72 and the estimated value d' of the tension estimating device 132 is fed back at gains $F_1$ and $F_2$, whereby the dynamic characteristics as well as the frequency characteristics agree with those of the actual tape tension actuator 62.

The above-described structure is well known as the structure of a co-dimensional observer in the modern control theory. It is in order to freely determine the convergence of the observer that the signals are fed back in the two loops at the gains of $F_1$ and $F_2$ to the input terminals of the transfer function circuits 151, 152 which include the integrator (1/S in a Laplace conversion) in the model of the tape tension actuator 62. A co-dimensional observer to which the driving voltage and the displacement of an object of control are input is generally used to estimate the internal speed thereof. If the feedback gains $F_1$, $F_2$ of the co-dimensional observer are adequately larger than the pole 156 of the observer in FIG. 30 (the negative real number is large), in other words, if the values of $F_1$, $F_2$ are large (high gains), in the state in which the dynamic characteristic and the static characteristic of the object of control agree with each other, it is possible to estimate the tension. At this time, since the dynamic characteristic agrees with the static characteristic, the following relationship holds:

$$d'=d \tag{2}$$

Figure 30:
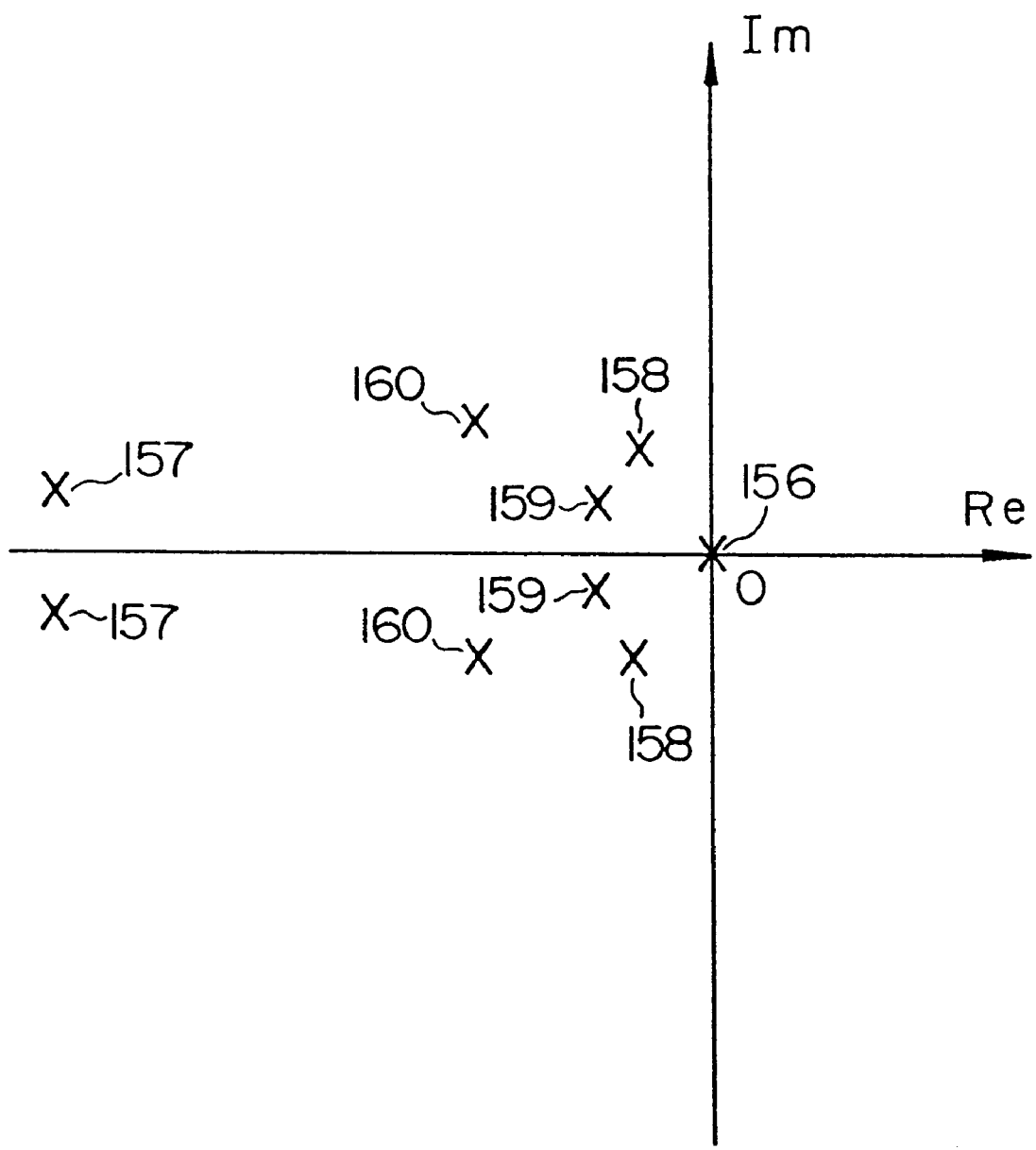
FIG. 30 shows the pole-positioning of a tension estimating observer in accordance with the present invention.

FIG. 30 shows the pole-positioning of this control system. The reference numeral 156 represents the pole of the tape tension actuator 62, 158 represents the pole of the position control feedback loop of this control system, 159 represents the pole of the feedback loop to the reel motor 55 of this control system, 160 represents the pole of the feedback loop to the tape tension actuator 62 of this control system, and 157 represents the pole of the tension estimating observer. The abscissa represents a real number axis and the ordinate represents an imaginary number axis.

Since the transfer function circuit 150 does not include an integrator, the driving force b' is represented as follows:

$$b'=b \tag{3}$$

Since the dynamic characteristic of the object of control agrees with that of the model in the observer, the speed and the acceleration as well as the displacement agrees with those of the model. Therefore, the force c' applied to the arm of the tape tension actuator 62, which is equivalent to M times of the acceleration is represented as follows:

$$c'=c \tag{4}$$

Since the sum of the driving force b and the torque a is the torque c in the original tape tension actuator 62, as in the following equation;

$$b+a=c \tag{5}$$

the following relationship holds from the formulas 2 to 5:

$$b'+a=c' \tag{6}$$

$$b'-c'=a$$

that is, $$a'=a \tag{7}$$

This means that a' in the signal path in the observer represents the torque caused by the tension, and that it is possible to detect the torque caused by the tension by taking out a'.

Figure 31:
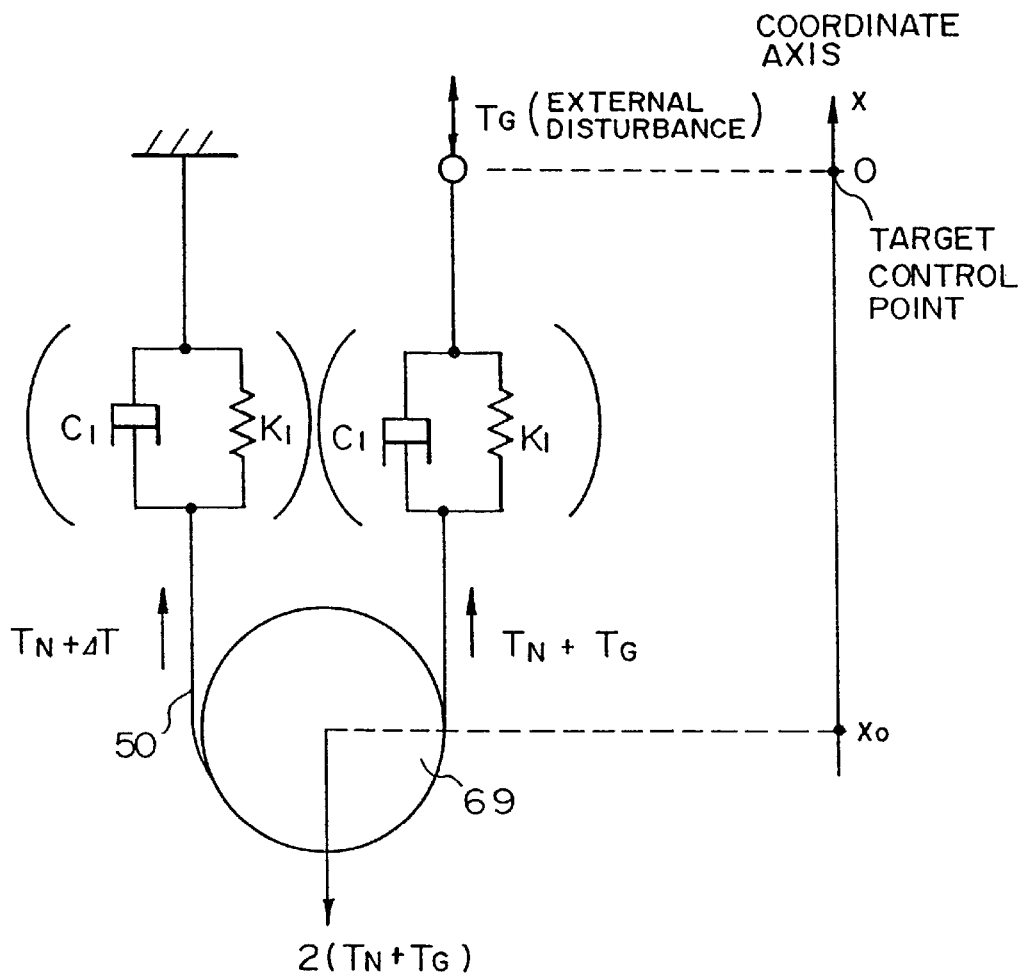
FIGS. 31 and 32 schematically show the balance of the forces of the movable tape pass roller portion.
Figure 32:
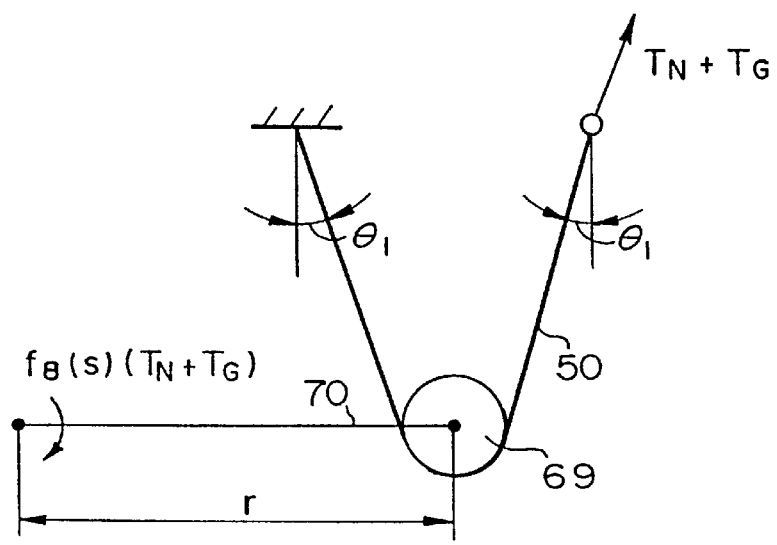

The relationship between the tape tension and the torque which the tape tension applies to the mechanical part of the tension actuator is shown in FIGS. 31 and 32.

FIG. 31 schematically shows the balance of the forces of the tape tension roller 69 and the magnetic tape 50. In FIG. 31, the symbol $K_1$ represents a modulus of longitudinal elasticity and $C_1$ represents the viscosity coefficient of the magnetic tape 50. $T_N$ represents a tension value and $T_G$ represents an external tension disturbance value.

FIG. 32 shows the mechanical relationship between the positions of the movable tape tension roller 69 and the fixed tape pass rollers 73, 74 and the length of the arm 70.

From the statical point of view, the force which the tape tension roller 69 receives from the magnetic tape 50 is represented by 2 $(T_N+T_G)$. However, since the actual magnetic tape 50 is not a rigid body and is considered as a viscoelastic body, it is necessary that the tape tension value also changes with time and position as parameters. One of the characteristics of this embodiment is that the length of the tape between the rotary magnetic head 52 which is used for tape tension control and the tension roller 69 which is the point of application for the actual control is shortened so as to avoid the influence of the dynamic characteristic in the longitudinal direction of the tape as much as possible. Actually, the magnetic tape 50 is wound around the tape tension roller 69 at a contact angle of not 180°, as shown in FIG. 31, but less than 180°, as shown in FIG. 32. If the contact angle is represented by 180°−2$\theta_1$ ($\theta_1$ is a positive angle), the force applied to the tape tension roller 69 is represented by $2\cos\theta_1 (T_N+T_G)$. As shown in FIG. 32, the tape tension roller 69 is connected to the rotary shaft of the actuator driving portion 71 through the arm 70 having a length r, and the torque applied to the tension roller 69 by the tape tension is represented by the following equation:

$$a = f_8(T_N+T_G)$$

$$f_8 = 2r \cos \theta_1 \tag{8}$$

Therefore, the relationship between the tape tension value aa (=$T_N+T_G$) containing the external tension disturbance and the torque a which the tape tension applies to the actuator 62 shown in FIG. 29 is represented by the following equation:

$$a = 2r \cos \theta_1 aa \tag{9}$$

On the other hand, the estimated tape tension value a'a' is obtained from the estimated tape tension torque a' by multiplying a' by the reciprocal of $f_8$, as represented by the following equation:

$$aa' = \frac{a'}{f_8} = \frac{a'}{2r\cos\theta_1} \tag{10}$$

In this way, it is possible to obtain the tension by estimation. Additionally, when the observer is matched with the model, the tension estimating capacity of the tension estimating device 132 depends upon the two feedback gains $F_1$, $F_2$, and represented by the following equation;

$$aa' = \frac{F_1}{JS^2 + F_2 JS + F_1} aa \tag{11}$$

$F_1$ mainly determines the frequency which allows the estimation and $F_2$ mainly determines the stability of the observer loop.

Figure 33:
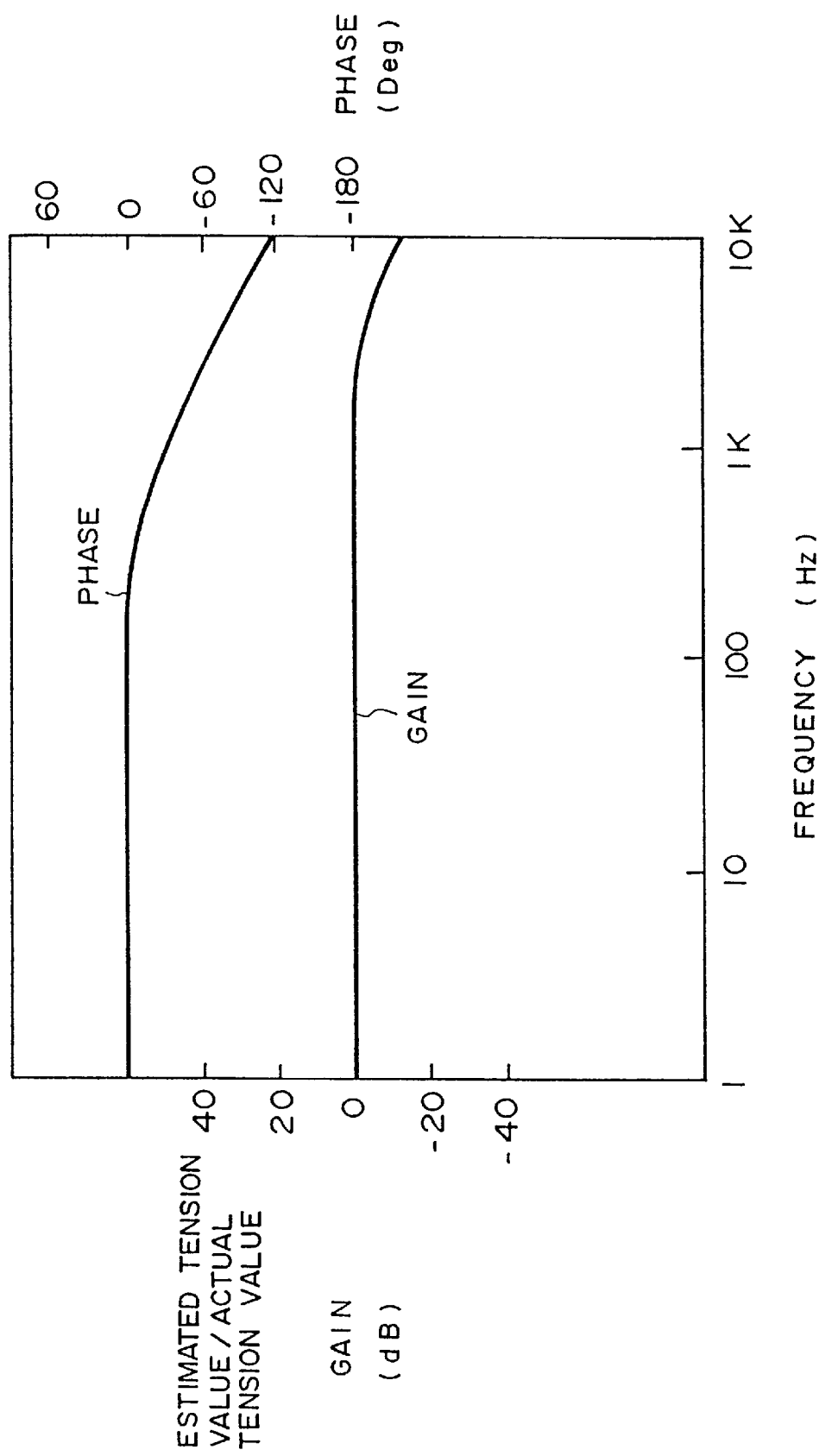
FIG. 33 is a frequency characteristic diagram showing the estimating capacity of the tension estimating device in accordance with the present invention.

FIG. 33 shows the tension estimating capacity of the tension estimating device 132 in this embodiment. In this case, the external disturbance estimating capacity is about 1 KHz.

The estimated tension aa' is compared with the reference tension $T_N$, which is the optimum value of the tension, and the tension error, namely, the external tension disturbance value $T_G$ is detected. Only the high-frequency component of the external tension disturbance value $T_G$ is taken out by the high pass filter 133a and fed back to the tape tension actuator 62 at a transfer function of $f_5$ which includes phase compensation and amplification. Simultaneously, the low-frequency component thereof is taken out by the low pass filter 134a and fed back to the feed reel motor 55 at a gain of $G_6$. The reason why the frequency band is divided as described above is because the tape tension actuator 62, which has a small mechanical time constant, is generally suitable for the control in a high-frequency band but since the movable range is limited, it is impossible to control a change in the tension which has a controlled value approximate to that for a direct current. In the pole-positioning of the transfer functions $f_5$ and $f_6$ shown in FIG. 30, for example, the points which are closer to the original point than to the pole 157 of the observer (for example, about 1/10 of the pole 157 by the real number) are selected for the pole 160 of the tension control loop to the tape tension actuator 62 and the pole 159 of the tension control loop to the feed reel motor 55.

Figure 34:
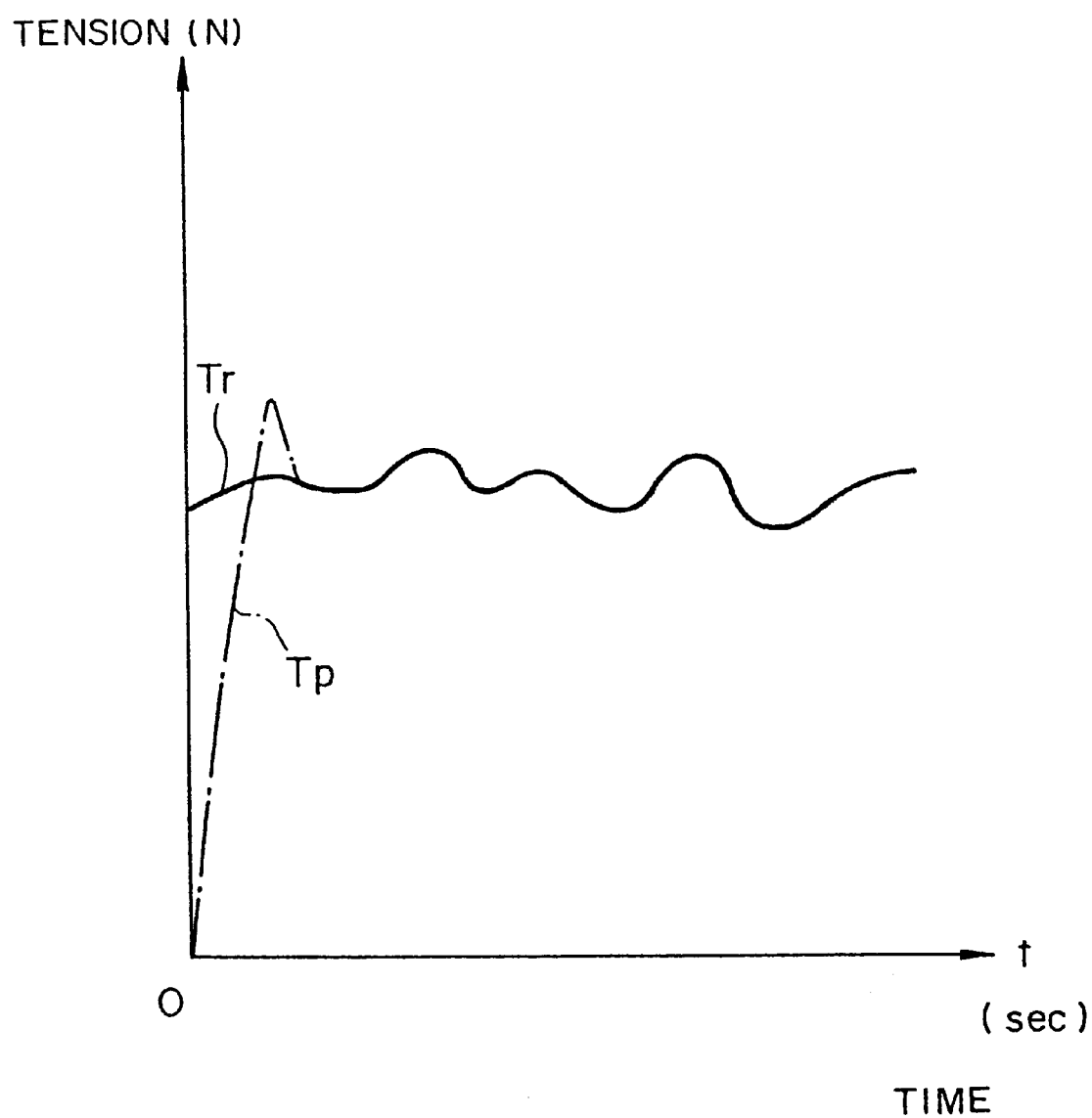
FIG. 34 shows the transient behavior of the estimated external disturbance.

FIG. 34 shows the transient behavior of the estimated external disturbance at this time. The actual tension value $T_r$ agrees with the estimated tension value $T_p$ after a constant time.

In FIG. 34, the transient characteristic of the estimated tension value $T_r$ of the tension estimating device 132 and the actual tape tension change $T_p$ from the start of operation is shown. The abscissa represents a time and the ordinate a tension force.

FIGS. 35(a) and 35(b) show the open loop characteristic of the tension control system of this embodiment. In FIG. 35(a), the ordinate represents a gain and the abscissa represents a frequency. In FIG. 35(b), the ordinate represents a phase and the abscissa represents a frequency.

The principle and the operation of the tension control system in this embodiment have been explained above.

When the tension is controlled by the above-described method of estimating the external tension disturbance, the estimated tension is exactly detected up to a much higher frequency than that substituted by the amount of displacement of the tension control arm as in a conventional tension control mechanism, for thereby realizing tension control in a very wide frequency band.

Since loops are complicatedly intertwined in such tension control unlike in a simple feedback loop having one input and one output, a large amount of operation is required. Although the integrator, amplifier, adder, subtracter or the like can naturally be constituted by an analog circuit by using an operational amplifier or the like which produces few offsets and drifts, since such an amplifier is expensive and the circuit becomes a large scale, it is desirable to digitally operate by a microcomputer or the like.

Figure 36:
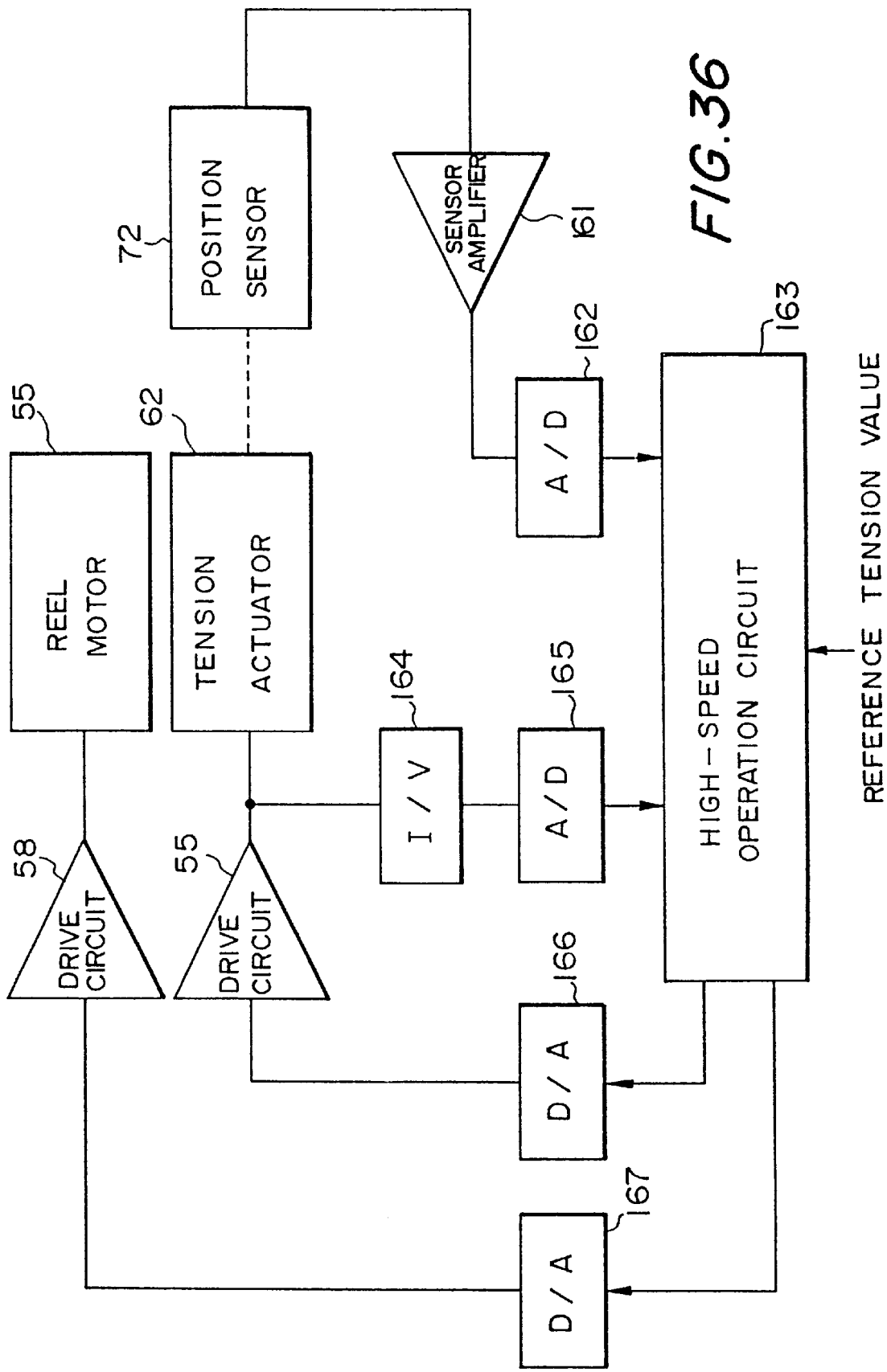
FIG. 36 is a block diagram of the structure of a hardware in the tension control system in accordance with the present invention which is composed of a high-speed computer such as a microcomputer.

FIG. 36 shows the structure of the hardwares in the control system shown in FIG. 29 which is constituted by a microcomputer. It is possible to realize the control system having very little hardware, as shown in FIG. 36.

Figure 37:
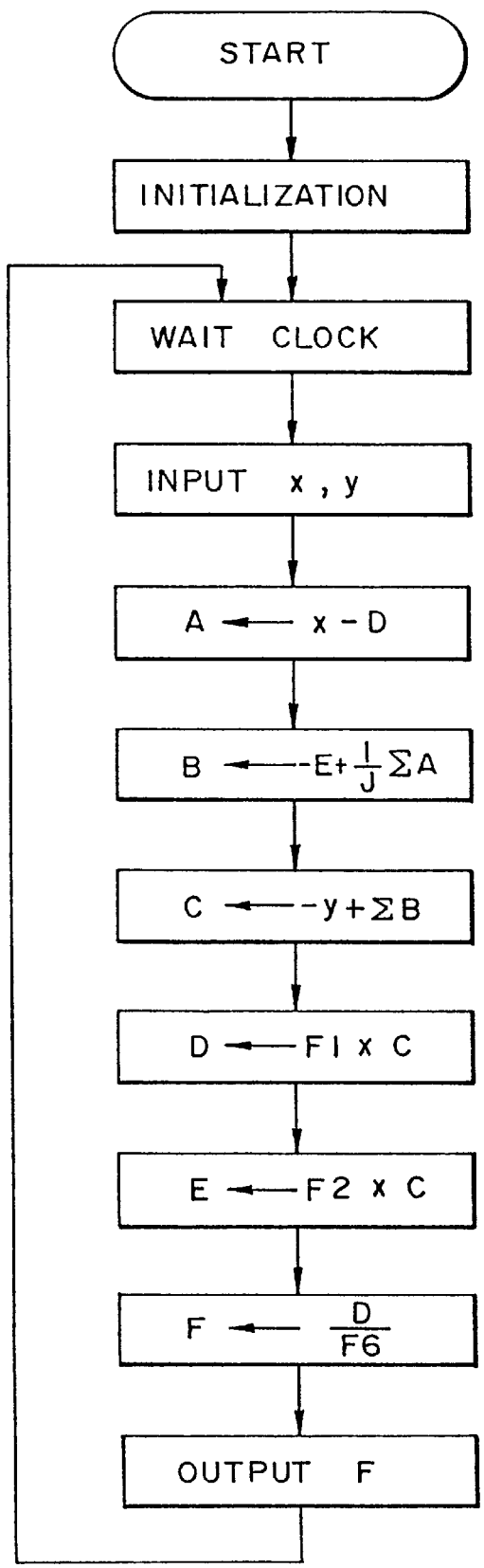
FIG. 37 is a flowchart of the tension estimating algorithm in accordance with the present invention.
Figure 38:
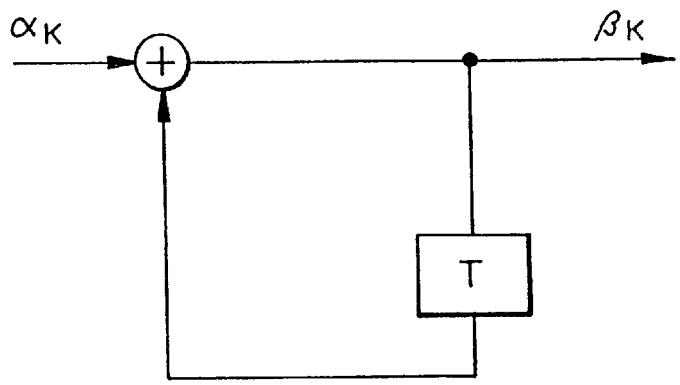
FIG. 38 is a block diagram for realizing $\Sigma$ in FIG. 37.

In FIG. 36, the reference numeral 161 represents a sensor amplifier, 162 represents an analog/digital converter for converting an analog signal supplied from the sensor amplifier 161 into a digital signal and 163 represents a high-speed operation circuit for digitally executing the estimation of a tension and compensation thereof by a microcomputer or the like on the basis of the transfer functions shown in FIG. 29. The reference numeral 164 represents a current/voltage converter for taking out the driving current for the tension control mechanism in the form of a voltage and 165 represents an analog/digital converter for converting the analog output of the current/voltage converter 164 into a digital signal. The reference numerals 166, 167 represent digital/analog converters for converting the result output from the high-speed operation circuit 163 into an analog output. FIG. 37 shows an example of a flowchart for the algorithm of the estimated tension which is computed by a digital operation by the high-speed operation circuit 163 in the structure shown in FIG. 36. The integration factor Σ shown in FIG. 37 is realized by the structure of the block diagram of FIG. 38.

As described above, according to this embodiment, since the tape tension actuator 62 suppresses a tension change in the high-frequency band and the feed reel motor 55 suppresses a tension change in the low-frequency band, the tension control accuracy is enhanced and a tension control system capable of tension control with a high accuracy in a wide frequency band and a wide dynamic range is realized.

In this way, according to the present embodiment, since the control ranges and the dynamic ranges of a DTF control system and a tension control system are enlarged by using DTF control and tension control utilizing an external disturbance observer, good reproduction is possible not only in a normal-speed reproduction mode but also in a high-speed superior reproduction mode.

Figure 39:
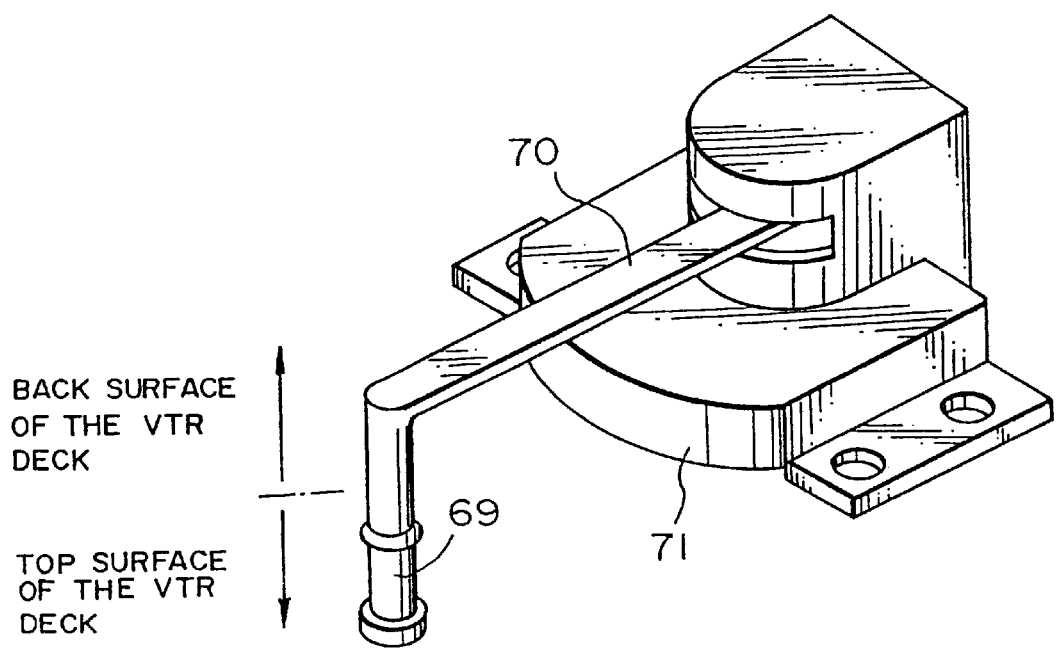
FIG. 39 is a perspective view of another example of the tape actuator in accordance with the present invention.

Although the tape tension actuator 62 is disposed on the top side (on the side of the rotary drum) of the VTR deck in this embodiment, it may be provided on the back surface of the VTR deck with consideration of the limitation of the size of the VTR deck, as shown in FIG. 39. A similar effect is produced by a compact structure in which the magnetic circuit of the actuator is accommodated in the VTR deck.

Operation in High-speed Superior Reproduction

The operation of the apparatus at the time of high-speed superior reproduction in which the speed of the magnetic tape 50 cannot be corrected by the head actuator 76 will now be explained as the main part of the present embodiment.

When a conventional apparatus is operated at a high speed at which the speed of the magnetic tape 50 cannot be corrected by the head actuator 76, a screen has noise bars or becomes a mosaic screen. In the present embodiment, by operating the tape drawing actuator 61 and the tape tension actuator 62 in accordance with the above-described principle, the speed of the magnetic tape 50 on the rotary drum 51 is intermittently lowered to the speed at which the head actuator 76 can correct the speed of the magnetic tape 50, for example, the normal reproduction speed. In the period in which the speed of the magnetic tape 50 is correctable by the head actuator 76, namely, the reproduction-possible period T' explained in the above principle, the correction of a tracking error is enabled by the above-described two-stage coupling DTF control system in accordance with the present embodiment even in the worst case in which, for example, the speed changes by the mechanical characteristic shown in FIG. 10 and the tracking error pattern exceeds the range in which the head actuator 75 can correct a tracking error. The reproduction-possible period T' is a period in which at least one picture is reproducible, namely, at least $m_0/f$ ($m_0$ is an integer of at least 2) sec, as described above. A superior reproduction signal generator (not shown) outputs a signal for superior reproduction for driving the tape actuators 61, 62. In this embodiment, a driving voltage pattern for digitally operating the tape actuators 61, 62 is output so as to produce the speed pattern shown in FIG. 7 by inputting the tape speed information from the capstan portion such as a capstan FG signal and a drum PG signal on the basis of the explained principle. The hardware structure of the superior reproduction signal generator can be realized by simple digital circuits, but an explanation thereof will be omitted here.

In a period other than the reproduction-possible period T', since no reproduced picture can be obtained, a good picture reproduced in the reproduction-possible period is stored in each cycle period, and during the period other than the reproduction-possible period T', the stored pictures may be output. By this operation, a good reproduced picture free from noise, which is impossible in a conventional servo system, is continuously obtained, although it is composed of a series of successive stop-frames. As described above, the tape tension actuator 62 is constantly operated by a tape tension servo in a wider range than by a conventional mechanical system. It goes without saying that the magnetic tape 50 is therefore maintained at the optimum tension in any state. Thus, this embodiment of a magnetic recording and reproducing apparatus can produce a good reproduced picture in a wide tape speed range from a low speed to a high speed.

Second Embodiment

A second embodiment of the present invention will be explained.

Figure 40:
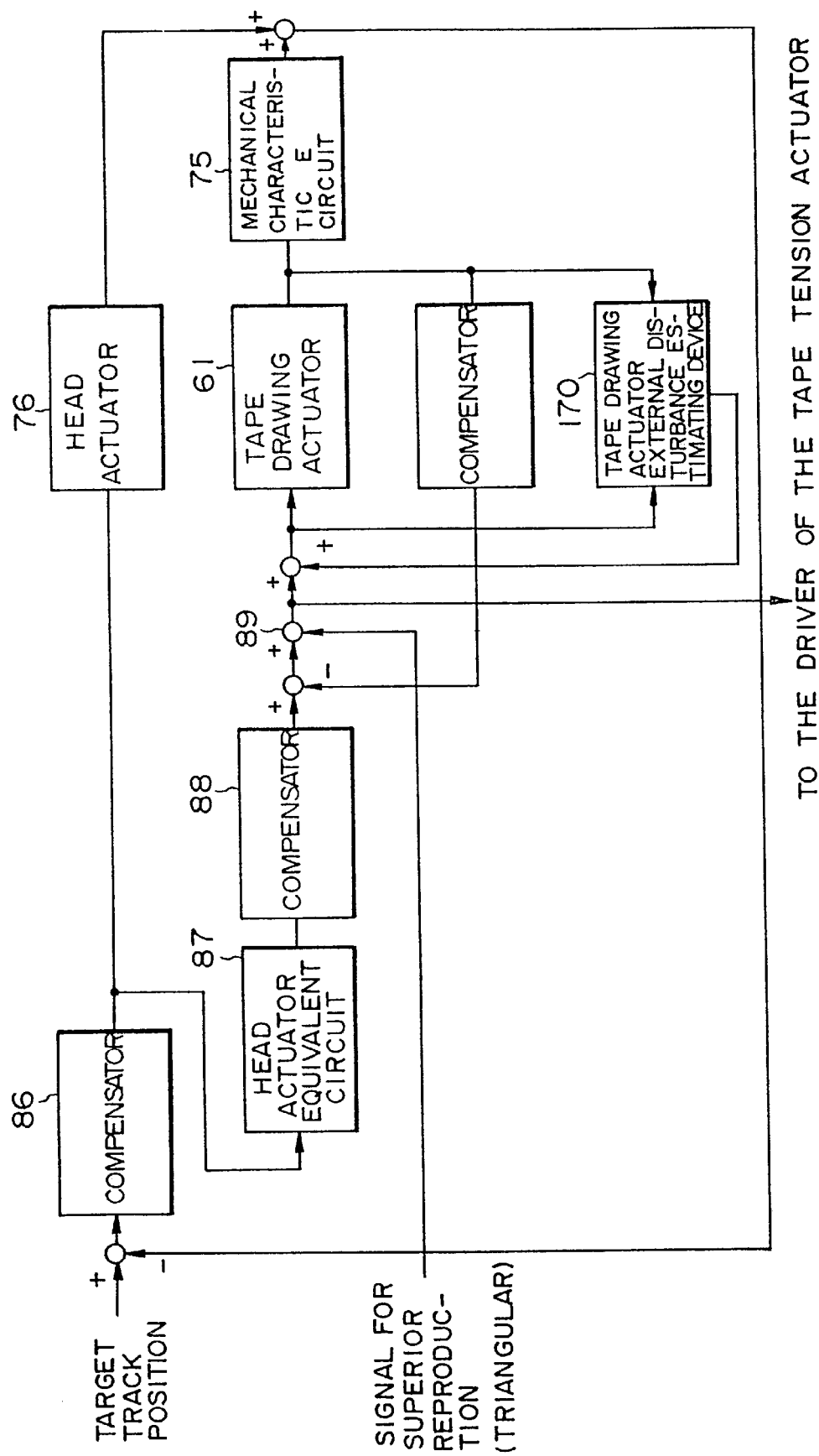
FIG. 40 is a block diagram of a second embodiment of the present invention.
Figure 41:
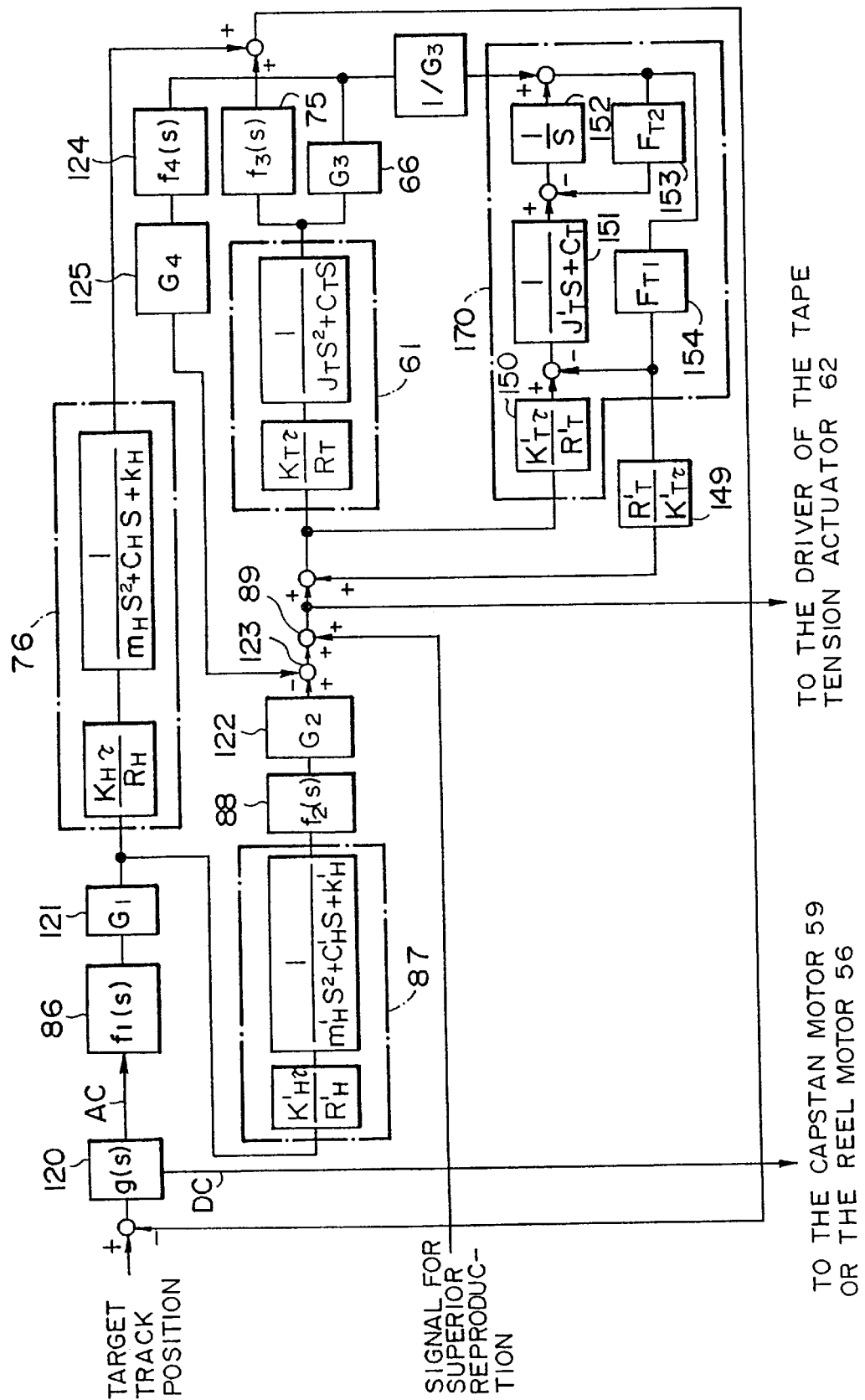
FIG. 41 is the block diagram shown in FIG. 40 which is represented by transfer functions.

FIG. 40 is a block diagram of a DTF control system in a second embodiment of the present invention. This embodiment is different from the first embodiment in that an element which is the same as the tension estimating device 132 used in the first embodiment for the detection of a tension and constituted by an external disturbance observer in the modern control theory is provided in the tape drawing actuator 61 as a tape drawing actuator external disturbance estimating device 170. Since the principle and the structure of the external disturbance estimating device 170 are completely the same as those of the tension estimating device 132 in the first embodiment, as shown in FIG. 41, an explanation thereof will be omitted.

Figure 42:
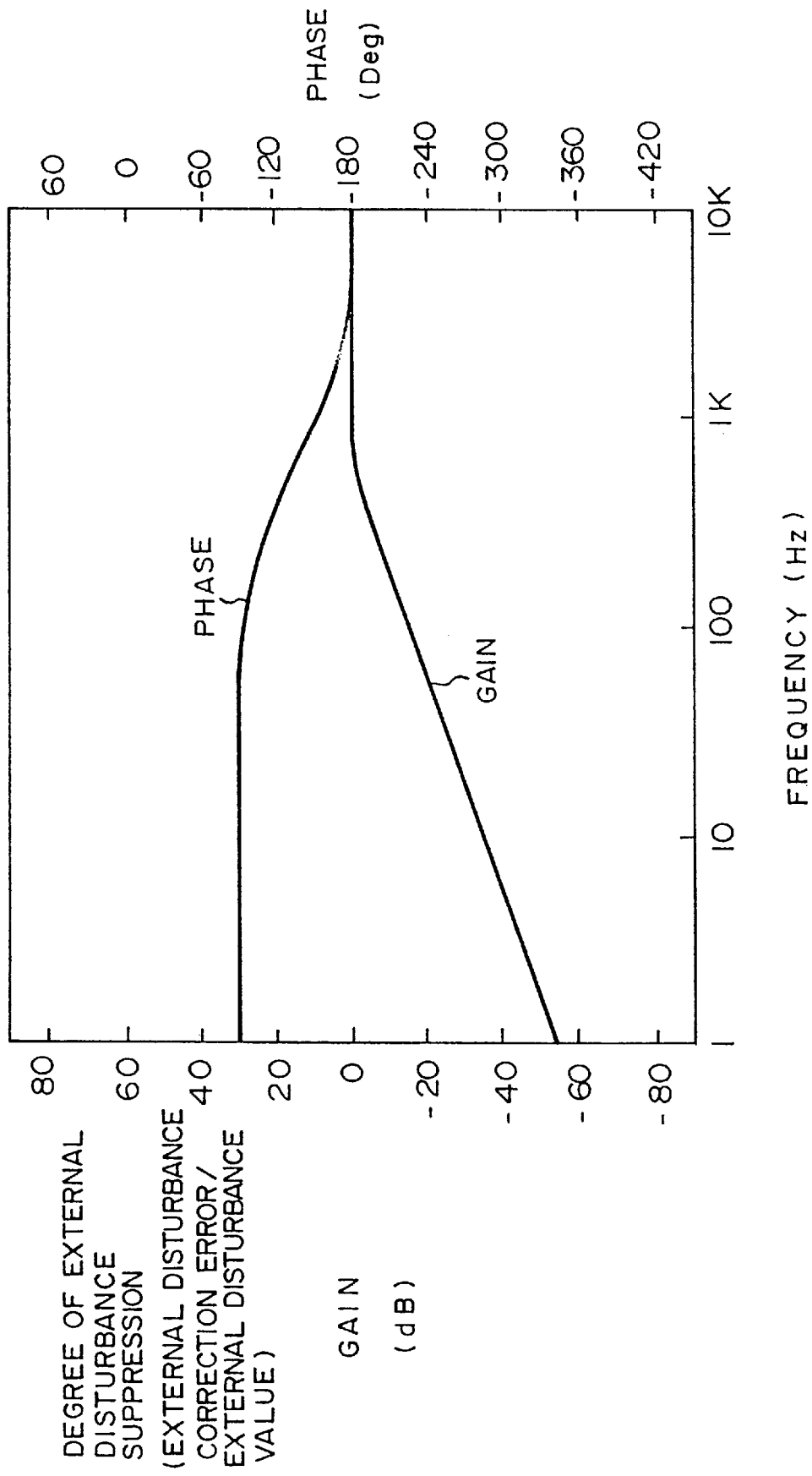
FIG. 42 shows the external disturbance suppressing characteristic of the external disturbance suppressing loop of the tape actuator.

The estimated external torque disturbance, which is the output of the tape drawing actuator external disturbance estimating device 170 and is applied to the actuator driver 65 is positively fed back after it is multiplied by $$\frac{R'_T}{K'_{TZ}},$$

which is the inverted characteristic of the tape drawing actuator electrical characteristic $$\frac{K'_{TZ}}{R'_T}$$

by a circuit 171 so as to cancel the external torque disturbance. The external disturbance suppressing characteristic at that time is shown in FIG. 42.

When an external disturbance suppression loop is newly provided in the tape drawing actuator 61 in this way so as to cancel the external disturbance, the position of the tape drawing actuator 61 is fixed as if there were no external disturbance with respect to an external disturbance in the suppression controlled region of the external disturbance suppression loop (within about 1 KHz in the example shown in FIG. 42) which is caused by, for example, the vibration of a VTR deck mounted on an automobile. The tape drawing actuator 61 is more susceptible to an external disturbance than the head actuator 76 because the mass of the movable portion of the tape drawing actuator 61 is large, and the tape drawing actuator 61 is a cantilever arm system which is not supported by a spring. This suppression loop is therefore very effective.

In a control system having the above-described structure, since the tape tension actuator 61 does not vibrate even due to a sudden external disturbance such as the vibration of the VTR deck, constant stable DTF control is enabled.

As described above, according to this embodiment, a tracking error correction device is newly provided as a movable roller in a tape travel path outside of the drum. DTF control is carried out in a two-stage coupling system in a wide frequency band and a wide dynamic range with a high accuracy. In addition, the tension is detected by an external disturbance observer so as to constitute a tension control system capable of tension control in a wide frequency band and a wide dynamic range with a high accuracy. Accordingly, this embodiment enables good reproduction not only in normal-speed reproduction but also in reproduction at a speed selected from a wide range.

Third Embodiment

In the above embodiments, the tape drawing actuator and the tape tension actuator help the DTF control of the magnetic head and carry out high-speed noiseless reproduction. In the present embodiment, the optimum tension control is enabled by using only the tape tension actuator. A third embodiment which enables suitable tape tension control only by the tape tension actuator will be explained hereinunder.

The structure of the tape tension actuator in the third embodiment is the same as those of the first and second embodiments. Tension control is also carried out in a wide frequency band with a high accuracy by a feedback system which presumes the relationship between an input voltage and displacement in the same way as in the first and second embodiments.

Structure of Tape Tension Actuator

Figure 43:
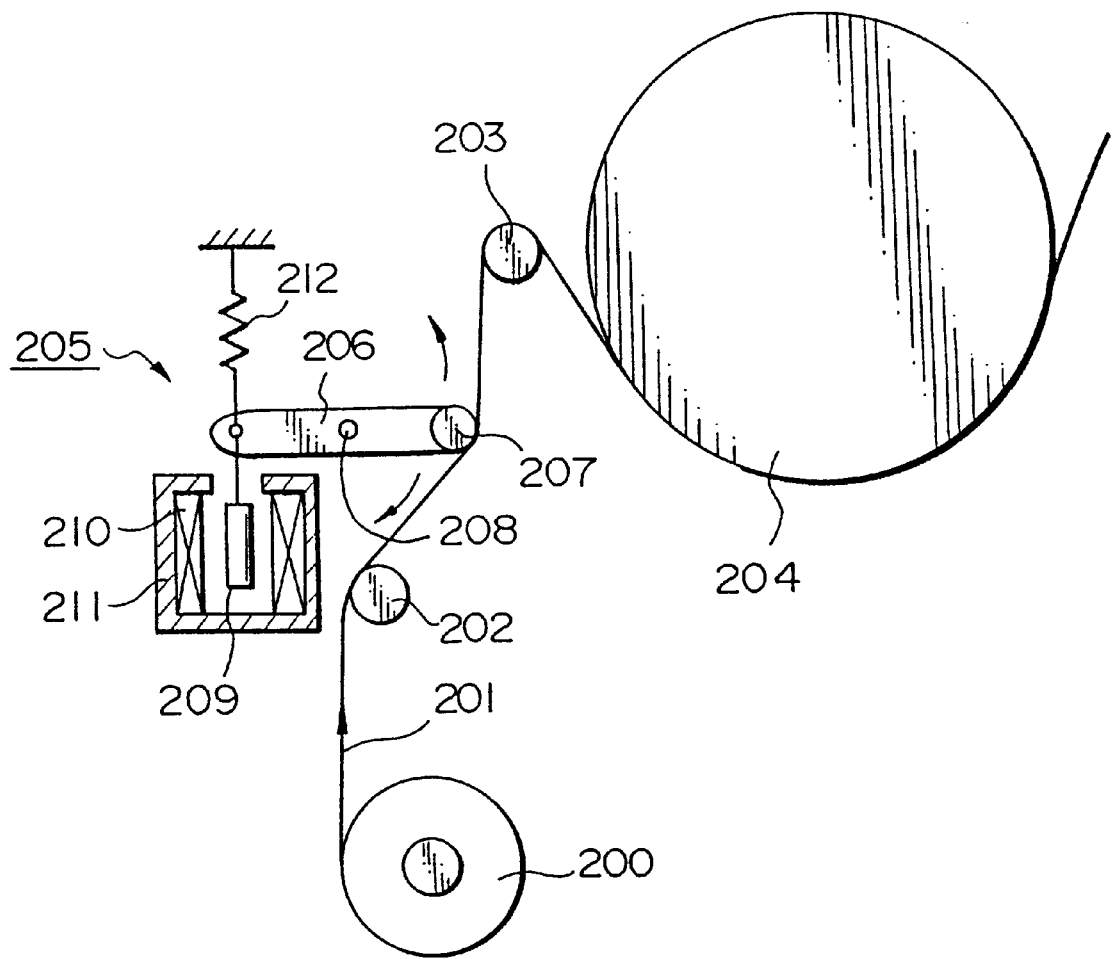
FIG. 43 shows the structure of a tension control mechanism using the tension control system in a third embodiment of the present invention.

FIG. 43 shows a structure of a tape tension actuator similar to that of the tape tension actuators 62 in the first and second embodiments, respectively.

In FIG. 43, a tape 201 fed from a feed reel 200 is introduced to a rotary drum 204 through fixed pass rollers 202 and 203.

A tape tension actuator 205 includes a rocking arm 206 and a tension roller 207 provided at one end thereof is moved in the direction indicated by the arrow and adjusts the tension of the tape which comes into contact therewith, as desired.

The rotary shaft of the rocking arm 206 is represented by the reference numeral 208, and a permanent magnet 209 is fixed at the other end the rocking arm 206. Around the permanent magnet 209, an exciting coil 209 is fixed and, as a result, by supplying a predetermined exciting current to the exciting coil 210, the permanent magnet 209 is moved to a predetermined position, as desired.

In FIG. 43, the exciting coil 210 is fixed on a yoke 211. The yoke 211 has a magnetic shielding effect for preventing the leakage of a magnetic flux to the outside. The rocking arm 206 is rockably supported by a gimbal spring 212 or the like.

Although FIG. 43 schematically shows the structure of the tension actuator 205, the concrete structure of thereof can be the same as that shown in FIGS. 15 and 16.

Figure 44:
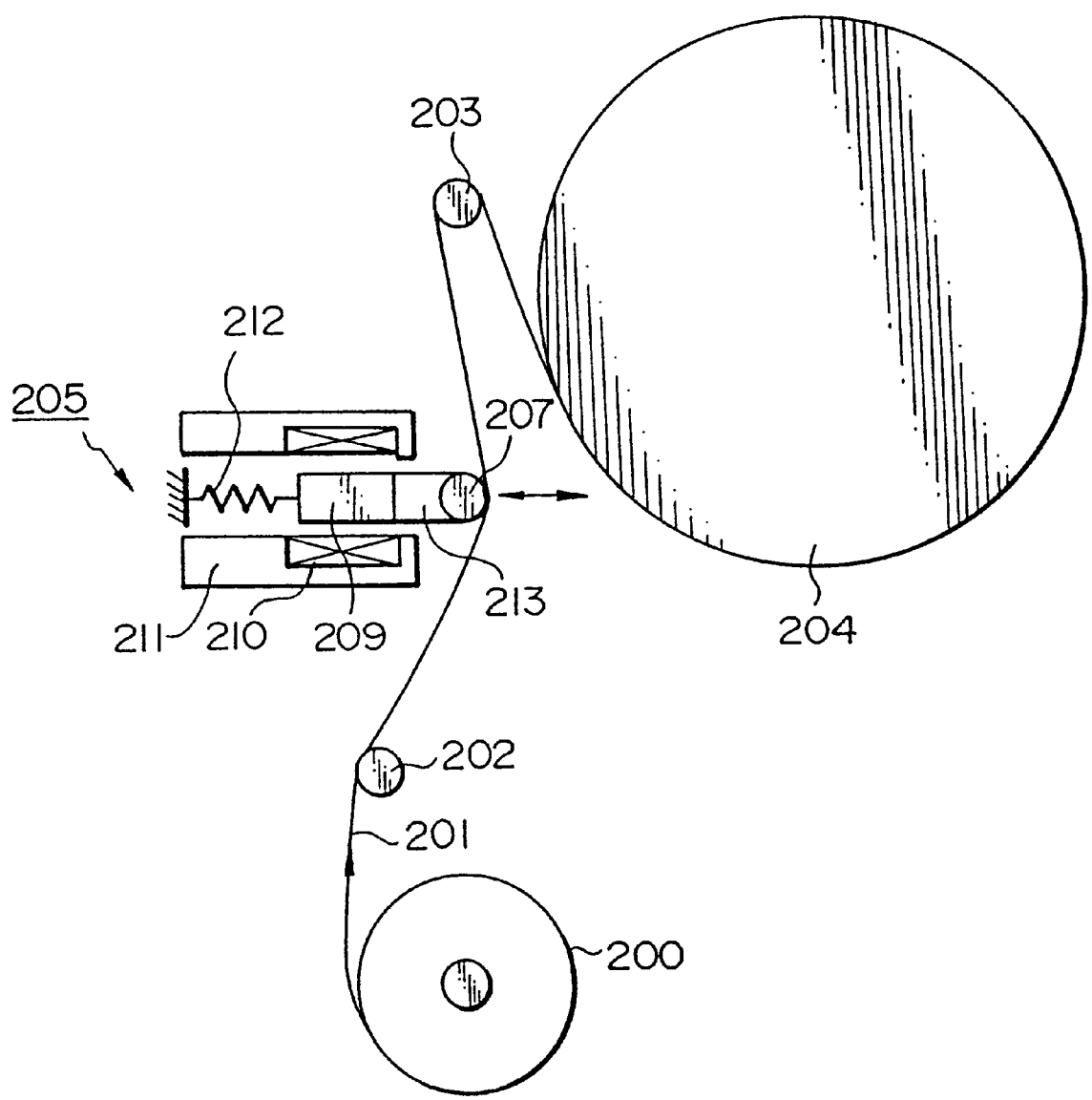
FIG. 44 shows the structure of a modification of the tension control mechanism shown in FIG. 43.

FIG. 44 shows a modification of this embodiment. In this modification, a tension arm 212 is directly connected to the permanent magnet 209, and the tension arm 212 and the tension roller 207 linearly move, as shown in FIG. 44.

Figure 45:
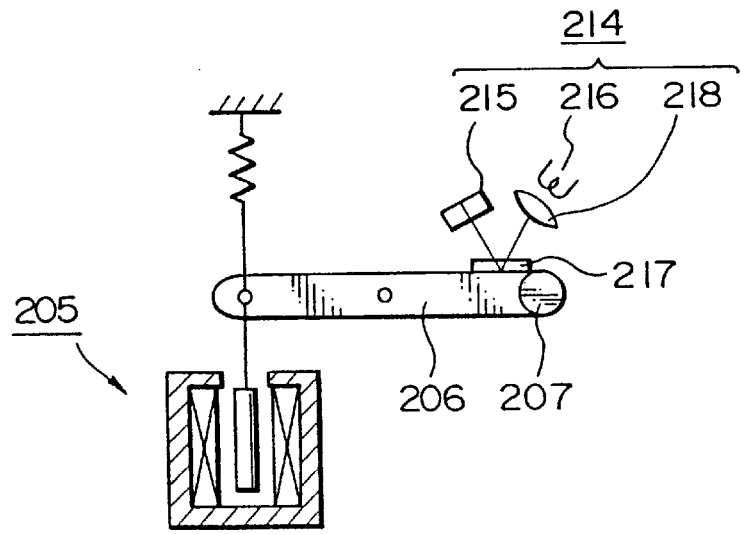
FIG. 45 shows the structure of an optical sensor for detecting the amount of displacement of the tension arm shown in FIG. 43.

In this embodiment, the position of the tension roller 207 is constantly detected and compared with the reference value or an estimated external disturbance value for a predetermined tension control. FIG. 45 shows a position sensor of the tape tension actuator 205 shown in FIG. 43.

A position sensor 214 includes a light emitting device such as a laser diode or an LED and a separation light receiving device 216 such as a photodiode.

The rocking arm 206 is provided with a reflecting mirror 217 for reflecting the light from the light emitting device 215, and the reflected light enters the light receiving device 216 after it is converted into parallel rays by a lens 218.

Therefore, the amount of light entering the light receiving device 216 or the position at which light enters the light receiving device 216 is changed by the rocking motion of the rocking arm 206, whereby the position of the tension roller 207 is electrically detected.

Figure 46:
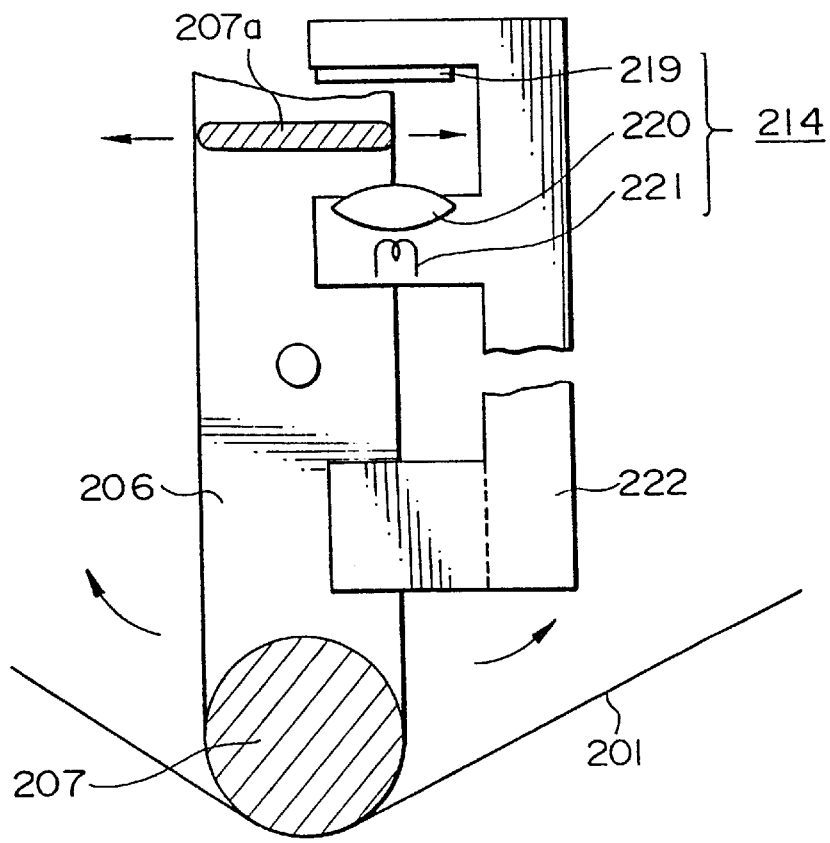
FIG. 46 shows the structure of a modification of the optical sensor shown in FIG. 45.

FIG. 46 is another example of the position sensor 214. The position sensor 214 includes a light emitting device 219, a collimator lens 220 and a light receiving device 221, and each of these elements is supported in a fixed state by a holder 222.

The rocking arm 206 is provided with a light shielding portion 207a and the interruption by the light shielding portion 207a between the light emitting device 219 and the light receiving device 221 enables electrical position detection.

Figure 47:
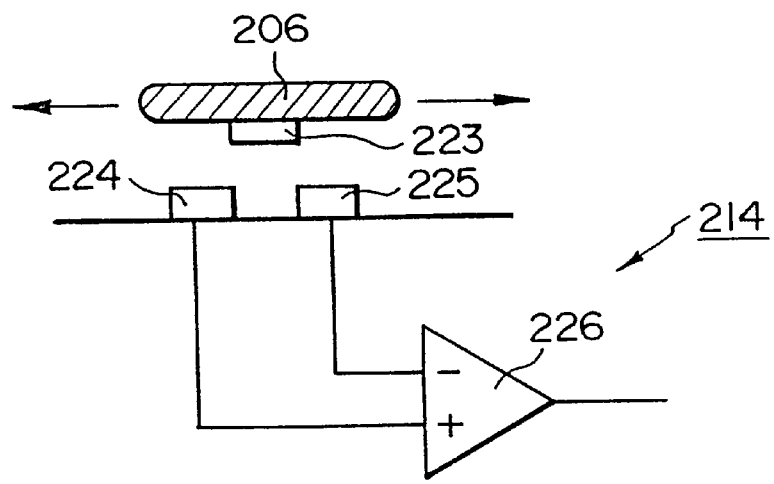
FIG. 47 is an explanatory view of a magnetic sensor for detecting the amount of displacement of the tension arm shown in FIG. 43.

Positional detection is also possible by a magnetic sensor. FIG. 47 shows an example of such a magnetic sensor.

In FIG. 47, a permanent magnet 223 is fixed to the rocking arm 206, and two Hall elements 224 and 225 are fixed in the vicinity of the permanent magnet 223. By comparing the outputs of both Hall elements 224, 225 by a differential amplifier 226, it is possible to obtain a desired position signal.

Figure 48:
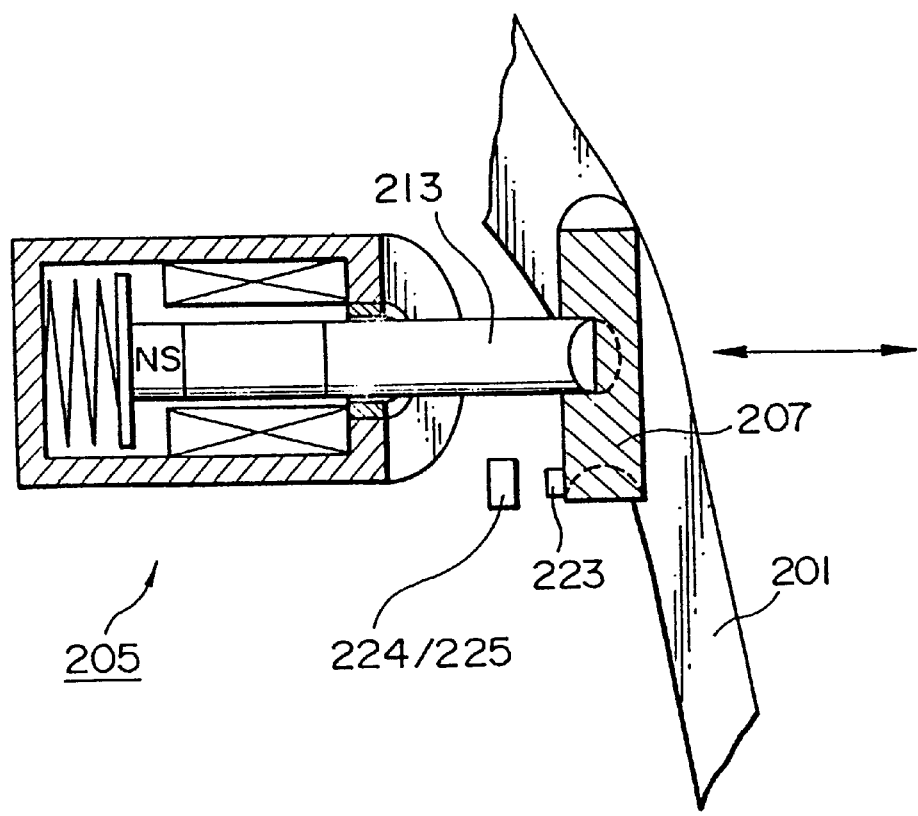
FIG. 48 is an explanatory view of a magnetic sensor for detecting the amount of displacement of the tension arm shown in FIG. 44.

Such a magnetic sensor is incorporated into the tape tension actuator 205, as shown in FIG. 48.

The tape tension actuator 205 shown in FIG. 48 is the same as that shown in FIG. 44 and the permanent magnet is fixed to a part of the tension roller 207 which is fixed to the tension arm 213.

Tension Control System

Figure 49:
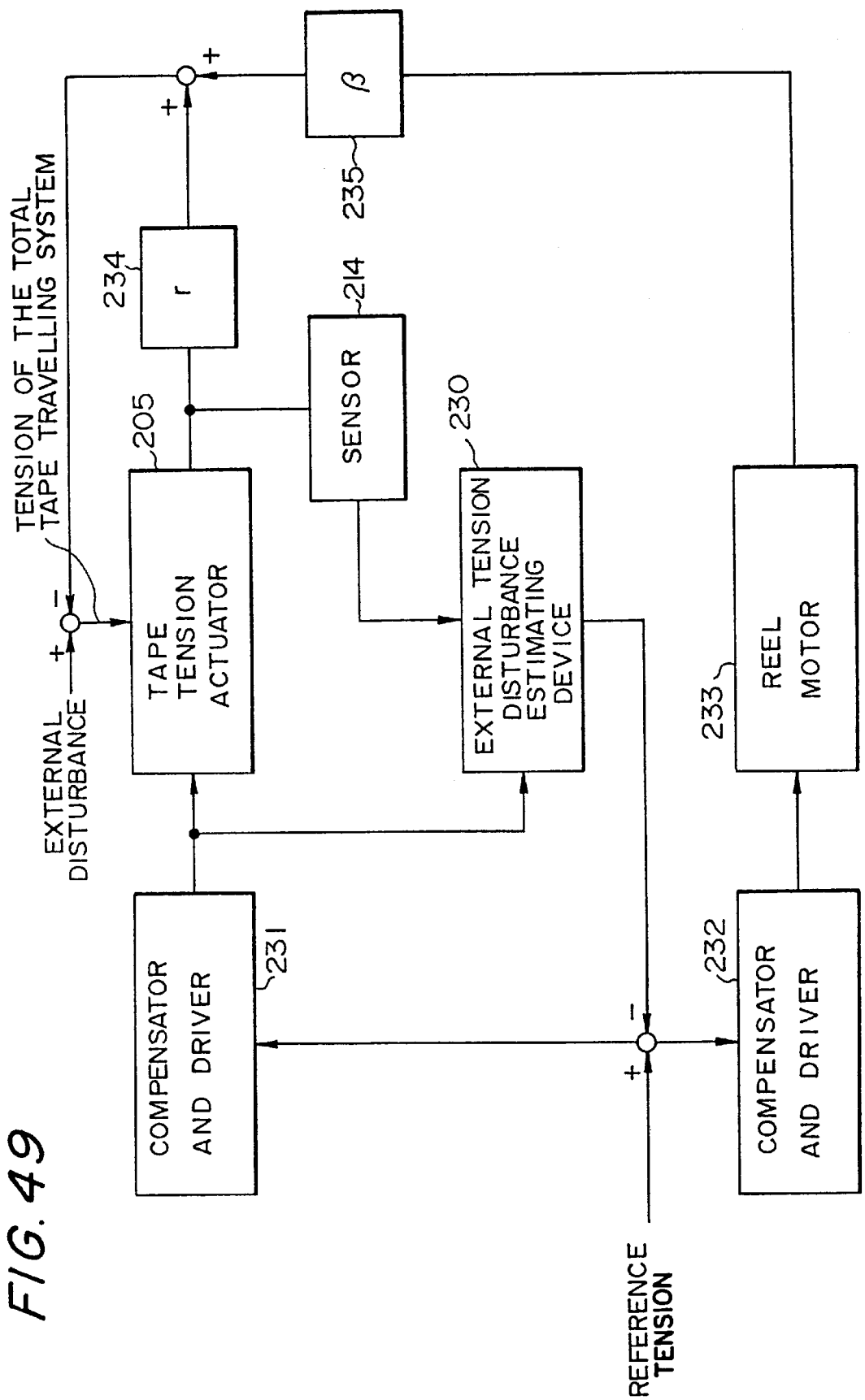
FIG. 49 is a block diagram of the tension control system in the third embodiment.

An example of a tension control system using the tape tension actuator 205 and the position sensor 214 is shown in FIG. 49. This control system resembles the control system in the first embodiment shown in FIG. 26.

This control system is characterized in that the external tension disturbance is electrically estimated by an external tension disturbance estimating device 230 from the input voltage of the tape tension actuator 205 and the displacement of the tension roller detected by the position sensor 214.

This control system is further characterized in that the tension error obtained by comparing the estimated value with the reference value is divided into a high-frequency component and a low-frequency component, the former being supplied to the tape tension actuator 205 and the latter to the feed reel motor 233.

The high-frequency component of the tension error is supplied from a compensator and a driver 231 to the tape tension actuator 205, and the low-frequency component thereof is suppled from a compensator and a driver 232 to the feed reel motor 233.

When the tape tension actuator 205 and the feed reel motor 233 correct the errors, these changes in tension are replaced by characteristic circuits 234 and 235 and fed back to the tape tension actuator 205.

In FIG. 49, the tension change caused by the displacement of the tape tension actuator 205 and the tension change caused by the displacement of the feed reel motor 233 are first added. To the sum is then added an external disturbance such as an external disturbance produced by the friction between the shaft and the drum which is received by the tape and a change in the frictional coefficient of the tape, and the total sum is fed back to the tape tension actuator 205. That is, this total sum represents the total tension of the magnetic tape travelling system. In this way, with due consideration of all elements of a tension error, this control system enables tension correction in a wide frequency band with a high accuracy.

Figure 50:
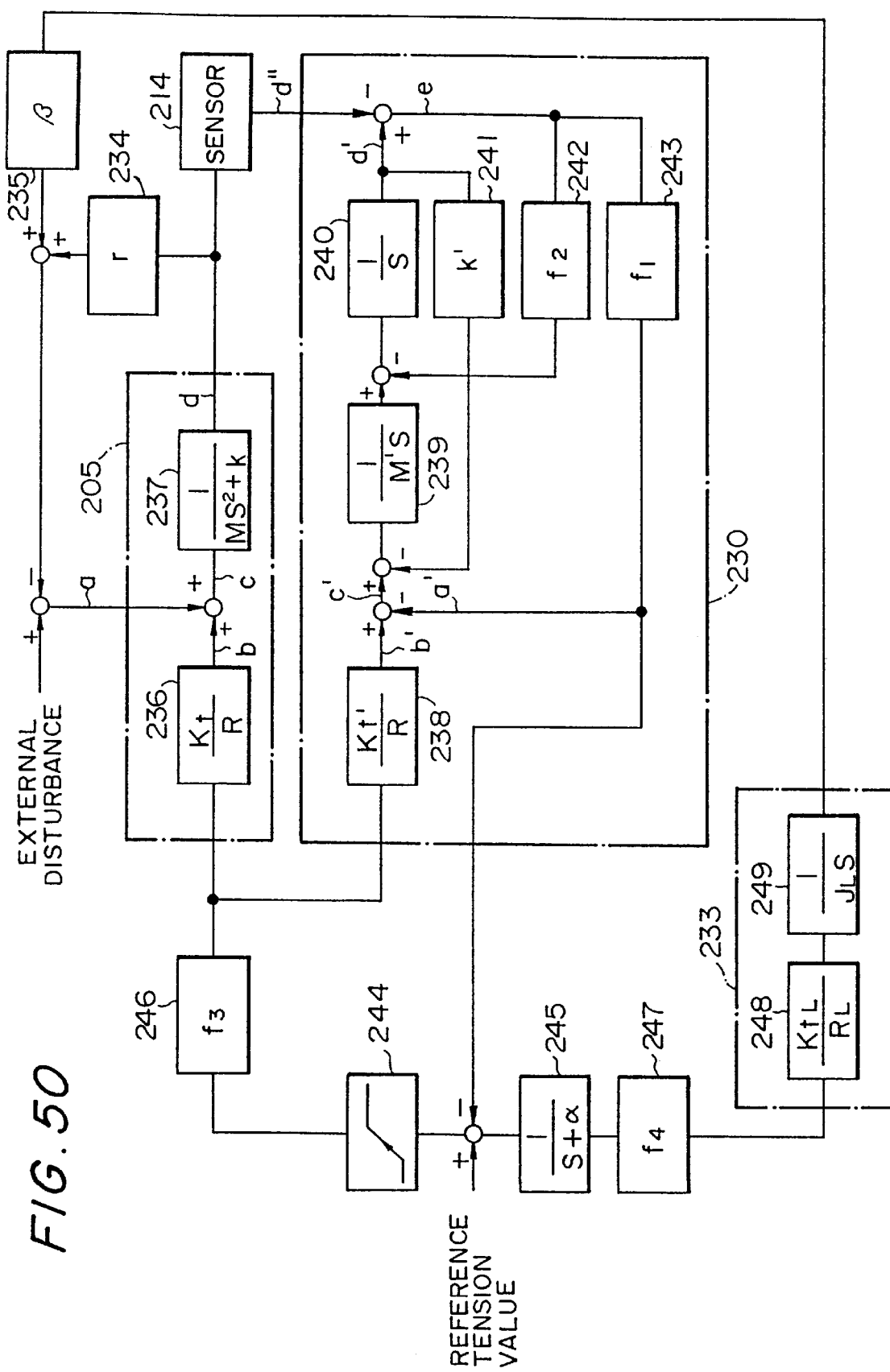
FIG. 50 is a block diagram of the principle of control of the tension control system shown in FIG. 49 which is represented by transfer functions.

FIG. 50 is obtained by converting the block diagram of the tension control system shown in FIG. 49 into the transfer functions of the control theory. The symbol s is a Laplace operator.

The reference numeral 236 represents a transfer function including the coil resistance R in the tape tension actuator 205 and the force constant $K_{tR}$ of the electromagnetic driver, and 237 represents a transfer function including the spring constant k of the tape tension actuator 205 and mass M of the movable portion. The reference numeral 238 represents a transfer function circuit electrically simulating the transfer function 236, and the reference numeral 239 represents a transfer function which constitutes a feedback loop together with transfer function circuits 240 and 241 and simulates the transfer function 237 by the equivalent conversion of the control theory. The reference numerals 242 and 243 are the feedback gains of the observer (tension control system) which are fed back so as to converge the differences between the output of the position sensor 214 and the respective outputs of the transfer function circuits 239 to 241 are on zero in order that the dynamic characteristics of the transfer functions 238 to 241 which simulate the characteristic of the tape tension actuator 205 agree with the characteristic of the actual tape tension actuator 205.

The reference numeral 244 represents a high pass filter, which is a part of the compensator for feeding back a comparatively high frequency component in the controlled region in the tension control system to the tape tension actuator 205, and 245 represents a low pass filter, which is a part of the compensator for feeding back a comparatively low-frequency component in the controlled region of the tension control system to the feed reel motor 233. The reference numeral 246 represents the gain of an amplifier for determining the loop gain of a feedback loop with respect to the tape tension actuator 205 and the reference numeral 247 represents the gain of an amplifier for determining the loop gain of the feedback loop with respect to the feed reel motor 233. The reference numeral 248 represents a transfer function indicating the coil resistance $R_L$ and the torque constant $K_{tL}$, and 249 represents a transfer function indicating the rotational inertia J of the feed reel motor 233.

Operation of Third Embodiment

The operation of the tension control system in the third embodiment will now be explained.

In a conventional tension control, when the force of the spring 22 is balanced with the tape tension, the amount of displacement of the tension control arm 21 is regarded as the tension, and the amount of displacement is fed back to the reel motor 6 as the detected tension value, as shown in FIG. 81.

Strictly speaking, however, it is up to the spring resonance frequency of the tension control arm 21 which is supported by the spring that the amount of displacement of the tension control arm 21 supported by the spring is proportional to the tape tension, and beyond the spring resonance frequency, the phase of the change in the tension applied to the tension control arm 21 is deviated from the phase of the change in the position of the tension control arm 21. Actually, the phase is shifted by 90 degrees at the spring resonance frequency and by 80 degrees at a higher frequency. As a countermeasure, in a conventional tension control system, the controlled region is limited by the phase shift of the spring support system including the tension control arm 21. This means that the tension detectable by the tension control arm 21 is limited to the frequency band of not higher than the spring resonance frequency of the spring support system including the tension control arm 21. It will naturally be considered to lighten the tension control arm or increase the spring constant in order to heighten the spring resonance frequency. However, there is a limitation in lightening the tension control arm, and if the spring constant is increased, the tension control arm 21 does not move much even if there is a change in tension, for thereby lowering the detection accuracy.

In contrast, in this embodiment, it is possible to detect tension in a wide frequency band irrespective of the spring resonance frequency of the tension control arm 21.

In this embodiment, a tension estimating device constitutes what is called a co-dimensional observer (hereinunder referred to as "tension estimating device") in the modern control theory which electrically simulates the transfer characteristic (driving current or input voltage/displacement) of the tape tension actuator. It is therefore possible to detect the tape tension applied to the tape tension actuator in a wider frequency band in comparison with the conventional mechanical tension detector such as that shown in FIG. 81.

The above-described principle will be explained in more detail. FIG. 50 shows the transfer functions of the tension estimating device.

In FIG. 50, when a driving voltage to be input to the tape tension actuator 205 is input to the circuit which simulates the coil resistance R and the force constant $K_t$, the output b' of the tension estimating device 230 becomes the estimated value of the actual driving force b of the tension control system. If the transfer functions of the circuits 239, 240 and 241 which constitute the feedback group are equivalently converted by the control theory, the following equation holds:

$$\frac{\frac{1}{M'S} \cdot \frac{1}{S}}{1 + \frac{1}{M'S} \cdot \frac{1}{S} \cdot k'} = \frac{1}{M'S^2 + k'}$$

That is, the transfer function circuits 239, 240 and 241 simulate the transfer function circuits 237 of the tape tension actuator 205. Therefore, when the output b' of the transfer function circuit 238 is input, the output d' of transferring the transfer function circuits 239, 240 and 241 ought to be the estimated value of the output d of the tape tension actuator 205. However, the transfer function circuits 239, 240 and 241 are provided with an integrator therewithin, and even if the transfer functions are the same as the characteristic output from the transfer function circuit 237 in the tape tension actuator 205 with respect to the frequency characteristics, the dynamic characteristics thereof are not equal thereto due to a difference in the initial values of the integrators. Therefore, the difference e between the actual amount of displacement d" detected by the position sensor 214 and the estimated value d' of the tension estimating device 230 is fed back at gains of $f_1$ and $f_2$, whereby the dynamic characteristics as well as the frequency characteristics agree with those of the actual tape tension actuator 205.

The above-described structure is well known as the structure of a co-dimensional observer in the modern control theory. It is in order to freely determine the convergence of the observer that the signals are fed back in the two loops at the gains of $F_1$ and $F_2$ to the input terminals of the transfer function circuits 239 and 240 which include the integrator (1/S in a Laplace conversion) in the model of the tape tension actuator 205. A co-dimensional observer to which the driving voltage and the displacement of an object of control are input is generally used to estimate the internal speed thereof. If the feedback gains $f_1$, $f_2$ of the co-dimensional observer are adequately larger than the pole of the observer (the negative real number is large), in other words, if the values of $f_1$, $f_2$ are large (high gains), in the state in which the dynamic characteristic and the static characteristic of the object of control agree with each other, it is possible to estimate the tension. At this time, since the dynamic characteristic agrees with the static characteristic, the following relationship holds:

$$d' = d \tag{21}$$

The relationship between the poles is the same as in FIG. 30 for the first embodiment.

Since the transfer function circuit 236 and the model thereof do not include an integrator, the driving force b' is represented as follows:

$$b' = b \tag{22}$$

Since the dynamic characteristic of the object of control agrees with that of the model in the observer, the speed and the acceleration as well as the displacement agrees those of the model. Therefore, the force c' applied to the arm of the tape tension actuator 205, which is equivalent to M times of the acceleration is represented as follows:

$$c' = c \tag{23}$$

Since the sum of the driving force b and the torque a is the torque c in the original tape tension actuator 205, as in the following equation;

$$b + a = c \tag{24}$$

the following relationship holds from the formulas 21 to 24:

$$b' + a = c' \tag{25}$$

$$b' - c' = a$$

that is, $$a' = a \tag{26}$$

This means that a' in the signal path in the observer represents a tension, and that it is possible to detect the tension irrespective of the spring resonance of the tension mechanism by taking out a'.

The estimated tension a' is compared with the reference tension value, and only the high-frequency component of the tension error is taken out by the high pass filter 244 and fed back to the tape tension actuator 205 at a gain of $f_3$. Simultaneously, the low-frequency component is taken out by the low pass filter 245 and fed back to the feed reel motor 233 at a gain of $f_4$. The reason why the frequency band is divided as described above is because the tape tension actuator 205, which has a small mechanical time constant, is generally suitable for the control in a high-frequency band but since the movable range is limited, it is impossible to control a change in the tension which has a controlled valuable approximate to that for a direct current.

In the pole-positioning of the feedback gains $f_3$ and $f_4$, for example, the points which are closer to the original point than to the pole of the observer (for example, about 1/10 of the pole 157 by the real number) are selected for the pole of the tension control loop to the tape tension actuator 205 and the pole of the loop to the feed reel motor 55. This relationship is also the same as in FIG. 30 for the first embodiment.

FIG. 34 shows the transient behavior of the estimated external disturbance at this time. The actual tension value agrees with the estimated tension value after a constant time.

In the above system, the principle and the operation of the tension control in the third embodiment have been explained. In some cases, the permanent magnet 209, the exciting coil 210, the yoke 211, etc. shown in FIG. 43 cannot be mounted on the actual tape tension actuator 205 due to the limitation in space or cost.

Figure 51:
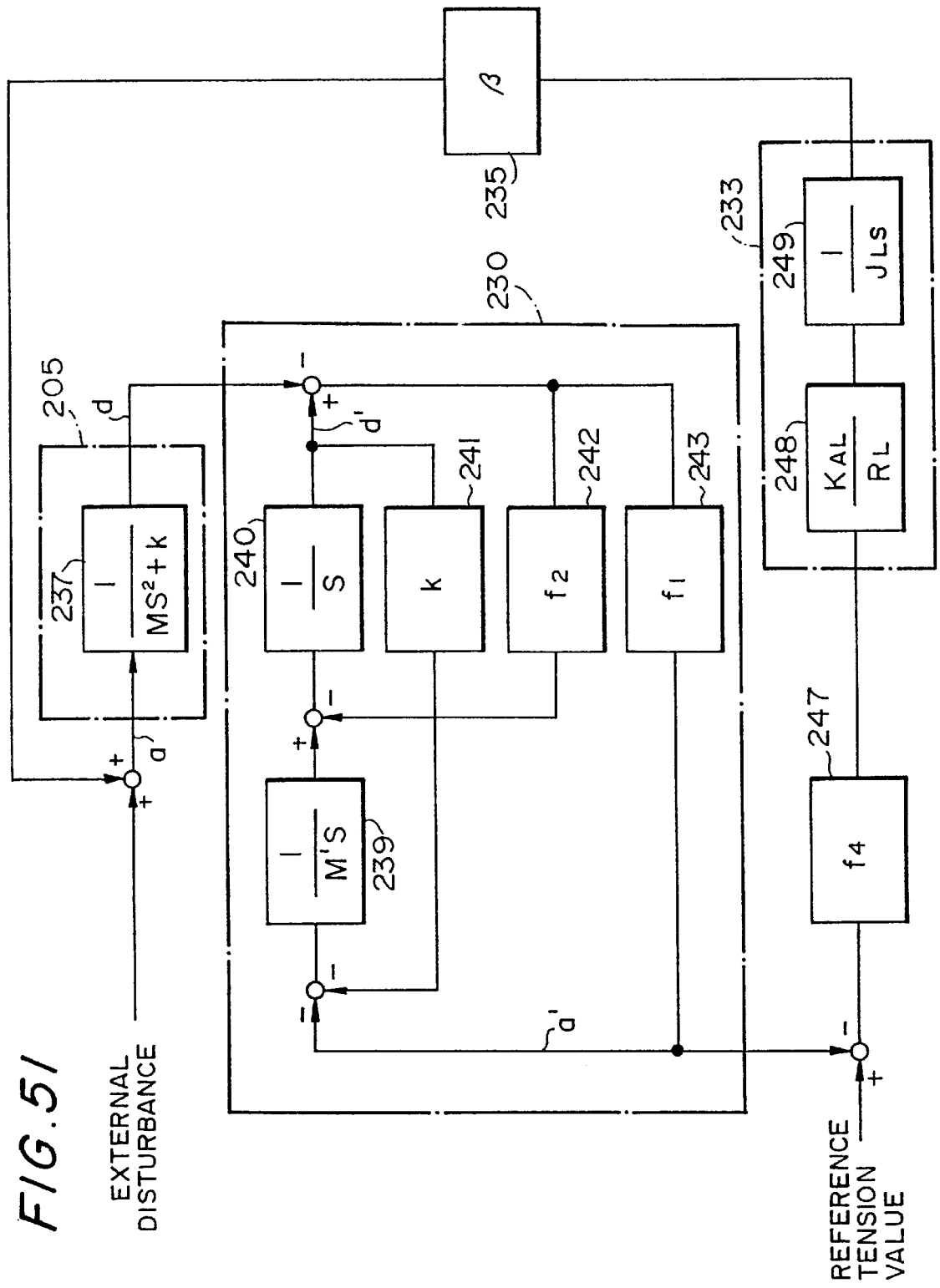
FIG. 51 is a block diagram of the principle of control of the tension control system having no driving portion which is represented by transfer functions.

According to the tension control system in this embodiment, even in the case in which the tension roller cannot be controlled by an electromagnetic driving device, as described above, it is possible to control a tension in a wider frequency band than a conventional tension control system. An example is shown in FIG. 51. FIG. 51 is obtained by replacing the input voltage of the tape tension actuator 205 by a constant of 0 and the input voltage of the external tension disturbance estimating device 230 by a constant of 0.

The operation of the tension control system shown in FIG. 51 is the same as the operation of the tension control system shown in FIG. 50 except that in the formulas 20 to 26, it is assumed that b=0, b"=0. In this case, the a' in the signal path in the external tension disturbance estimating device 230 is the estimated external tension disturbance. Therefore, after a' is compared with the reference tension, it is fed back to the feed reel motor 233 at a gain of $f_4$, for thereby enabling a change in the tension of the magnetic tape travelling system to be suppressed in a wider frequency band than a conventional tension mechanism.

When the tension is controlled by the above-described method of estimating the external tension disturbance, the estimated tension is exactly detected up to a much higher frequency than that substituted by the amount of displacement of the tension control arm as in a conventional tension control mechanism, for thereby realizing tension control in a very wide frequency band.

The open loop characteristic such as that shown in FIG. 25 can also be obtained in the tension control system shown in FIG. 50. That is, if the gain of the loop of the tape tension actuator 205 in a high-frequency range is made higher than that of the loop of the reel motor, for example, 20 dB/ded, so as to suppress the phase shift to not more than 90° in the controlled region and to secure the stability as a whole, it is possible to secure the gain of the reel motor loop in a low-frequency range.

Since loops are complicatedly intertwined in such tension control unlike in a simple feedback loop having one input and one output, a large amount of operation is required. Although the integrator, amplifier, adder, subtracter or the like can naturally be constituted by an analog circuit by using an operational amplifier or the like which produces few offsets and drifts, since such an amplifier is expensive and the circuit grows to large scale, it is desirable to digitally operate by a microcomputer or the like. The structure of the hardwares in the control system shown in FIG. 50 which is constituted by a microcomputer is such as that shown in FIG. 36 for the first embodiment. It is possible to realize the control system having very little hardware, as shown in FIG. 36.

As described above, according to this embodiment, since the tape tension actuator 205 suppresses a tension change in the high-frequency band and the feed reel motor 233 suppresses a tension change in the low-frequency band, the tension control accuracy is enhanced and a tension control system capable of tension control with a high accuracy in a wide frequency band and a wide dynamic range is realized.

Additionally, the actuator in this embodiment has a performance equal to the performance of a ceramic actuator of a piezoelectric element or the like, a rotary motor, an ultrasonic motor or the like.

As described above, according to this embodiment, the tension which the tension roller receives from the magnetic tape travelling system is estimated by the tension control system and a driving signal based on the output signal of the position sensor is fed back to either or both the tape tension actuator and the reel motor so that the estimated tension agrees with the reference tension. Consequently, it is possible to enlarge the tension controlled region, increase the amount of suppression of tension change and enhance the control accuracy. Thus, the present embodiment is especially effective for the tension control of a digital VTR and or a high-definition VTR the magnetic head of which is required to have a high recording density and which is required to control the space between the magnetic head and the magnetic tape to a constant value.

Structure of Tape Actuator

The concrete structure of the tape drawing actuator and the tape tension actuator which are used in each of the above-described embodiments will be described hereinunder.

FIGS. 52 to 56 show the concrete structure of a tape actuator incorporating a position sensor. A yoke holder 251 is fixed to a VTR base 250, and a yoke 252 is integrally fixed on the holder 251. A supporting shaft 253 is implanted in the yoke holder 251 and a roller arm 257 is rotatably supported by a support shaft 253 through upper and lower bearings 255, 256. A tape pass roller 258 is rotatably supported at the free end of the roller arm 257, so that when a magnetic tape (not shown) comes into contact with the roller 258, a predetermined stretch/relaxation or a desired tension value is imparted to the magnetic tape, as described above. The roller shaft 259 of the tape pass roller 258 is firmly fixed to the roller arm 257 by a screw 260, and adjustment of the tape pass roller 258 in the direction of the height is carried out by a screw 258a provided on the roller shaft 259.

A driving coil 262 is fixed to a coil holder 261 which is provided at the other end of the roller arm 257. The driving coil 262 can displace the tape pass roller 258 around the support shaft 253 by a given angle in cooperation with a permanent magnet 263 which is fixed to the yoke holder 251, as described above.

Figure 52:
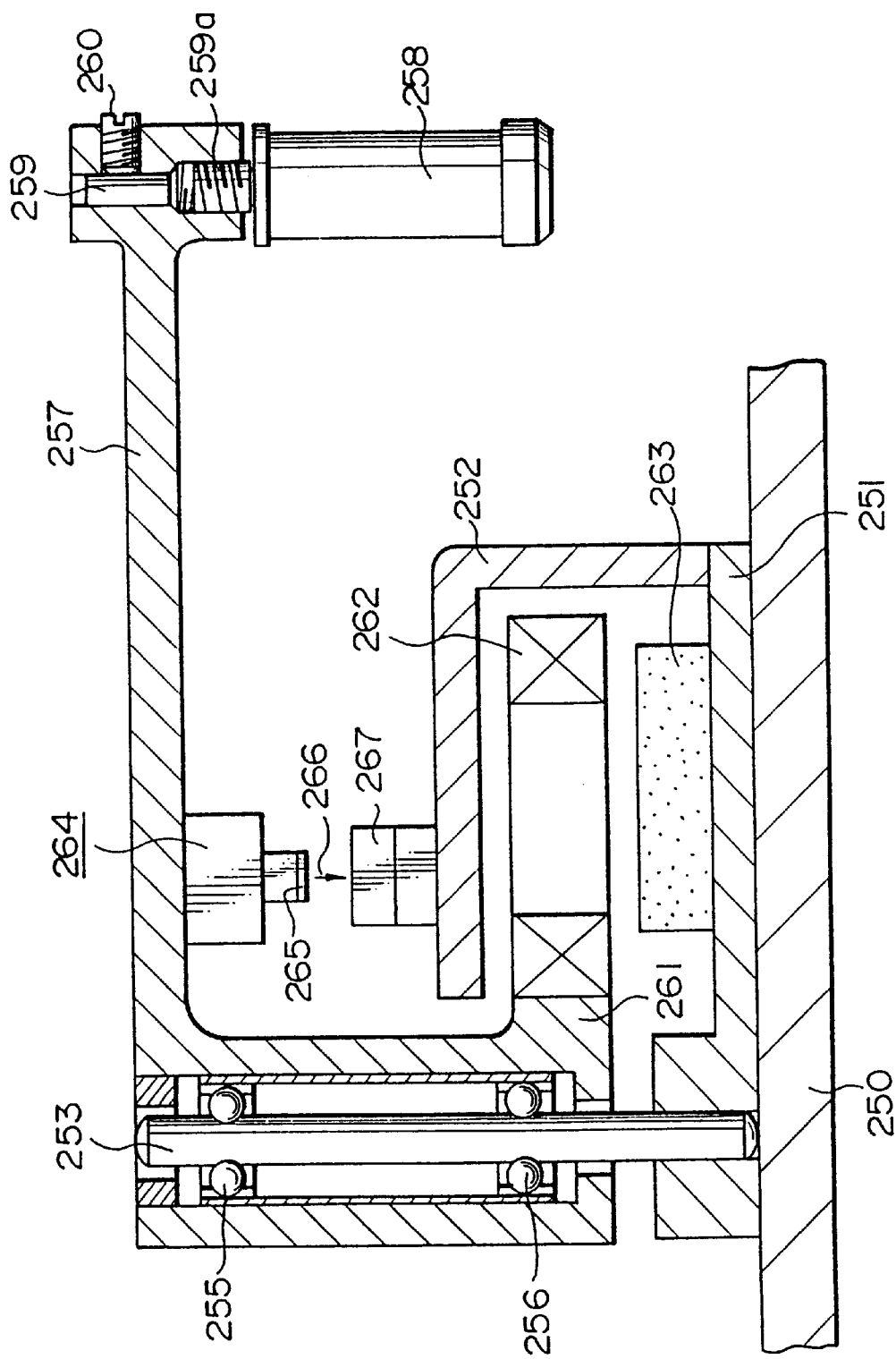
FIG. 52 is a detailed sectional view of a tape actuator driving mechanism in the third embodiment of the present invention.
Figure 53:
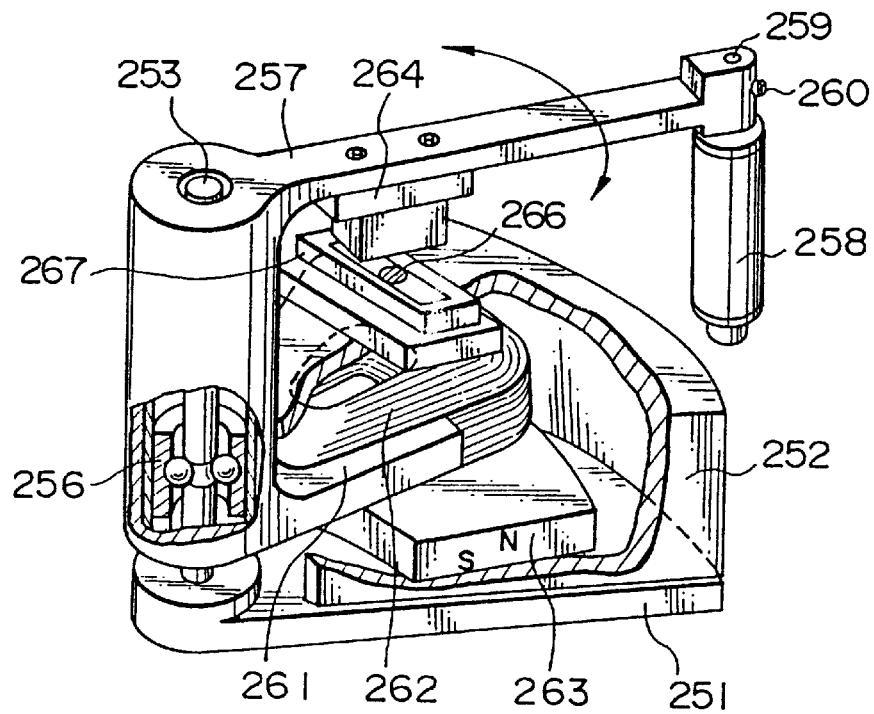
FIG. 53 is a partially cutaway perspective view of the tape actuator mechanism shown in FIG. 52.

In order to detect the position of the displacement of the roller arm 257, a light emitting device 264 such as a laser diode is provided on the roller arm 257, and the light which has passed through a slit plate 265 is emitted in the direction indicated by the arrow in FIG. 52.

The radiated light 266 is received by a one-dimensional type light receiving device 267 which is fixed on the yoke 252, whereby the position of the displacement of the roller arm 257 is electrically detected.

Figure 54:
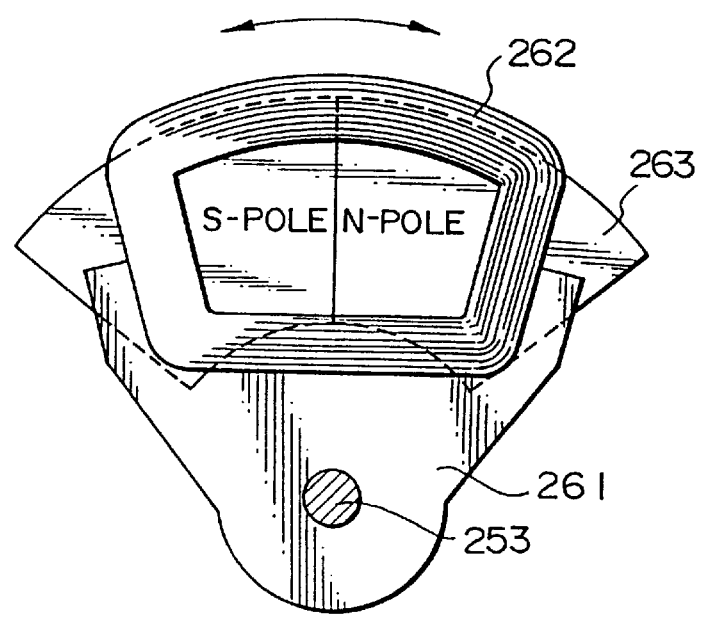
FIG. 54 is a plan view of the main part of the movable coil portion and the permanent magnet showing the positional relationship thereof.

As is clear from FIG. 54, the permanent magnet 263 has a configuration of a sector and is divided into two parts in the direction of the rotation of the driving coil 262.

Figure 55:
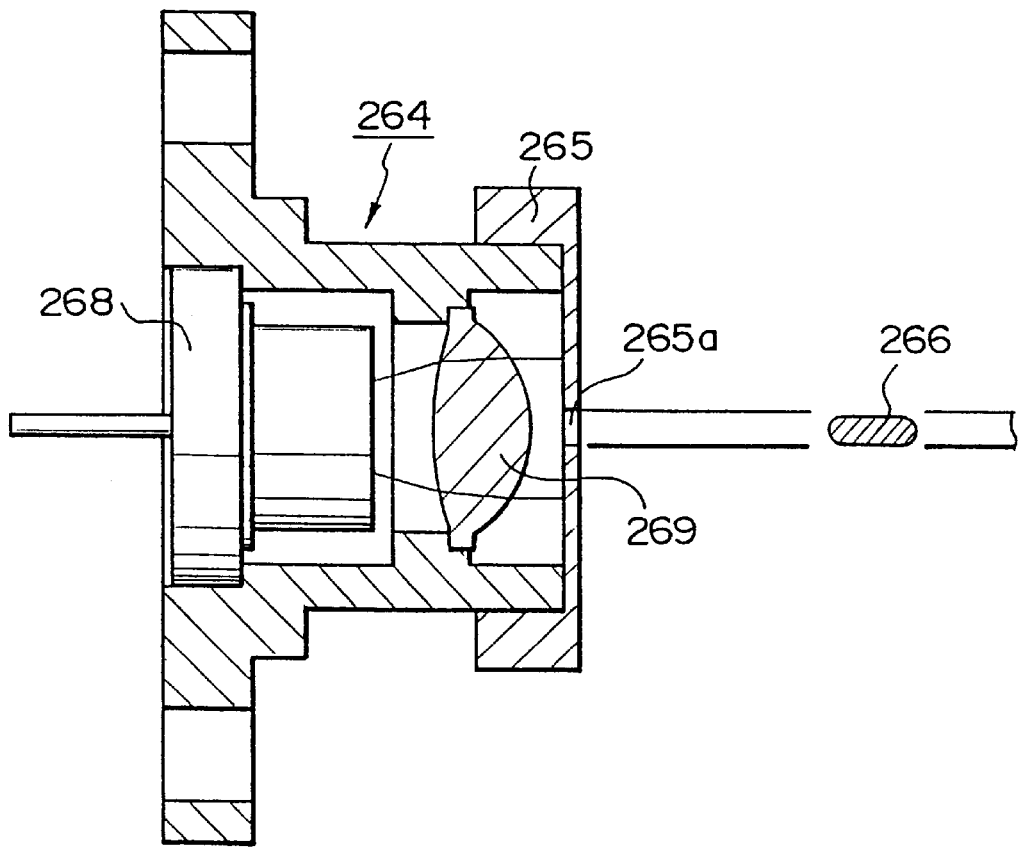
FIG. 55 is a sectional view of the structure of the main part of a light emitting portion.

FIG. 55 shows the light emitting device 264 and the slit plate 265. The laser beams radiated from a light emitting element 268 such as a laser diode are converted into parallel rays by a collimator lens 269. The parallel rays are emitted through the slit 265a of the slit plate 265 as slit light 266 having an oblong section.

Figure 56:
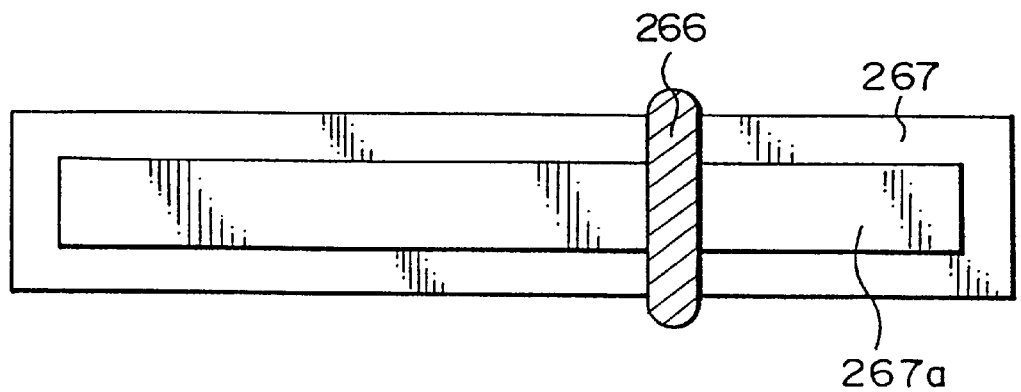
FIG. 56 is a schematic plan view of a light receiving element showing the positional relationship between a ray and the light emitting element.

FIG. 56 shows the slit light 266 radiated onto the light receiving surface 267a of the one-dimensional type light receiving device 267. As is clear from FIG. 56, it is possible to detect the position of the tape pass roller 258 from the slit light 266 which moves to the right-hand or left-hand direction.

As the light emitting device, an LED may be used in place of the laser diode.

Figure 57:
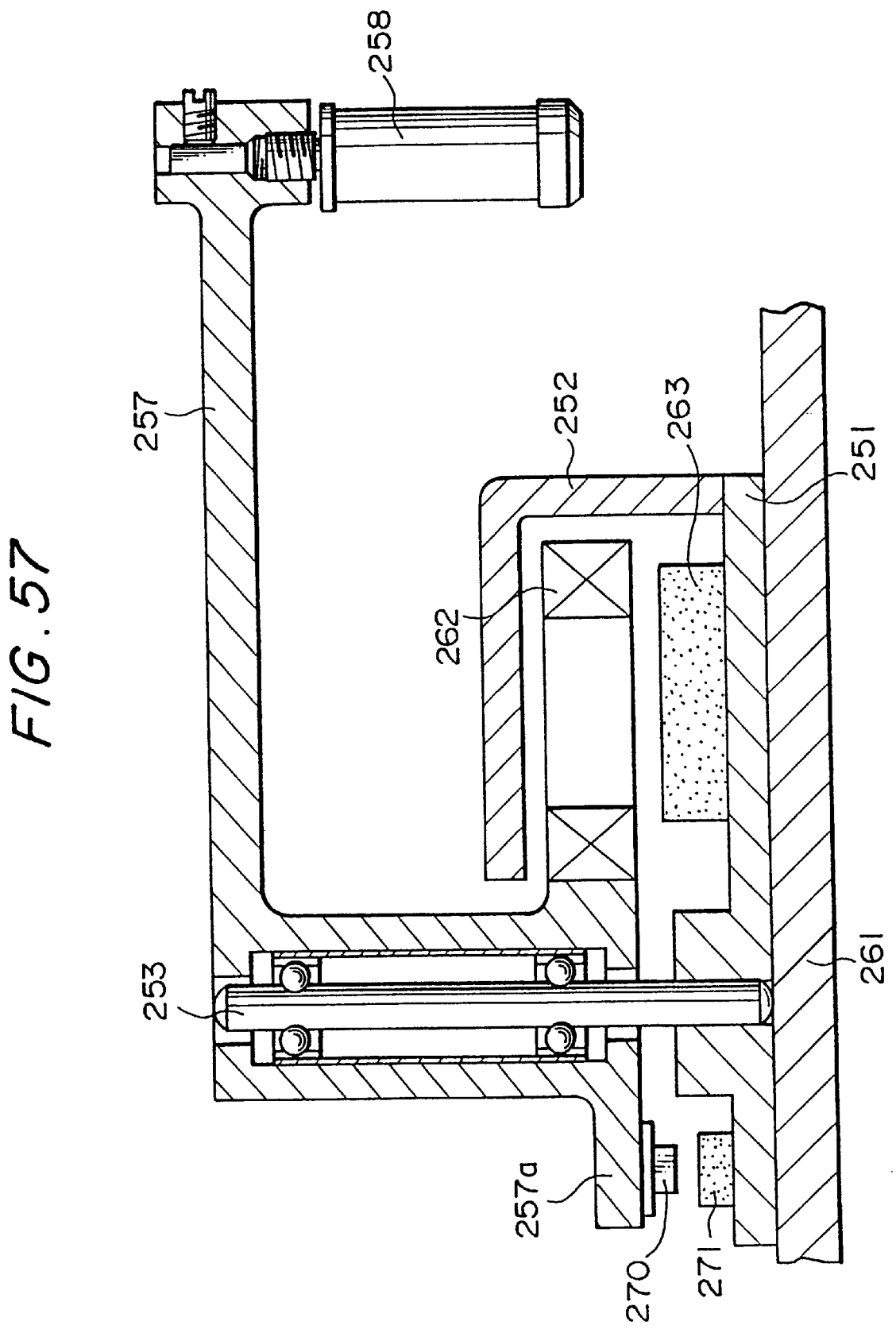
FIG. 57 is a sectional view of another example of the tape actuator driving mechanism.

FIG. 57 shows another example of an actuator which resembles that shown in FIG. 52. The same numerals are provided for the elements in FIG. 57 which are the same as those shown in FIG. 52, and an explanation thereof will be omitted.

In the example shown in FIG. 57, a magnetic element, but not an optical element, is used as the position sensor.

A Hall element 270 is fixed on the distal end 257a of the roller arm 257, and a magnet 271 is fixed on the base 251 at the position facing the Hall element 270. The relative relationship between the Hall element 270 and the magnet 271 displaces with the rotation of the roller arm 257, whereby the position of the tape pass roller 258 is electrically detected.

Figure 58:
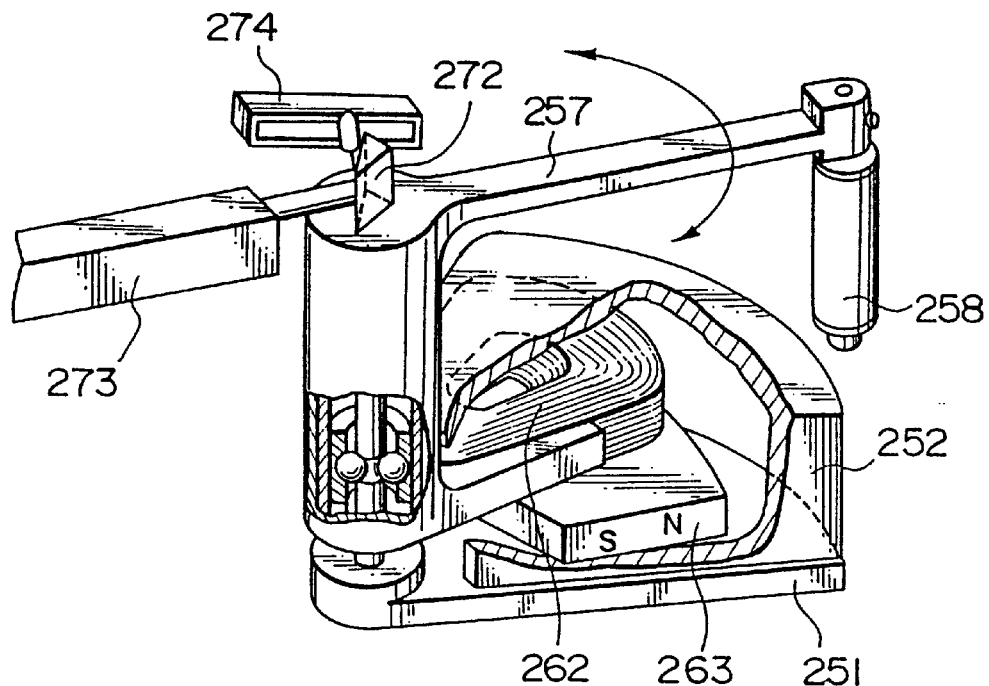
FIG. 58 is another example of a tape actuator with a reflecting mirror type position detector mounted thereon.

FIG. 58 shows still another example of an actuator. In this actuator, the position sensor is composed of a reflecting mirror 272 fixed on the rotary shaft of the arm 258. The laser beams radiated from a light emitting device 273 is reflected by the mirror 272 and received by a light receiving device 274, whereby the rotational angle of the roller arm 257 is electrically detected.

Figure 59:
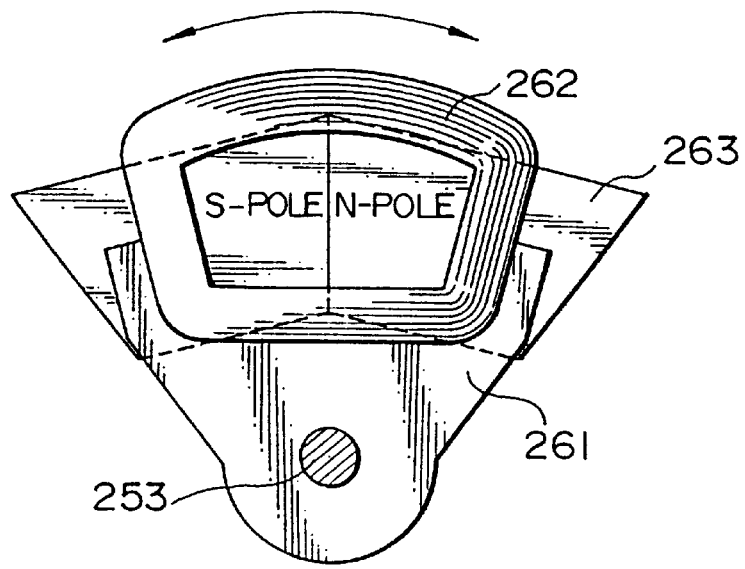
FIG. 59 is a plan view of the main part of another example of the permanent magnet shown in FIG. 54.

FIG. 59 shows another example of the permanent magnet 263 shown in FIG. 54. As is obvious from FIG. 59, the permanent magnet 263 is composed of two connected trapezoidal magnets.

Figure 60:
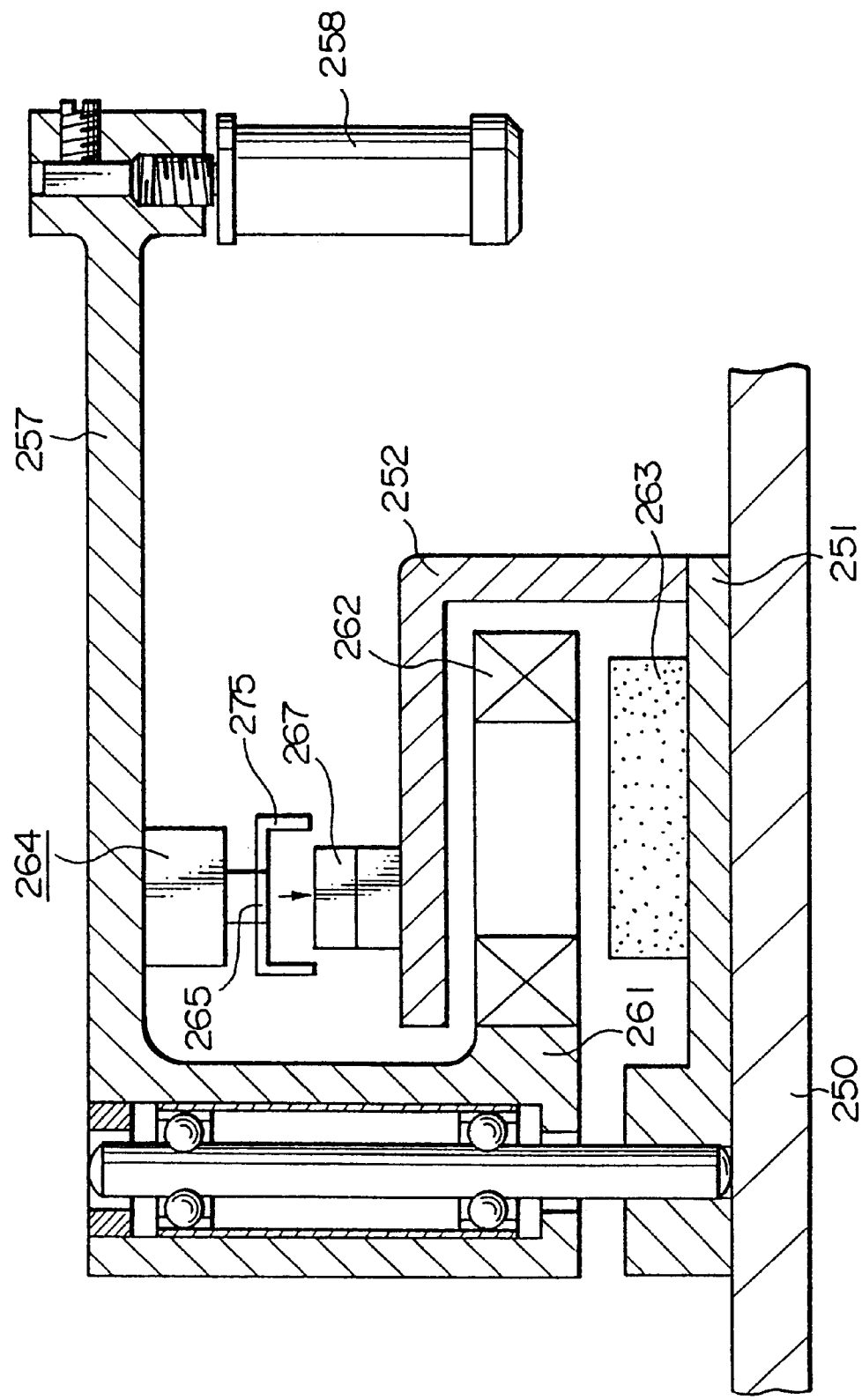
FIG. 60 is a sectional view of still another example of a tape actuator provided with a position sensor having a light shielding plate.

FIG. 60 shows a further example of the actuator shown in FIG. 52. A light shielding plate 275 is provided between the slit plate 265 and the light receiving device 267 so as to prevent the ingress of the outside light.

Figure 61:
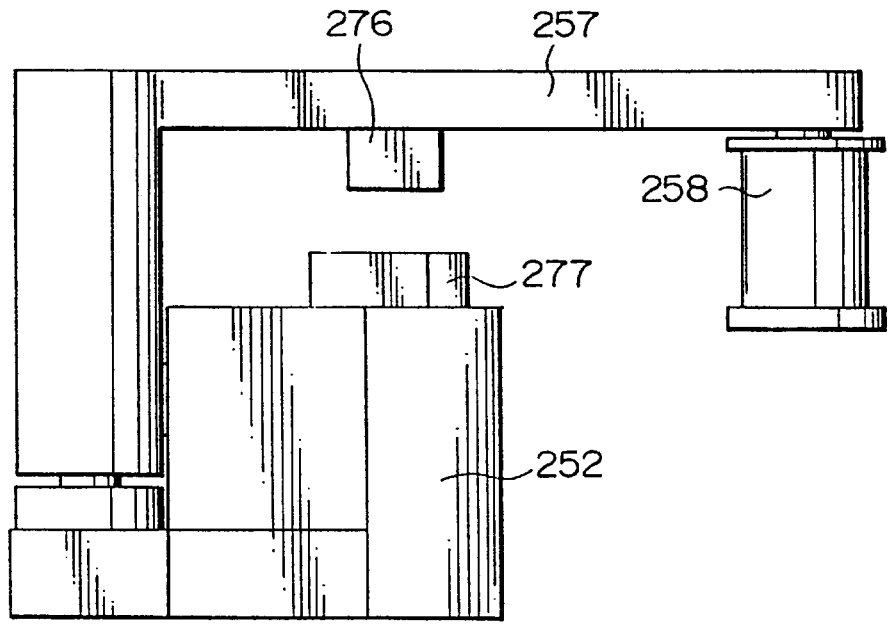
FIGS. 61 and 62 show further examples of a tape actuator provided with a position sensor having a Hall element.
Figure 62:
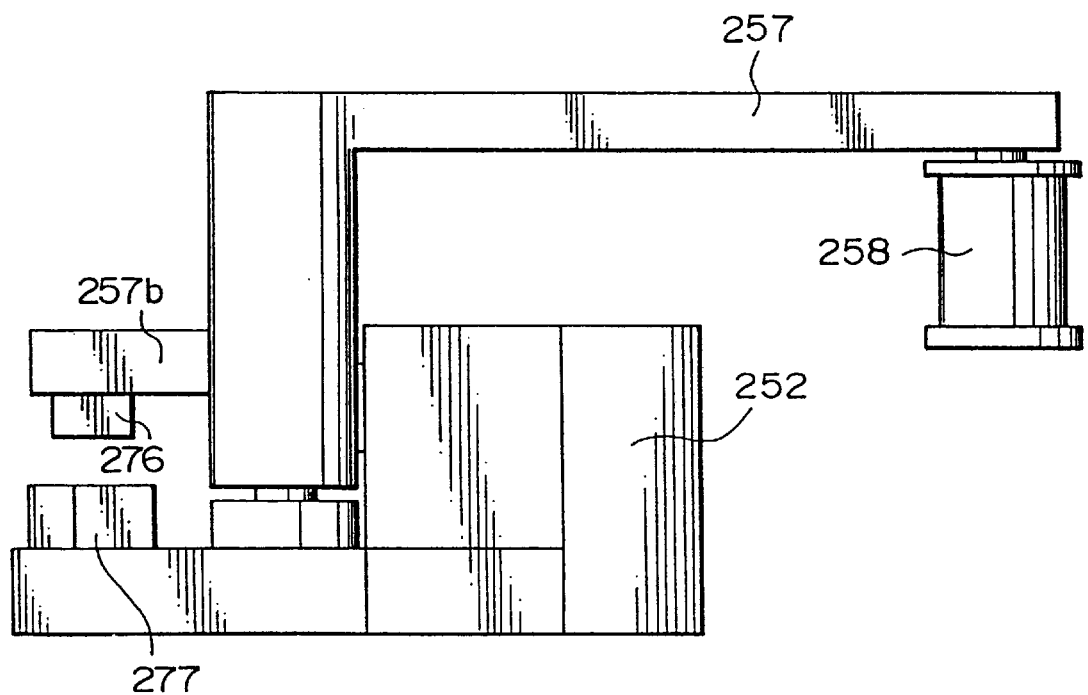

FIGS. 61 and 62 show examples of the position sensor composed of a combination of a Hall element 276 and a magnet 277. In FIG. 61, the Hall element 276 is fixed on the roller arm 257. In FIG. 62, the Hall element 276 is provided at the protruding portion 257b at the distal end of the roller arm 257.

Structure of VTR Incorporating Tape Actuators

As described above, in the present embodiment, the tape actuators are disposed at least on one side of the entrance side and the exit side of the rotary drum so as to enable DTF control, high-speed noiseless reproduction or tape tension control.

Embodiments of the present invention in which the above-described tape actuators are incorporated into a digital VTR or the like will be explained hereinunder.

Figure 63:
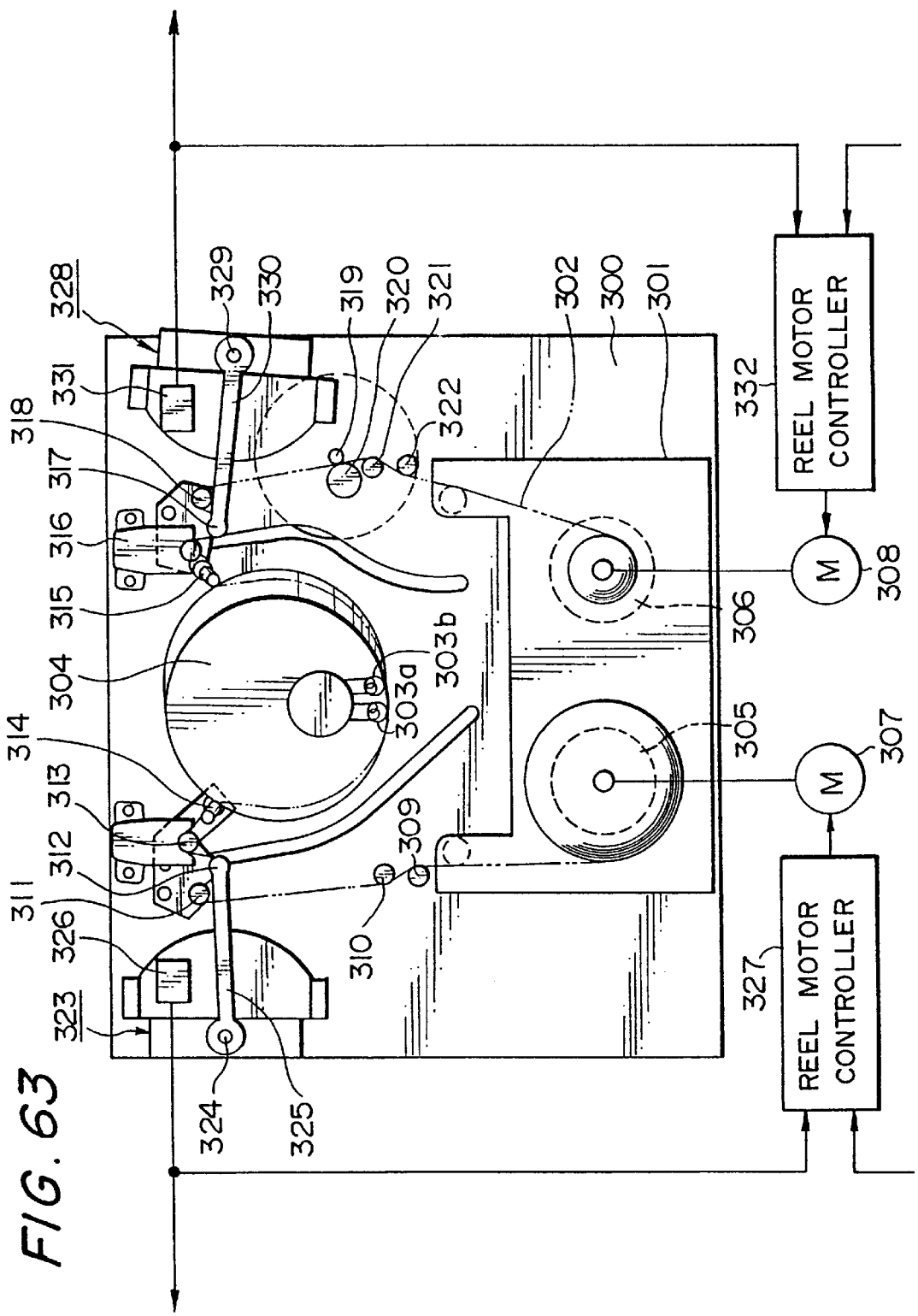

FIG. 63 schematically shows the structure of a digital VTR in which a tape tension actuator and a tape drawing actuator are provided on the entrance side and on the exit side, respectively, of a rotary drum.

A tape cassette 301 is mounted on the base 300 of a VTR deck, and the tape 302 is loaded on a rotary drum 304 accommodating magnetic heads 303a and 303b.

In order to drive a feed reel 305 and a take-up roll 306 of the cassette 301, a feed reel motor 307 and a take-up reel motor 308 are provided in the cassette deck.

FIG. 63 shows the state in which the tape is loaded. The tape 302 fed from the feed reel 305 is introduced to the rotary drum 304 through guides 309, 310, a fixed tape pass roller 311 to be described later, a tension roller 312, a fixed tape pass roller 313 and a slant pin 314.

On the exit side of the rotary drum 304, the tape 302 is introduced to a capstan 319 through a slant pin 315, a fixed tape pass roller 316, tape drawing roller 317 and a fixed tape pass roller 318. A pinch roller 320 is pressed against the capstan 319, and the tape 302 is further introduced to the take-up reel 306 through guides 321 and 322.

A tape tension actuator is represented by the reference numeral 323, and the tension roller 312 is supported at the end of a tension arm 325 which is rockably supported by a support shaft 324 of the tape tension actuator 323, as described above. A signal from a position sensor 262 which is accommodated in the tape tension actuator 323 is supplied to the tension controller, as described above, and a control signal is supplied from the reel motor controller 327 to the feed reel motor 307.

A tape drawing actuator 328 has a rocking arm 330 supported by a support shaft 329, and the tape pass roller 317 is fixed at the end of the arm 330. A signal obtained from a position detecting device 331 which is accommodated in the tape drawing actuator 328 is supplied to an actuator controller and a capstan controller. This signal is also supplied to a reel motor controller 332 and controls the take-up reel motor 308.

Figure 64:
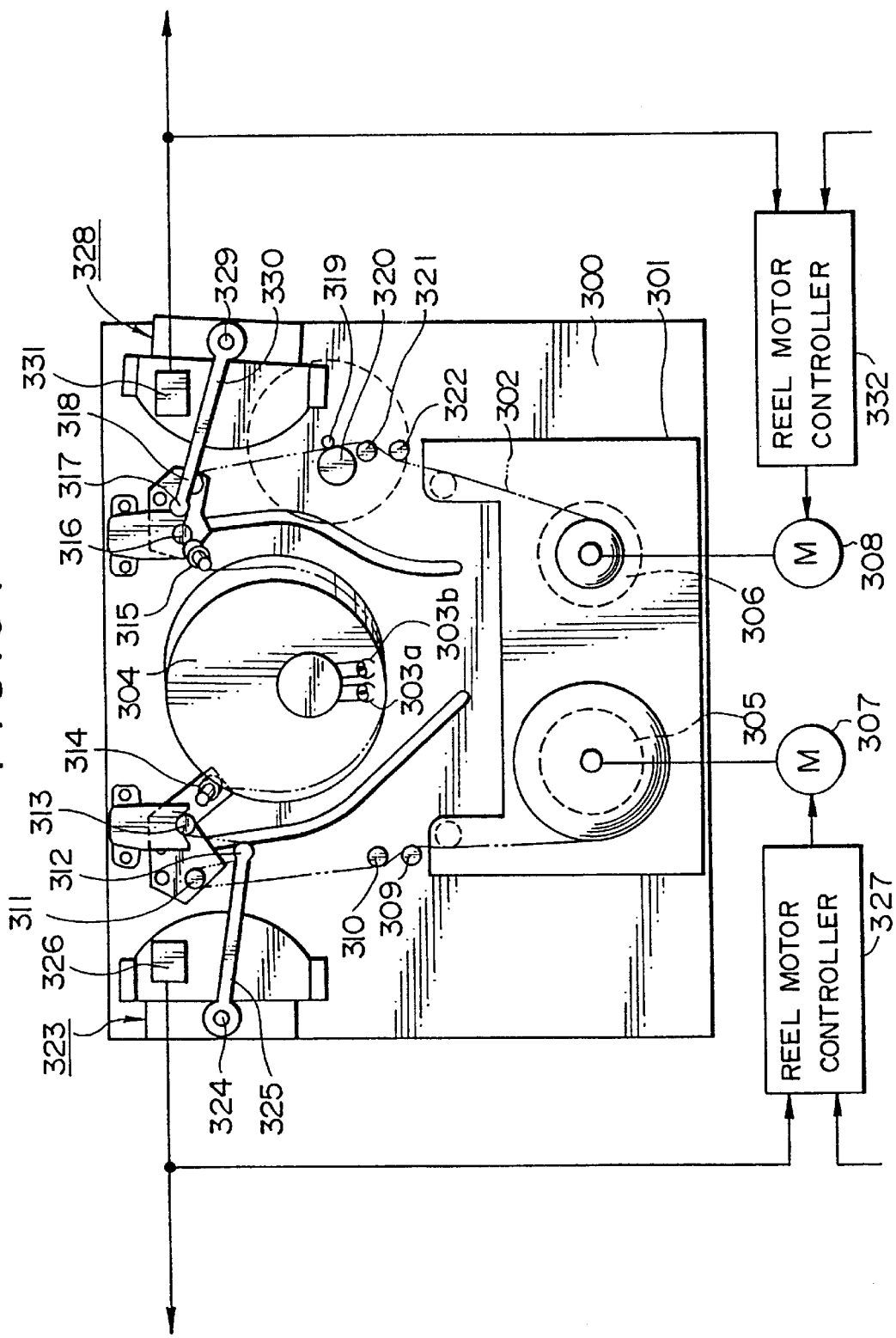
Figure 65:
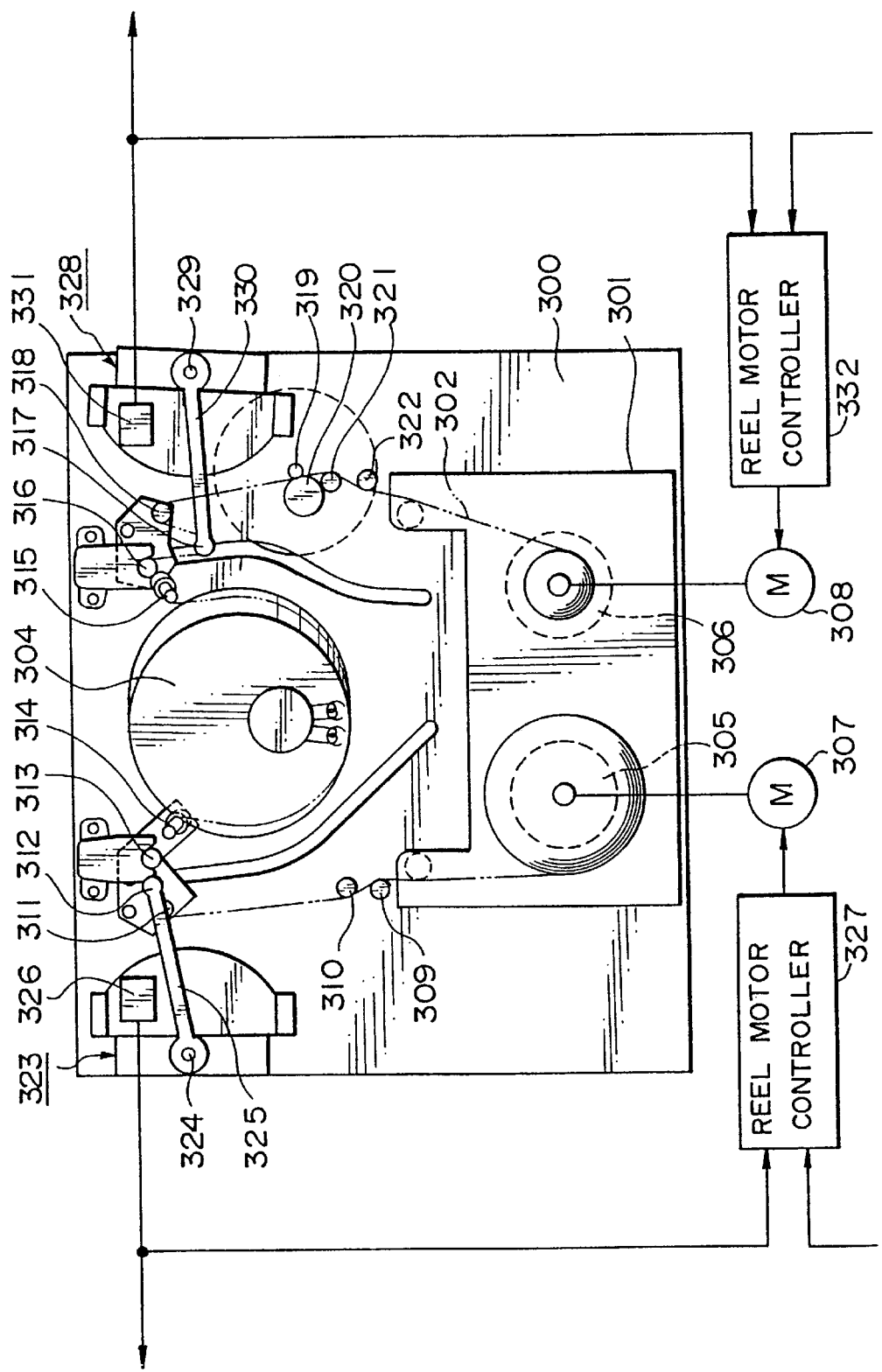

FIG. 63 shows the digital VTR in the state of normal-speed recording/reproduction, and FIGS. 64 and 65 show the digital VTR in the state of superior reproduction in which the actuators are differentially operated. The operations of the digital VTR in the respective states will be explained in the following discussion.

At the time of normal-speed recording/reproduction, a tape travel path similar to a conventional one is formed, as shown in FIG. 63, and the magnetic tape 302 is fed from the feed reel 305 to the take-up reel 306 at a constant speed by the capstan 319.

The movable tape pass roller 317 of the tape tension actuator 328 on the take-up side is mechanically or electrically fixed at a predetermined position. On the other hand, the tension roller 312 of the tape tension actuator 323 is pressed against the magnetic tape 302 at a constant force. Simultaneously, the feed reel motor 307 is so controlled that the tension of the magnetic tape 302 takes a desired value. As a result, the balance of the tension roller 312 is kept at the position at which the tension of the magnetic tape 302 takes a desired value. This position is detected by a position detecting device 326 as the reference position of the tension roller 312. By radiating the oblong or elliptic light from the light emitting portion in the method shown in FIG. 55, it is possible to enhance the detection sensitivity and make the relative positional relationship between the ray 266 and the light receiving device 267 loose in the direction orthogonal to the direction of the rotation of the tension roller 312. When the diameter of the magnetic tape 302 wound around the feed reel 305 changes with the travel of the magnetic tape 302, the tension changes, and with this change, the position of the tension roller 312 deviates from the reference position. The position detecting device 326 detects the amount of movement of the tension roller 312 and controls the feed reel motor 307 so as to restore the tension roller 312 to the reference position.

If the tension is changed by an external disturbance, the balance of forces is lost and the tension roller 312 moves from the reference position. This amount of movement is also detected by the position detecting device 326, and the feed reel motor 307 is controlled so that the tension roller 312 is restored to the reference position.

At the time of fast-forward at which the magnetic tape 302 is fed from the feed reel 305 to the take-up reel 306 at a high speed, control of the tension is carried out in the same way. At this time, the tension value may be set at a different value from that for normal-speed recording/reproduction.

At the time of rewinding at which the magnetic tape 302 is fed from the take-up reel 306 to the feed reel 305 at a high speed, control of the tension is carried out the other way around. That is, the tension roller 312 is fixed at a predetermined position, and in accordance with the amount of deviation of the movable tape pass roller 317 from the predetermined position detected by the position detecting device 331, the take-up reel motor 308 is so controlled as to keep the tension constant.

The case in which superior reproduction is carried out at a speed different from the speed at which the signals are recorded will now be explained.

In superior reproduction, a method of tracing the recording track on the magnetic tape 302 by moving the magnetic head 303 itself in the direction of the width of the track and a method of tracing the recording track by moving both the magnetic head 303 itself and the movable rollers 312, 317 are adopted, and these two methods are switched over each other depending upon the tape feeding speed.

In the case of moving only the magnetic head 303, the tension is controlled in the same way as at the time of fast-forward when the magnetic tape 302 is fed from the feed reel 305 to the take-up roll 306, while the tension is controlled in the same way as at the time of rewinding when the magnetic tape 302 is fed from the take-up reel 306 to the feed reel 305.

In the case of moving both the magnetic head 303 and the movable rollers 312, 317, the tension roller 312 and the movable tape pass roller 317 are moved by the same distance in the reverse phases in linkage with each other.

The structure of a VTR deck incorporating tape actuators in accordance with the present embodiment will be understood from the above explanation.

In the present embodiment, since the movable pass roller and the tension roller move with respect to the fixed tape pass rollers, it is necessary to exactly regulate the position of the tape both in the direction of the travel and in the direction of the height so as to feed the tape to the cylinder groove of the rotary drum. In addition, a simple and highly accurate structure for drawing the magnetic tape from the tape cassette and loading it on the rotary drum for the purpose of recording or reproducing is required.

To meet such demand, the present embodiment also provides a magnetic recording and reproducing apparatus including a new tape loading mechanism. A preferred embodiment thereof will be shown in FIGS. 66 to 69.

Figure 66:
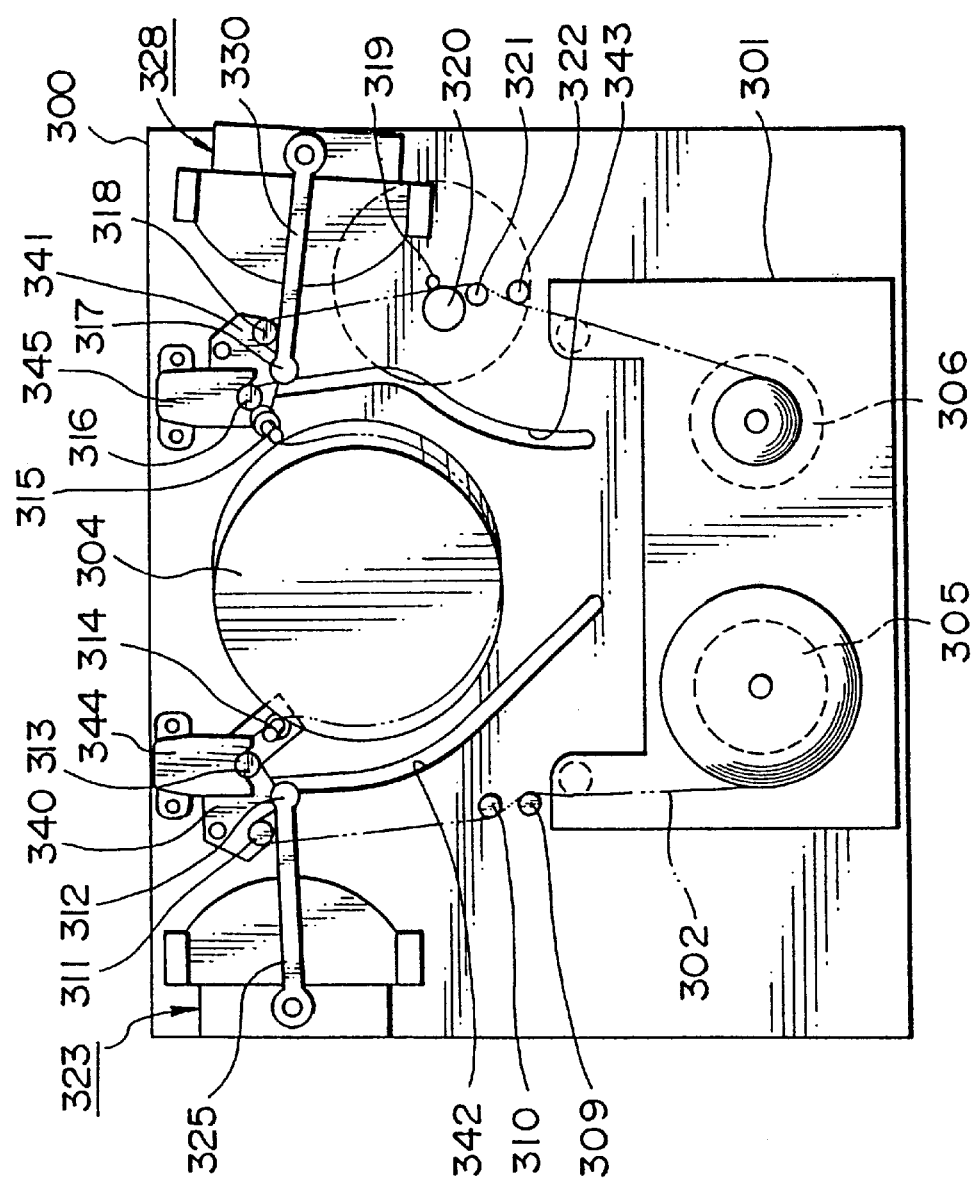
FIG. 66 is a plan view of the main part of another embodiment of a magnetic recording and reproducing apparatus according to the present invention after tape loading.
Figure 67:
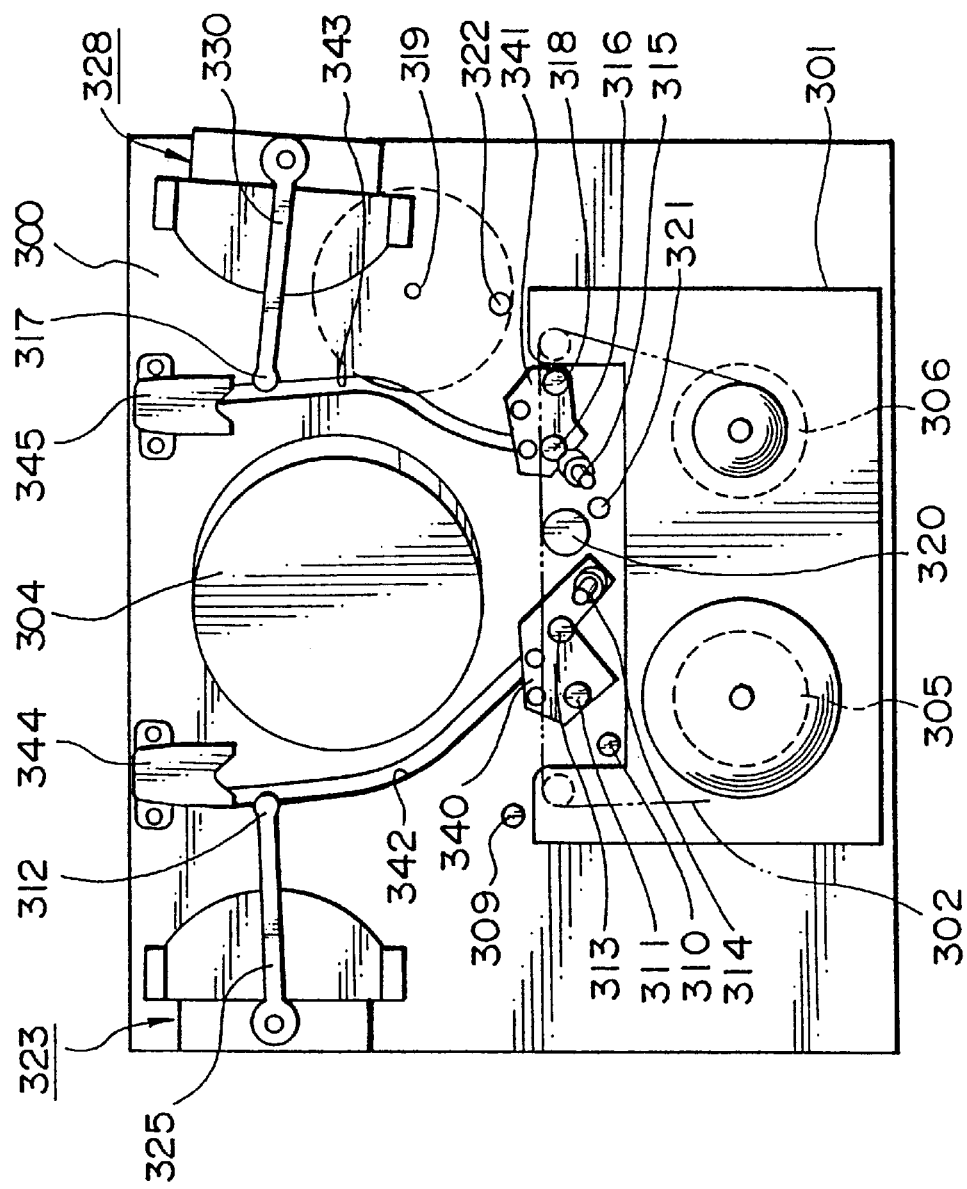
FIG. 67 is a plan view of the main part of a magnetic recording and reproducing apparatus shown in FIG. 66 before tape loading.

The main parts of FIGS. 66 and 67 are the same as FIG. 63. The same numerals are provided for the elements which are the same as those in FIG. 63, and an explanation thereof will be omitted.

FIG. 66 shows the recording/reproducing state after loading the tape, and FIG. 67 shows the state before loading the tape in which the cassette is inserted.

The guide 310 on the entrance side and the guide 321 on the exit side are movable before and after tape loading as in the known systems, and the details thereof will be omitted.

The fixed tape pass rollers 311, 313 and the slant pin 314 must be moved before and after tape loading in order to draw the magnetic tape 302 from the cassette and introduce it to the entrance side of the rotary drum 304. The present embodiment is characterized in that both the fixed tape pass rollers 311, 313 and the slant pin 314 are fixed on one tape loader 340 and integrally moved, for thereby enabling the exact positioning of each tape guide.

Similarly, on the exit side of the rotary drum 304, the slant pin 315 and the fixed tape pass rollers 316, 318 are fixed on one tape loader 341 on the exit side, for thereby enabling integral tape loading and the exact positioning of the magnetic tape 302 on the exit side.

Although the details are omitted in FIG. 67, the tape loader 340 on the entrance side and the tape loader 342 on the exit side are introduced to guide grooves 342 and 343, respectively, which are provided on the deck base 300. The tape loaders 340, 341 are vertically and movably provided in order to introduce the magnetic tape 302 to the rotary drum 304 and catch the magnetic tape 302 of the tape cassette 301.

The deck base 300 is also provided with a catch 344 on the entrance side and a catch 345 on the exit side which can exactly position the fixed tape pass rollers 313 and 316 after tape loading, as shown in FIG. 63.

Figure 68:
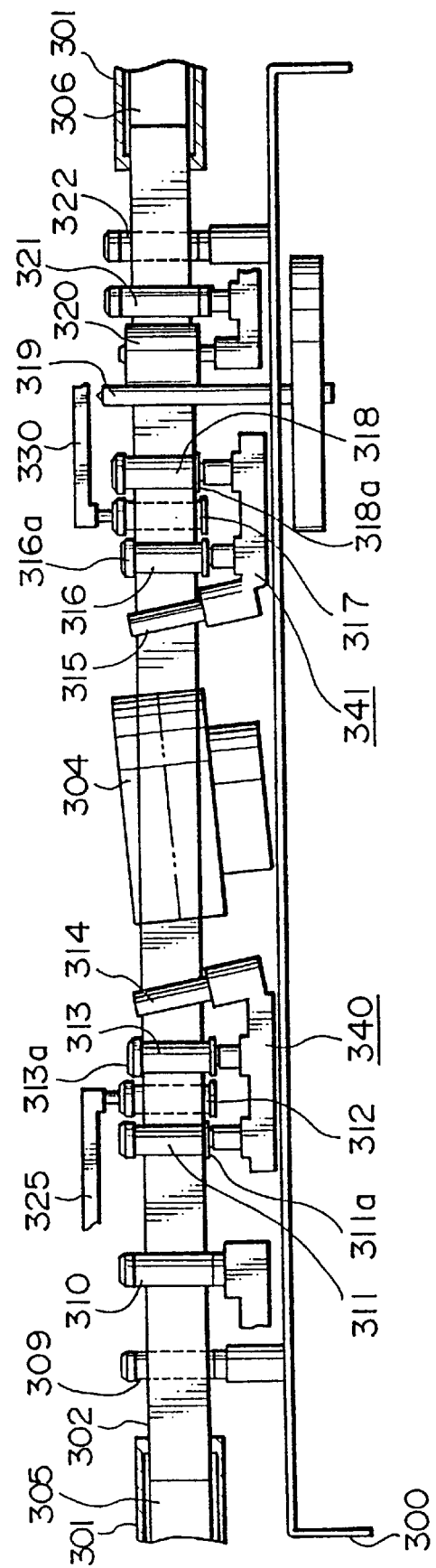
FIG. 68 is a detailed side view of a device for regulating the magnetic tape in the vertical direction in accordance with the present invention, seen in the direction of the travel of the magnetic tape.

FIG. 68 shows the travel path of the magnetic tape 302 after tape loading.

As is obvious from FIG. 68, on the entrance side of the rotary drum 304, the fixed tape pass rollers 311, 313 and the slant pin 315 are positioned only by the tape loader 340 on the entrance side in order to exactly position the magnetic tape 302 with respect to the tension roller 312 of the tape tension actuator.

Similarly, on the exit side of the rotary drum 304, the tape loader 341 on the exit side exactly positions the slant pin 315 and the fixed tape pass rollers 316 and 318.

The present embodiment is further characterized in that the pair of fixed tape pass rollers regulate the position of the upper and lower ends of the magnetic tape 302 on the entrance side and exit side by flanges in order to regulate the position in the direction of the width of the magnetic tape 302. In this way, the magnetic tape 302 is exactly fed to a predetermined cylinder groove of the rotary drum 304, for thereby reducing the generation of a tracking error. The upper flange 316a of the fixed tape pass roller 316 regulates the upper end of the magnetic tape 302, and the lower flange 318a of the fixed tape pass roller 318 regulates the lower end of the magnetic tape 302.

In this way, the magnetic tape 302 can pass the travel path in the state of being exactly positioned in the vertical direction.

Figure 69:
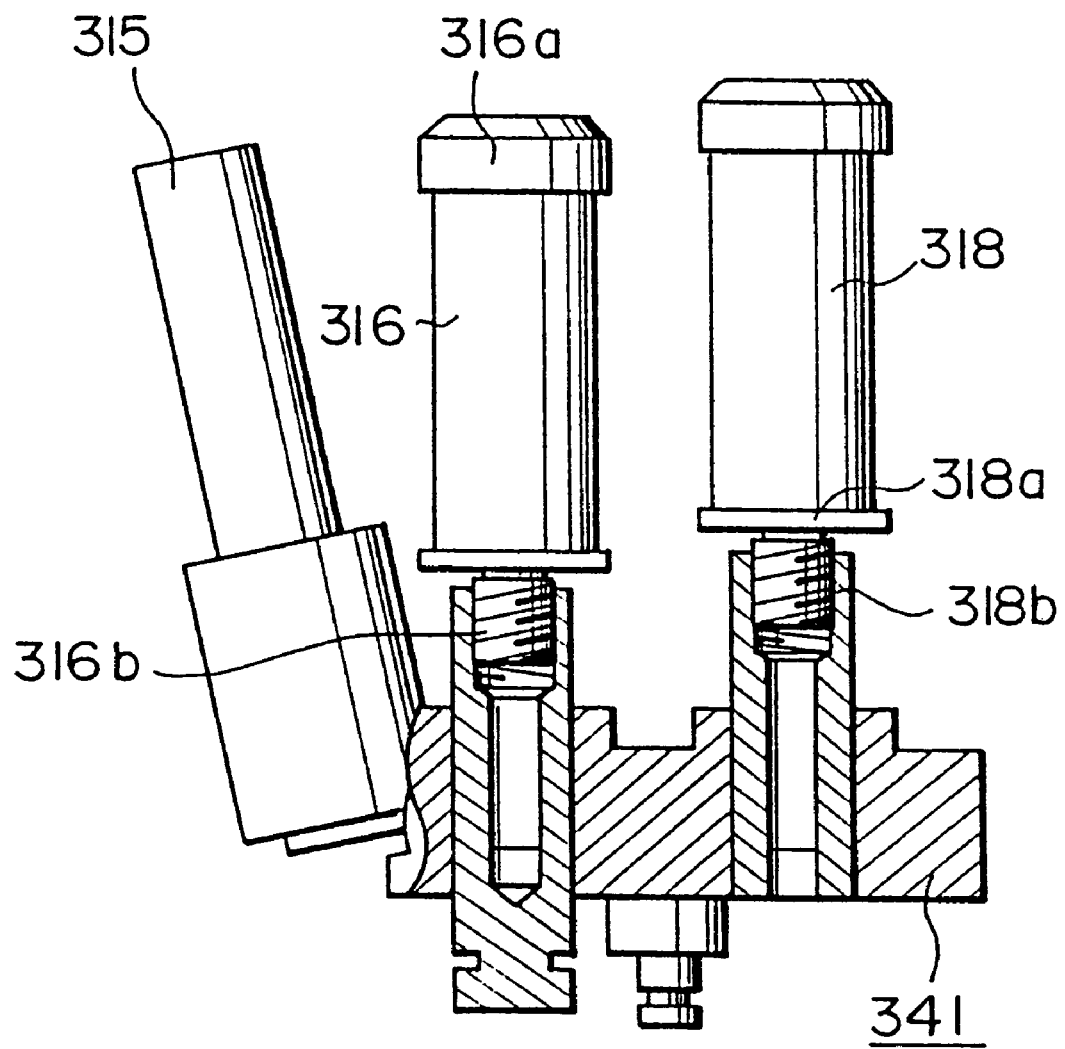
FIG. 69 is a partially sectional view of the details of a mechanism of vertically moving the tape pass roller on the take-up reel side in accordance with the present invention.

FIG. 69 is an enlarged view of the tape loader 341 on the exit side.

In order to exactly position the flanges of the fixed tape pass rollers 316, 318, height adjusting screws 316b and 318b are provided at the fixed portion of the fixed tape pass rollers 316 and 318, respectively, for thereby adjusting the heights of the respective tape pass rollers at the time of assembly.

The fixed tape pass rollers 311, 313 provided on the tape loader on the entrance side of the rotary drum 304 also regulate the upper and lower ends of the magnetic tape 302. As shown in FIG. 68, the lower flange 311a of the fixed tape pass roller 311 regulates the lower end of the magnetic tape 302 and the upper flange 313a of the fixed tape pass roller 313 regulates the upper end of the magnetic tape 302. The adjustment of the height of each roller on the tape loader 340 is carried out in the same way as on the exit side.

As described above, the tape actuators in accordance with the present embodiment are mounted on a digital VTR deck.

In the above-described embodiment, however, since the actuators and the tape loaders are mounted on the upper side of the deck base, it is sometimes difficult to arrange these elements in a narrow space.

Accordingly, it is preferable to arrange either of the actuators and loaders on the upper surface and the other on the under surface in order to enhance the space utility.

FIGS. 70 to 74 show a preferred embodiment of the present invention in which either of these elements is disposed on the upper surface and the other on the under surface of a VTR deck.

In FIGS. 70 to 74, the same numerals are provided for the elements which are the same as those in FIG. 63, and an explanation thereof will be omitted.

Figure 70:
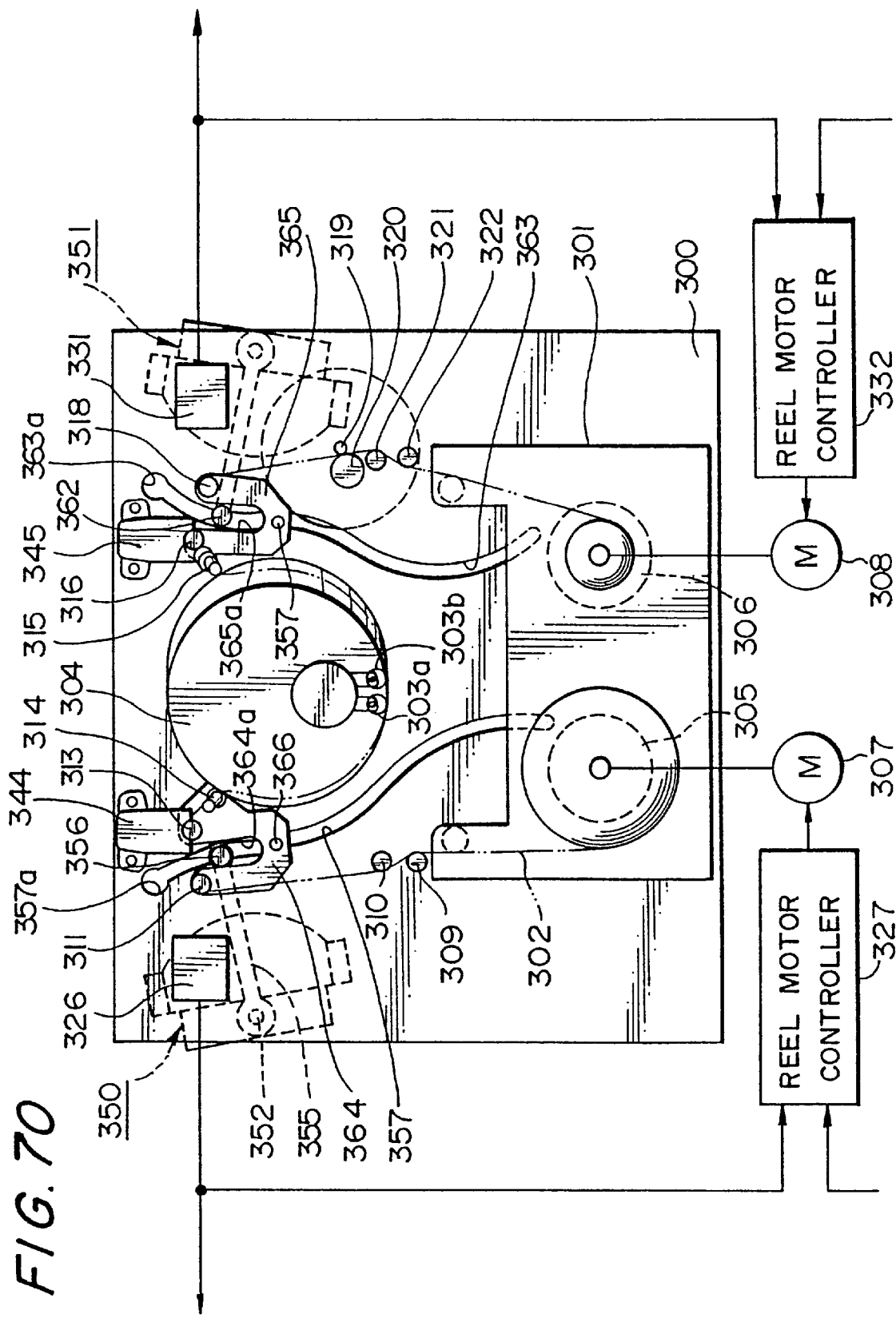
FIG. 70 is a plan view of the main part of still another embodiment of a magnetic recording and reproducing apparatus according to the present invention after tape loading.
Figure 71:
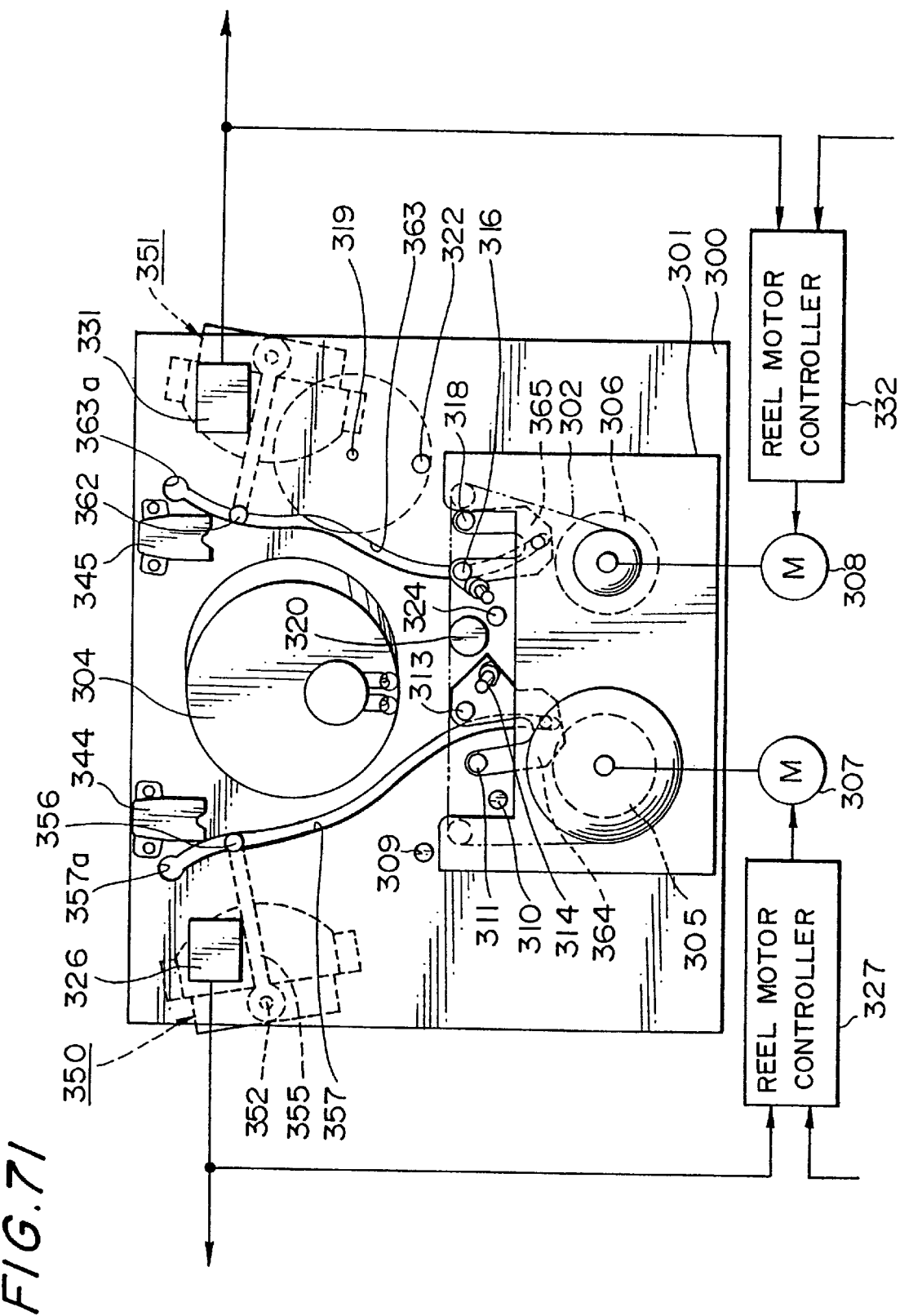
FIG. 71 is a plan view of the main part of the magnetic recording and reproducing apparatus shown in FIG. 70 before tape loading.

FIG. 70 shows a recording/reproducing state after the completion of tape loading and FIG. 71 shows the state before tape loading in which the tape cassette 302 is inserted into the deck.

The structure of the tape actuators in this embodiment will first be explained.

Figure 72:
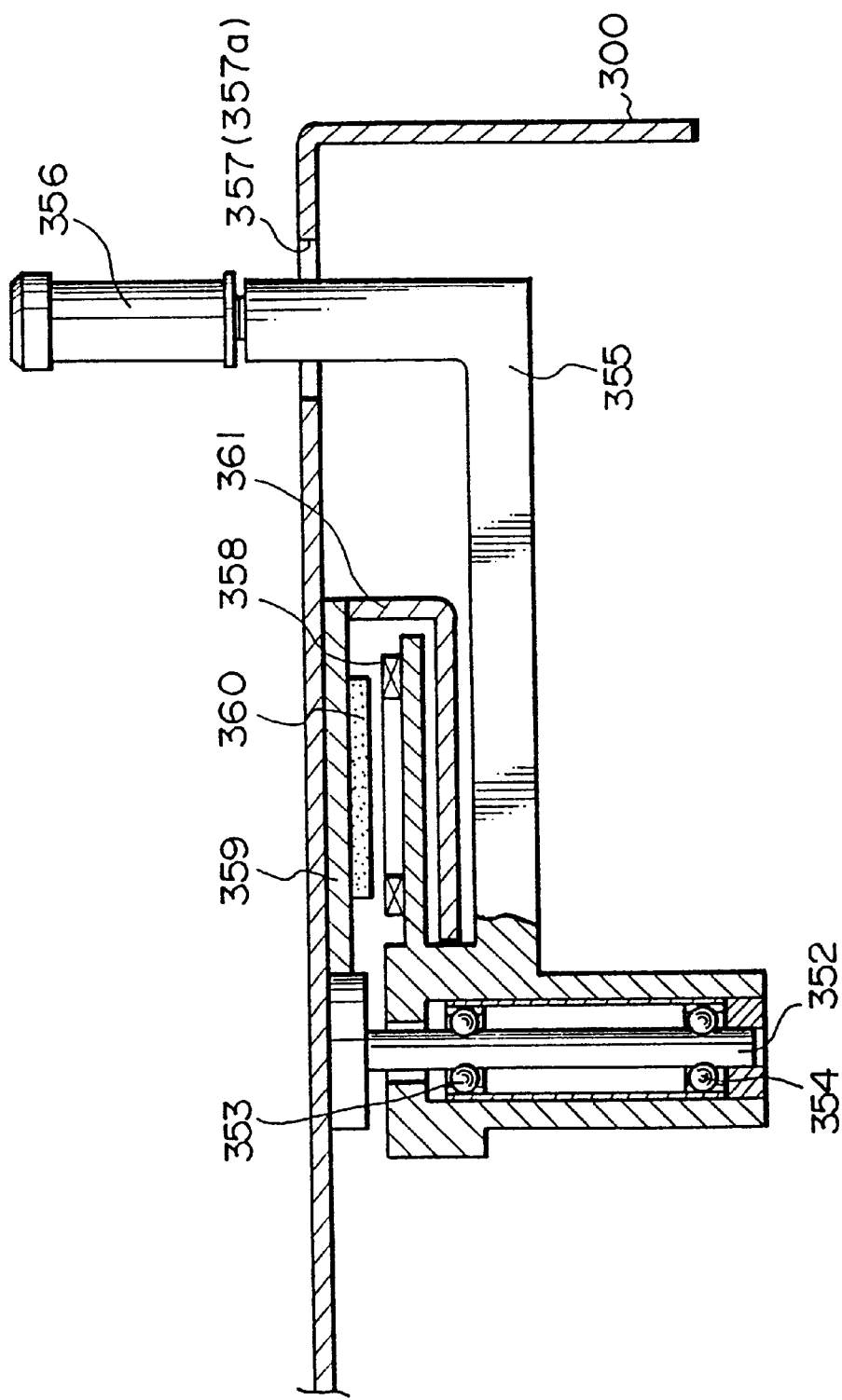
FIG. 72 is a detailed sectional view of the embodiment shown in FIGS. 70 and 71 showing the tape actuator disposed on the under surface of the base.

FIG. 72 shows an example of a tape tension actuator 350. Since a tape drawing actuator 351 has the same structure, a detailed explanation thereof will be omitted.

In FIG. 72, a support shaft 352 is fixed on the deck base 300 and a tension arm 355 is rotatably supported by the support shaft 352 through bearings 353, 354. At the end of the tension arm 355, a tension roller 356 is provided. This embodiment is characterized in that the tension arm 355 is disposed on the under surface of the base 300. The tension roller 356 projects into the upper side of the base 300 from the underside of the base 300 through a guide groove 357 provided on the base 300.

According to this embodiment, no part of the driving portion of the tape actuator is disposed on the upper surface of the base 300, for thereby facilitating the mounting of other elements such as a tape loader on the upper surface of the base 300.

As is clear from FIG. 72, a driving coil 358 is provided on the tension arm 355 in such a manner as to integrally rotate therewith. On the under surface of the base 300, a holder yoke 359 is fixed. A permanent magnet 360 is fixed on the holder yoke 359 and a yoke 360 is provided on the holder yoke 359.

As is clear from the first embodiment, by supplying a predetermined current to the driving coil 358, it is possible to position the tension roller 356 at any given position by the electromagnetic action with the permanent magnet 360.

In FIG. 72, the guide groove 357 is provided with a roller insertion hole 357a which has a larger diameter than the other groove portion, for thereby enabling the tension roller 356 of a large diameter to be easily installed from the under surface of the base 300 toward the upper surface thereof.

In this embodiment, the guide groove 357 not only forms the path along which the tension roller 356 moves but also the guide groove through which the support shaft of the tape loader passes. By continuously providing the tension roller path and the guide groove in this way, machining is facilitated.

The tape drawing actuator 351 has the same structure. In FIG. 71, the movable tape pass roller 362 is shown. The groove for allowing the passage of the moveable tape pass roller 362 is a guide groove represented by the reference numeral 363 and the roller insertion hole having a large diameter is represented by the reference numeral 363a.

The guide groove 363 on the exit side is also used as the groove through which the support shaft of a later-described tape loader passes.

As described above, according to this embodiment, the tape actuators 350, 351 are disposed on the under surface of the deck base 300.

On the other hand, the tape loaders are disposed on the upper surface of the deck base 300. In FIG. 71, the tape loader on the entrance side is represented by the reference numeral 364 and the tape loader on the exit side is represented by the reference numeral 365.

On the tape loader 364, the fixed tape pass rollers 311, 313 and the slant pin 314 are integrally fixed. Similarly, the slant pin 315 and the fixed tape pass rollers 316, 318 are integrally fixed on the tape loader 365 on the exit side.

The support shaft 366 of the tape loader 364 on the entrance side moves along the guide groove 357 so as to safely introduce the magnetic tape 302 to the rotary drum 304, as shown in FIGS. 70 and 71. Similarly, the support shaft 367 of the tape loader 365 on the exit side moves along the guide groove 363 so as to safely introduce the magnetic tape 302 from the rotary drum 304.

Figure 73:
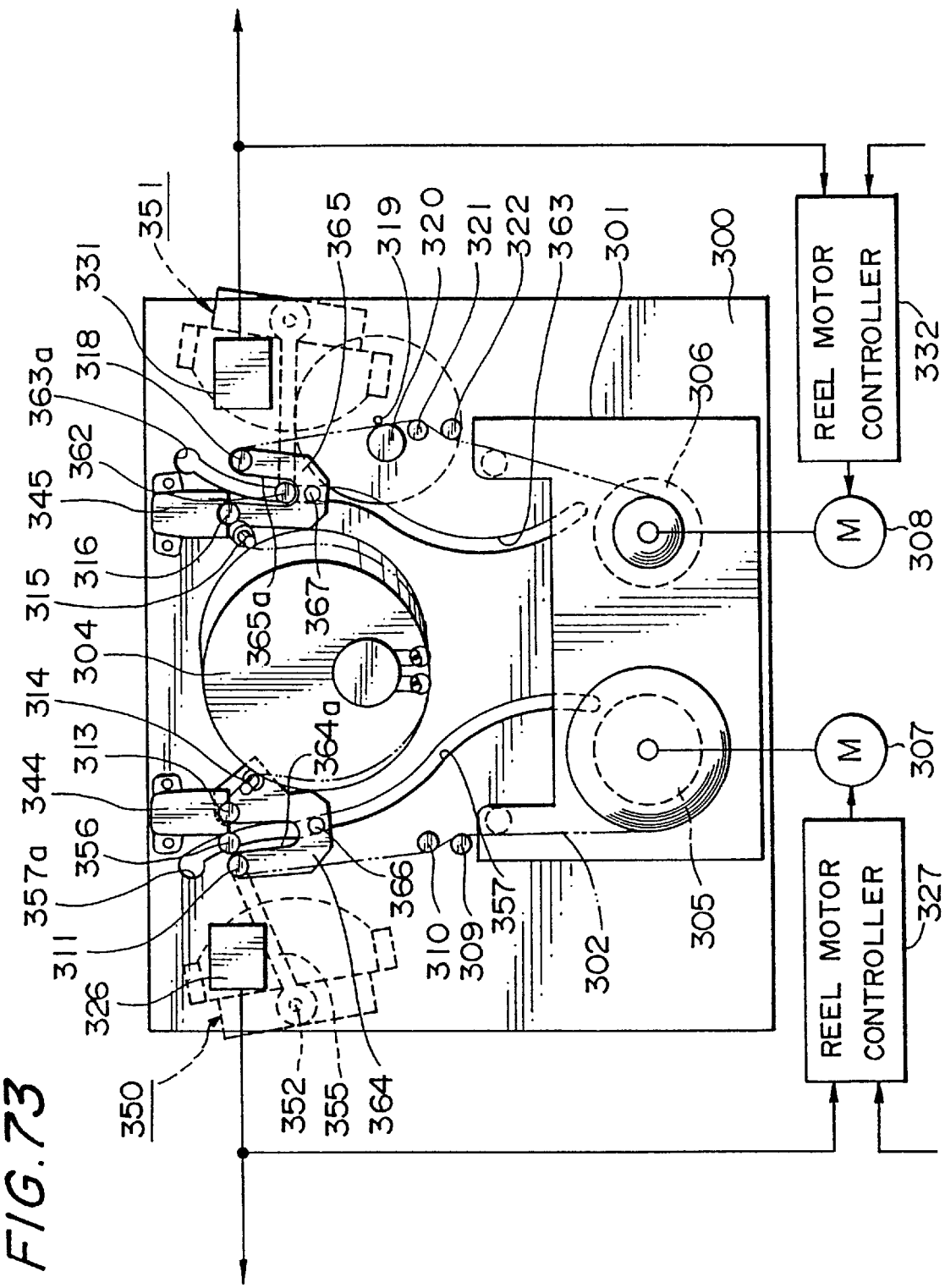
FIGS. 73 and 74 show the operation of the tape actuators in the embodiment shown in FIG. 70 and 71 at the time of superior reproduction.
Figure 74:
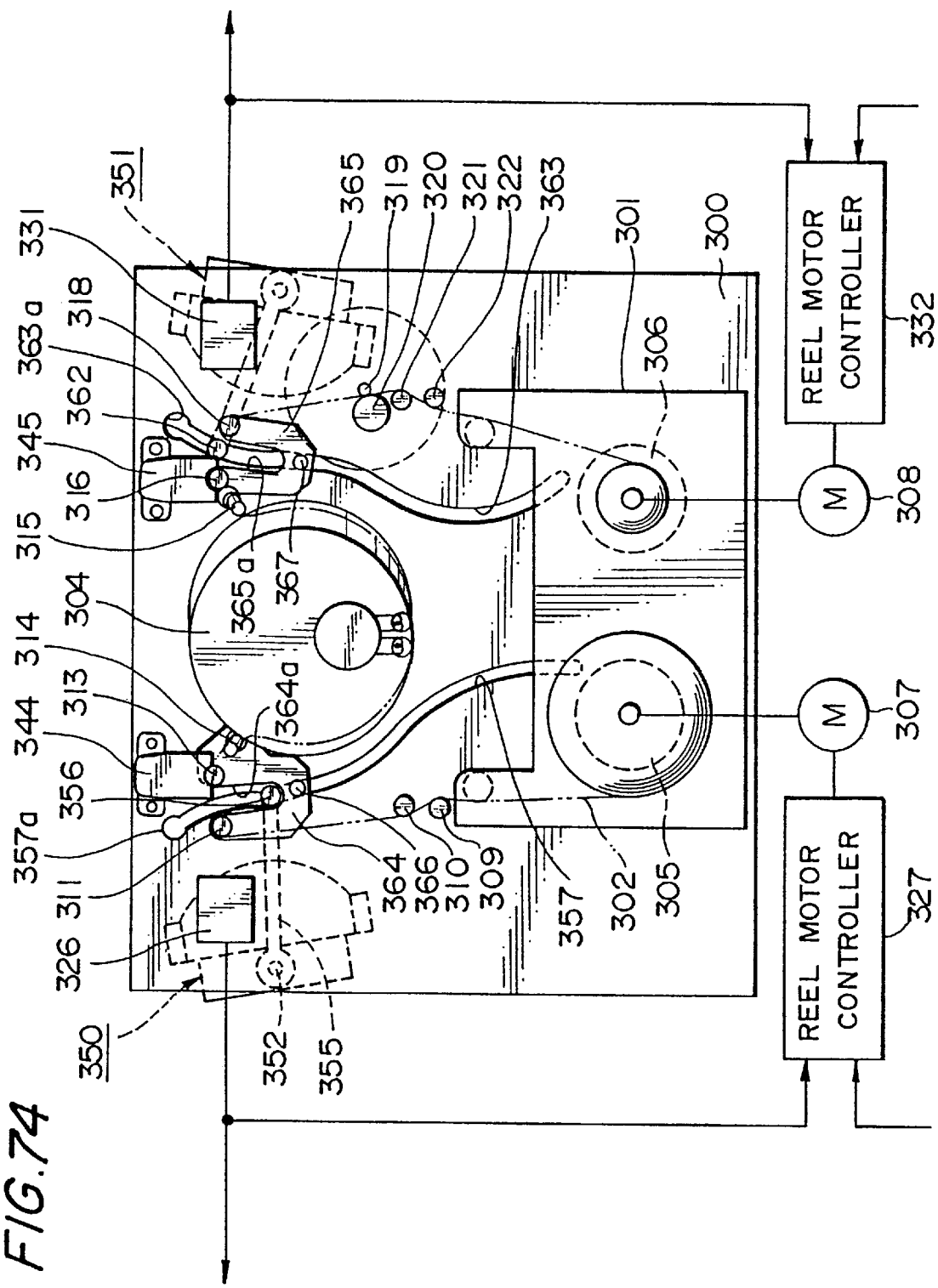
Figure 75:
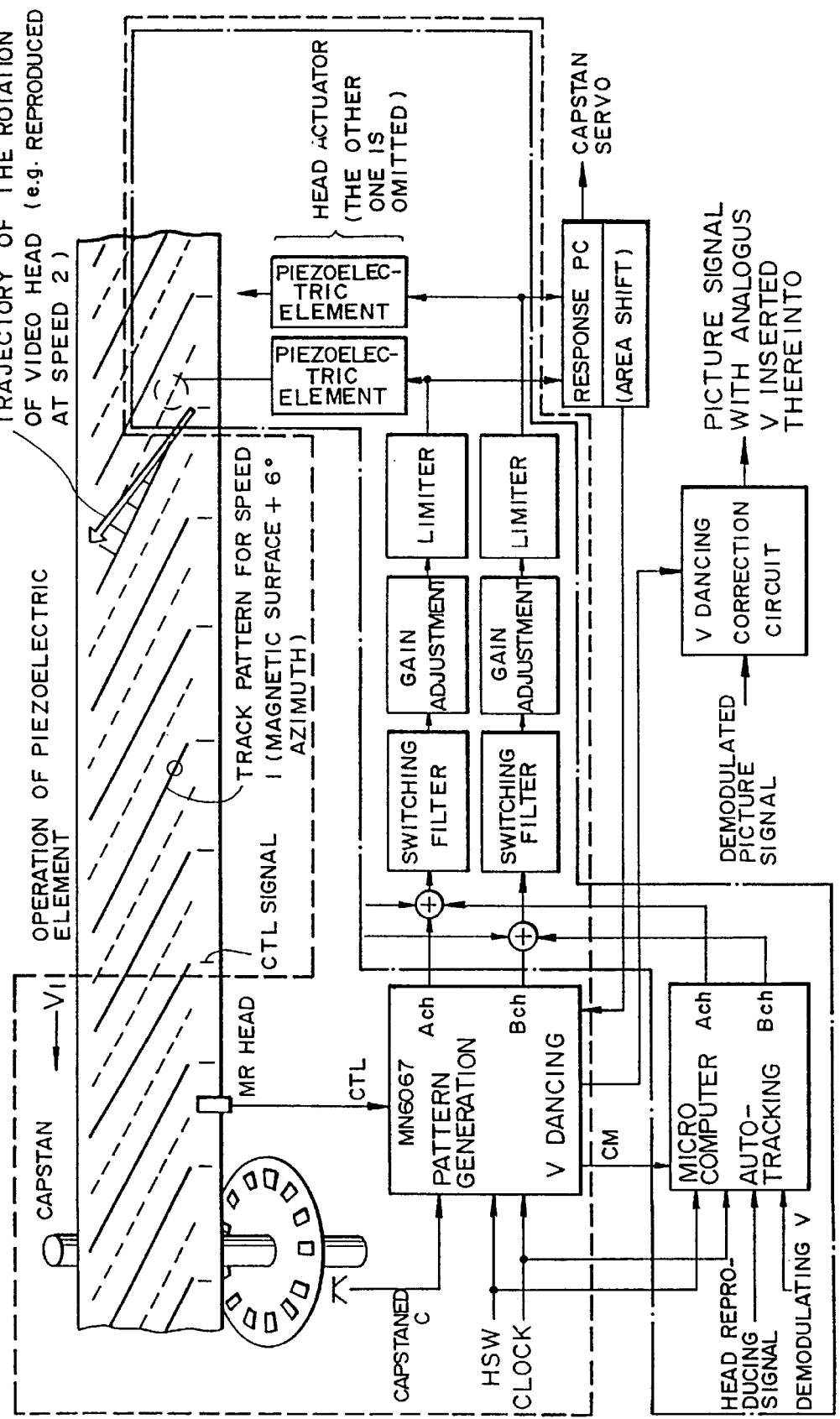
FIG. 75 shows the system of a conventional magnetic reproducing apparatus.
Figure 76:
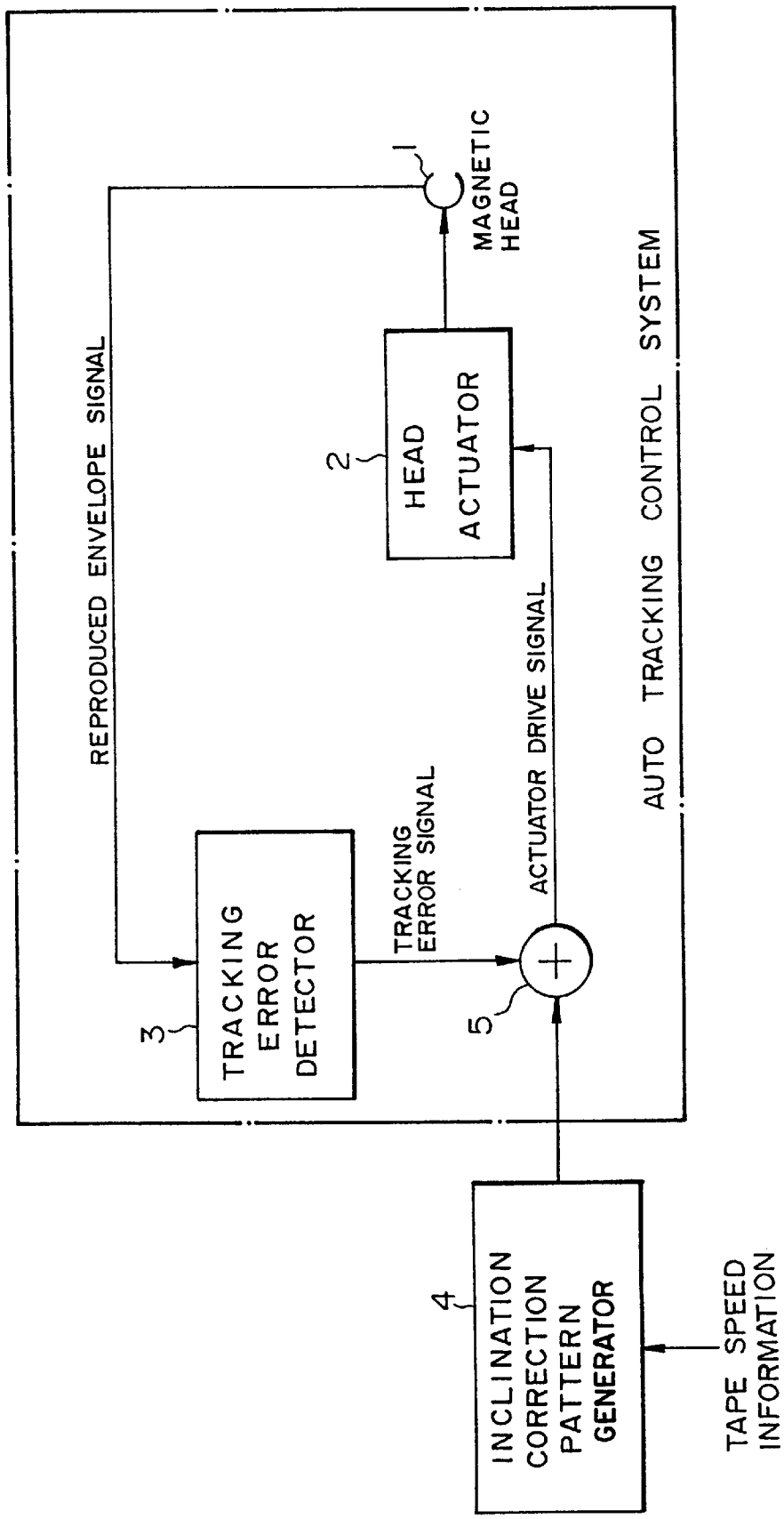
FIG. 76 shows the high-speed superior reproduction servo system in a conventional magnetic reproducing apparatus.
Figure 77:
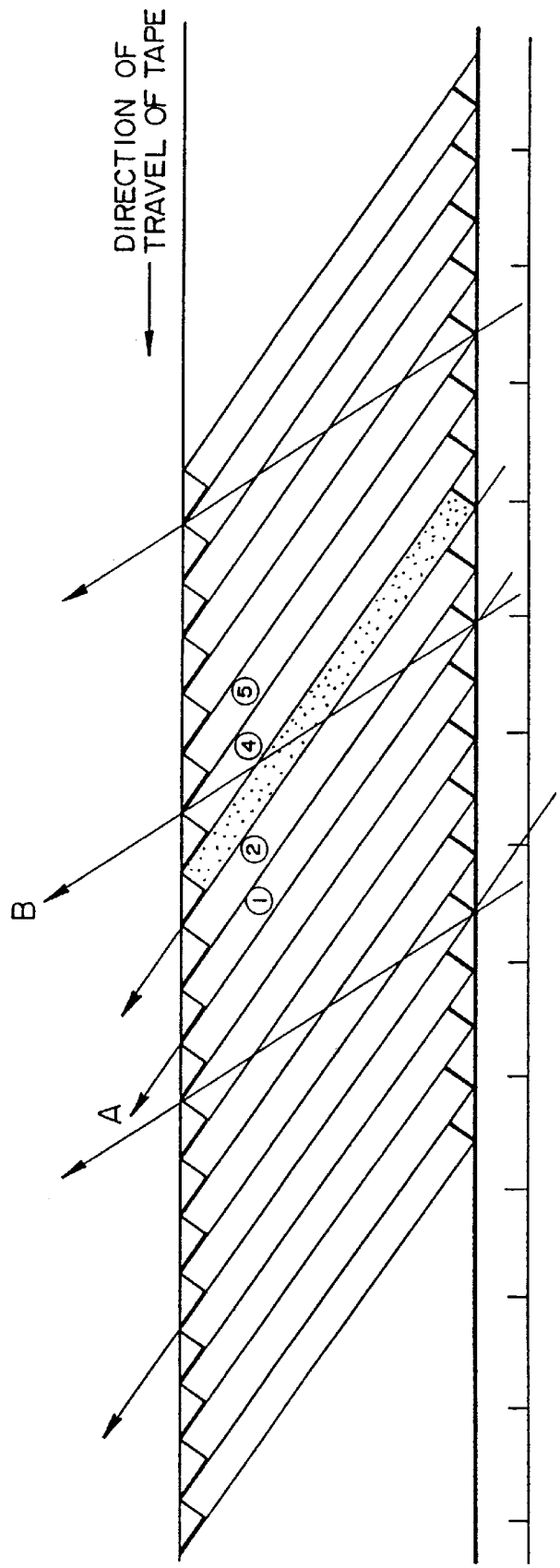
FIGS. 77 and 78 show the relationships between the tape pattern and the trajectory of the scanning magnetic head in the cases of normal-speed travel, and reversely travelling at a speed five times as high as the normal speed, respectively.
Figure 78:
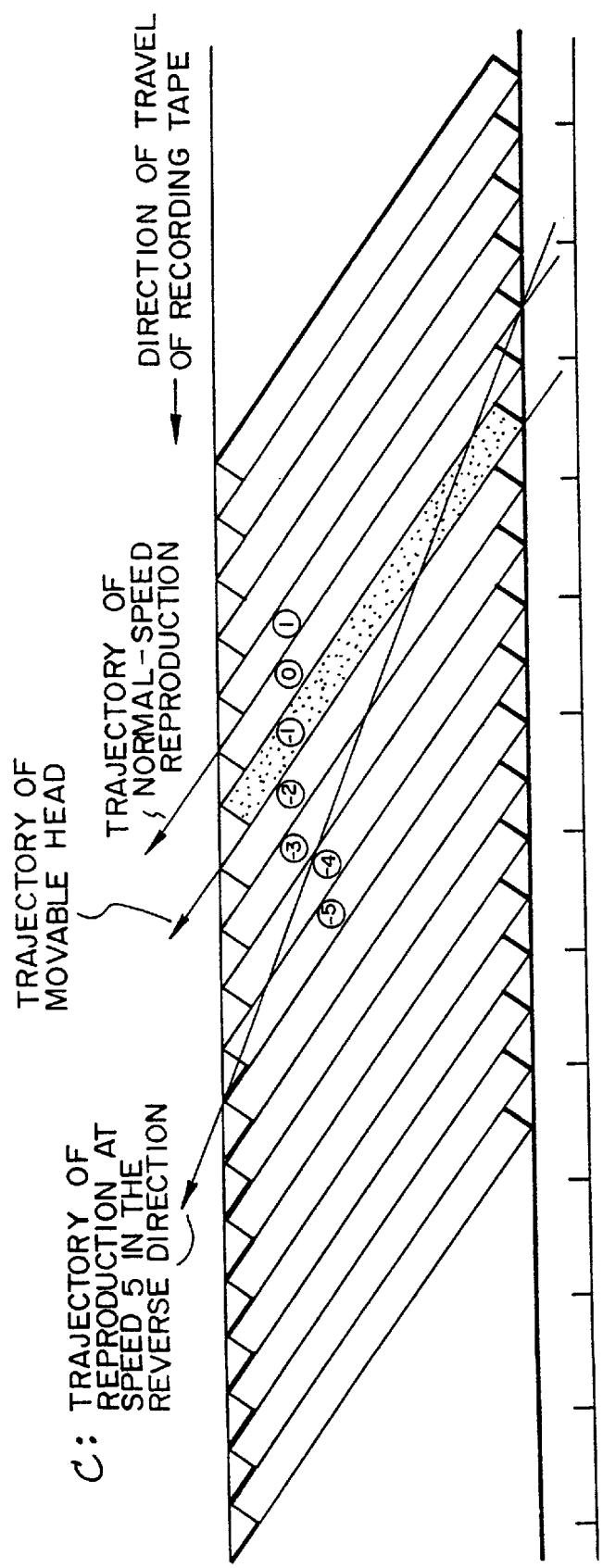
Figure 79:
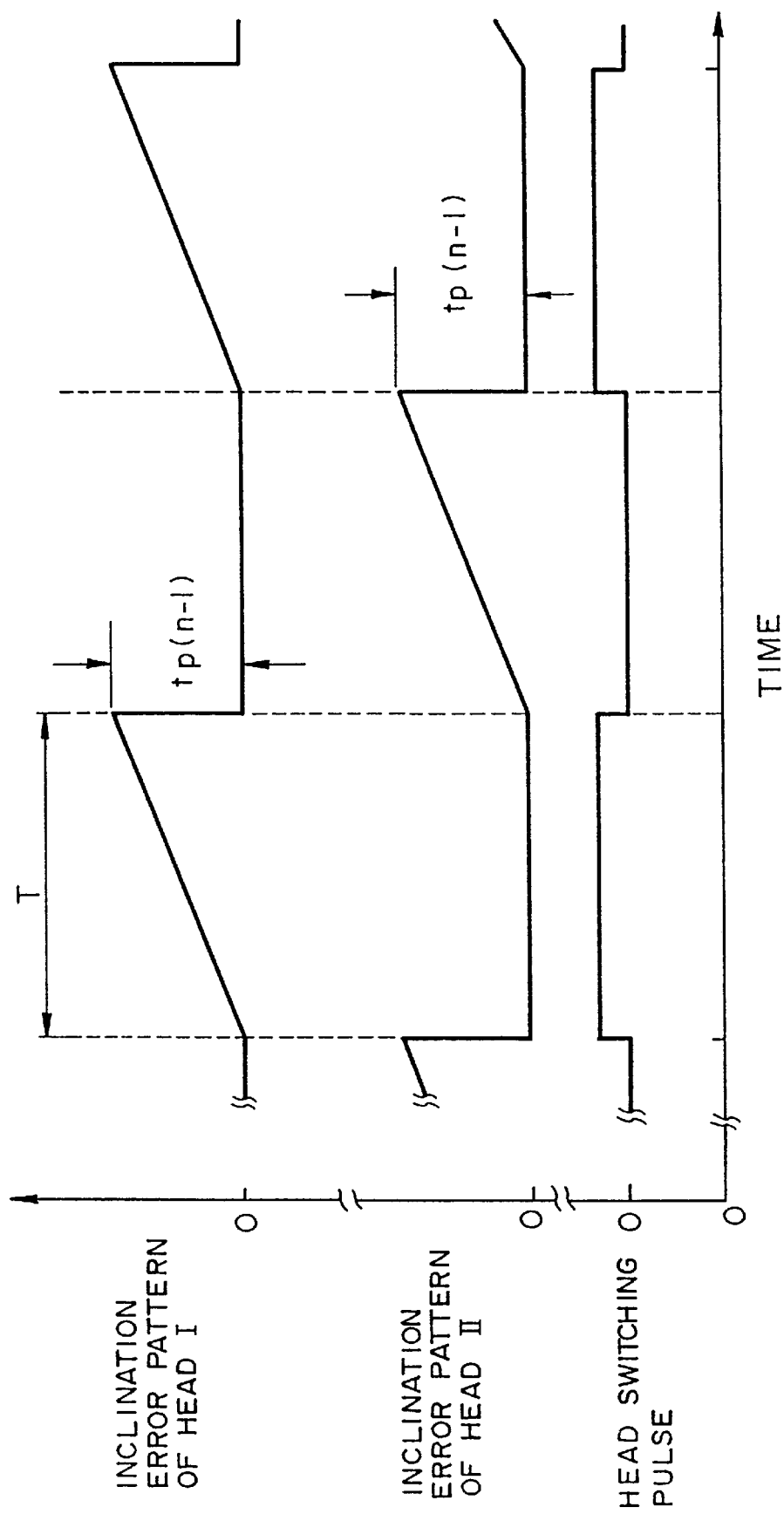
FIG. 79 schematically shows inclination error patterns which are to be followed by the magnetic head in a conventional magnetic reproducing apparatus.
Figure 80:
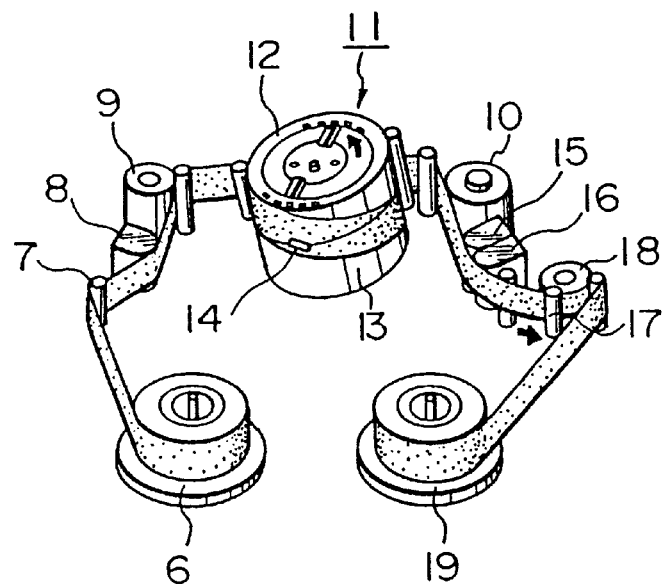
FIG. 80 shows a magnetic tape travelling system in a conventional VTR.

As is clear from FIG. 70, the tape loader 364 on the entrance side is provided with a relief groove 364a to which the tension roller 356 can move. This relief groove 364a forms a space in which the tension roller 356 moves at the time of high-speed noiseless reproduction, as shown in FIGS. 73 and 74.

Similarly, the tape loader 365 on the exit side is provided with a relief groove 365a to which the movable tape pass roller 362 can move.

As described above, according to this embodiment, the tension roller 356 and the movable tape pass roller 362 differentially move and the tape loaders 364 and 365 do not obstruct the movement of these rollers.

While there has been described what is at present considered to be preferred embodiments of the invention, it will be understood that various modifications may be made thereto, and it is intended that the appended claims cover all such modifications as fall within the true spirit and scope of the invention.

What is claimed is:

1. A method of controlling tension of a tape using a tension control system having a tape tension device which applies a tension to the tape, comprising the steps of:

(a) electrically modeling transfer characteristics of said tape tension device to produce an electrical model;

(b) comparing an output of said tape tension device to a corresponding output from said electrical model to produce a difference signal;

(c) modifying a value of said electrical model based on said difference signal to make said difference signal approach 0;

(d) estimating the tension of the tape using said electrical model.

2. The method of controlling tension of a tape according to claim 1, wherein said step (a) comprises the steps of:

(a)(1) electrically simulating a first transfer function by a first transfer function circuit; and (a)(2) electrically simulating a second transfer function by second and third transfer function circuits.

3. The method of controlling tension of a tape according to claim 2, wherein said first transfer function is represented by:

$$\frac{K'\tau}{R'};$$

wherein R' corresponds to a coil resistance of a tape tension actuator of said tape tension device and K'τ corresponds to a force constant of an electromagnetic driving portion of said tape tension device which drives said tape tension actuator.

4. The method of controlling tension of a tape according to claim 2, wherein said tape tension device includes a movable portion which applies tension to the tape and said second transfer function is represented by:

$$\frac{1}{J'S} \times \frac{1}{S} \times \frac{1}{J'S^2}$$

wherein J' corresponds to the movable portion of said tape tension device and 1/S corresponds to a Laplace conversion.

5. The method of controlling tension of a tape according to claim 1, wherein said step (c) comprises the step of feeding back first and second gains determined based on said difference signal to said step (a) for converging said difference signal to 0.

6. A tension control system for controlling the tension of a tape, comprising:

tape tension means for applying a tension to the tape;

electrical simulating means for electrically modeling transfer characteristics of said tape tension means to produce an electrical model;

comparing means for comparing an output of said tape tension means to a corresponding output from said electrical model to produce a difference signal;

converging means for modifying a value of said electrical model based on said difference signal to make said difference signal approach 0; and estimating means for estimating the tension of the tape using said electrical model.

7. The tension control system according to claim 6, wherein said electrical simulating means comprises a first transfer circuit for electrically simulating a first transfer function and first and second transfer function circuits for electrically simulating a second transfer function.

8. The tension control system according to claim 7, wherein said first transfer function is represented by:

$$\frac{K'\tau}{R'};$$

wherein R' corresponds to a coil resistance of a tape tension actuator of said tape tension means and K'τ corresponds to a force constant of an electromagnetic driving portion of said tape tension means which drives said tape tension actuator.

9. The tension control system according to claim 7, wherein said tape tension means includes a movable portion which applies tension to the tape and said second transfer function is represented by:

$$\frac{1}{J'S} \times \frac{1}{S} \times \frac{1}{J'S^2}$$

wherein J' corresponds to the movable portion of said tape tension means and 1/S corresponds to a Laplace conversion.

10. The tension control system according to claim 6, wherein said converging means comprises feedback means for feeding back first and second gains determined based on said difference signal to said electrical simulating means for converging said difference signal to 0.

* * * * *